(12) United States Patent
Chen et al.

(10) Patent No.: US 11,971,609 B2
(45) Date of Patent: Apr. 30, 2024

(54) PHOTOGRAPHING OPTICAL SYSTEM

(71) Applicant: LARGAN PRECISION CO., LTD., Taichung (TW)

(72) Inventors: Chun-Yen Chen, Taichung (TW); Kuan-Ting Yeh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 17/695,735

(22) Filed: Mar. 15, 2022

(65) Prior Publication Data

US 2022/0214522 A1 Jul. 7, 2022

Related U.S. Application Data

(63) Continuation of application No. 16/734,132, filed on Jan. 3, 2020, now Pat. No. 11,314,050.

(30) Foreign Application Priority Data

Nov. 27, 2019 (TW) ................................ 108143234

(51) Int. Cl.
*G02B 9/64* (2006.01)
*G02B 13/00* (2006.01)
(Continued)

(52) U.S. Cl.
CPC ............ *G02B 9/64* (2013.01); *G02B 13/0045* (2013.01); *G02B 27/0025* (2013.01); *G02B 15/1461* (2019.08)

(58) Field of Classification Search
None
See application file for complete search history.

(56) References Cited

U.S. PATENT DOCUMENTS 5,007,719 A   4/1991   Hasegawa
5,007,720 A   4/1991   Hamanishi
(Continued)

FOREIGN PATENT DOCUMENTS

CN   101688968 A   3/2010
CN   108227145 A   6/2018
(Continued)

OTHER PUBLICATIONS

Smith, Warren J., Modern OPtical Engineering The Design of Optical Systems (1990), McGraw Hill, second edition, pp. 43-47 Apr. 21, 2023.*

(Continued)

*Primary Examiner* — Darryl J Collins
(74) *Attorney, Agent, or Firm* — Maschoff Brennan

(57) ABSTRACT

A photographing optical system includes eight lens elements which are, in order from an object side to an image side: a first lens element, a second lens element, a third lens element, a fourth lens element, a fifth lens element, a sixth lens element, a seventh lens element and an eighth lens element. The eight lens elements each have an object-side surface facing toward the object side and an image-side surface facing toward the image side. The first lens element has positive refractive power. The fifth lens element has positive refractive power. The object-side surface of the seventh lens element is convex in a paraxial region thereof. The image-side surface of the eighth lens element is concave in a paraxial region thereof. At least one lens surface of at least one lens element of the photographing optical system has at least one critical point in an off-axis region thereof.

20 Claims, 25 Drawing Sheets

(51) Int. Cl.
*G02B 27/00* (2006.01)
*G02B 15/14* (2006.01)

(56) References Cited

U.S. PATENT DOCUMENTS

| | | | |
|---|---|---|---|
| 5,499,140 A | 3/1996 | Betensky | |
| 5,684,635 A | 11/1997 | Sugawara | |
| 5,822,129 A | 10/1998 | Sekine | |
| 5,959,782 A | 9/1999 | Hankawa | |
| 6,124,985 A | 9/2000 | Abe | |
| 8,000,037 B2 | 8/2011 | Hirao et al. | |
| 9,523,841 B1 | 12/2016 | Chen | |
| 9,835,822 B2 | 12/2017 | Huang | |
| 10,571,661 B2 | 2/2020 | Huang | |
| 10,705,319 B2 | 7/2020 | Jhang et al. | |
| 2009/0059393 A1 | 3/2009 | Obama et al. | |
| 2018/0074299 A1 | 3/2018 | Huang | |
| 2019/0056568 A1 | 2/2019 | Huang | |
| 2019/0101729 A1 | 4/2019 | Hsieh et al. | |
| 2019/0107690 A1 | 4/2019 | Wenren | |
| 2019/0121098 A1 | 4/2019 | Zhou et al. | |
| 2019/0204558 A1 | 7/2019 | Jhang et al. | |
| 2019/0204560 A1 | 7/2019 | Jhang et al. | |
| 2020/0132969 A1* | 4/2020 | Huang | H01L 27/14627 |
| 2020/0174227 A1 | 6/2020 | Nitta | |
| 2020/0209554 A1 | 7/2020 | Ko et al. | |
| 2020/0393648 A1 | 12/2020 | Lin | |
| 2021/0157104 A1* | 5/2021 | Jung | G02B 9/64 |
| 2021/0181471 A1 | 6/2021 | Zhao | |
| 2021/0191083 A1 | 6/2021 | Zhang | |

FOREIGN PATENT DOCUMENTS

| | | |
|---|---|---|
| CN | 108761730 A | 11/2018 |
| CN | 108983399 A | 12/2018 |
| CN | 109239891 A | 1/2019 |
| CN | 109358410 A | 2/2019 |
| CN | 109407267 A | 3/2019 |
| CN | 109581631 A | 4/2019 |
| CN | 109765679 A | 5/2019 |
| CN | 110068915 A | 7/2019 |
| CN | 209297019 U | 8/2019 |
| CN | 110426822 A | 11/2019 |
| CN | 110456490 A | 11/2019 |
| CN | 110471168 A | 11/2019 |
| CN | 110515187 A | 11/2019 |
| CN | 110554485 A | 12/2019 |
| CN | 110632742 A | 12/2019 |
| CN | 110646921 A | 1/2020 |
| JP | 01-142518 A | 6/1989 |
| JP | H01-142518 A | 6/1989 |
| JP | H02-285313 A | 11/1990 |
| JP | H05-093862 A | 4/1993 |
| JP | 2009192996 A | 8/2009 |
| JP | 2014-145954 A | 8/2014 |
| JP | 2015-158587 A | 9/2015 |
| TW | 201816455 A | 5/2018 |
| WO | 2019/100868 | 5/2019 |
| WO | 2019/100868 A1 | 5/2019 |
| WO | 2020019705 A | 1/2020 |

OTHER PUBLICATIONS

CN Office Action dated Sep. 28, 2021 as received in Application No. 201911183015.5.

* cited by examiner

PHOTOGRAPHING OPTICAL SYSTEM

RELATED APPLICATIONS

This application is a continuation patent application of U.S. application Ser. No. 16/734,132 filed on Jan. 3, 2020, which claims priority to Taiwan Application 108143234, filed on Nov. 27, 2019, which is incorporated by reference herein in its entirety.

BACKGROUND

Technical Field

The present disclosure relates to a photographing optical system, an image capturing unit and an electronic device, more particularly to a photographing optical system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical system includes eight lens elements. The eight lens elements are, in order from an object side to an image side, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has positive refractive power. The fifth lens element has positive refractive power. The object-side surface of the seventh lens element is convex in a paraxial region thereof. The image-side surface of the eighth lens element is concave in a paraxial region thereof. At least one lens surface of at least one lens element of the photographing optical system has at least one critical point in an off-axis region thereof.

When an Abbe number of the second lens element is V2, a focal length of the first lens element is f1, a focal length of the fifth lens element is f5, a central thickness of the second lens element is CT2, a central thickness of the third lens element is CT3, a central thickness of the fifth lens element is CT5, and a central thickness of the seventh lens element is CT7, the following conditions are satisfied:

$10.0 < V2 < 50.0$;

$0 < f5/f1 < 3.0$;

$0.10 < CT3/CT2 < 1.5$; and $0.10 < CT7/CT5 < 1.3$.

According to another aspect of the present disclosure, a photographing optical system includes eight lens elements. The eight lens elements are, in order from an object side to an image side, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has positive refractive power. The object-side surface of the second lens element is convex in a paraxial region thereof. The fifth lens element has positive refractive power. The object-side surface of the seventh lens element is convex in a paraxial region thereof. The image-side surface of the eighth lens element is concave in a paraxial region thereof. At least one lens surface of at least one lens element of the photographing optical system has at least one critical point in an off-axis region thereof.

When an Abbe number of the second lens element is V2, a focal length of the photographing optical system is f, a focal length of the first lens element is f1, a focal length of the fifth lens element is f5, a focal length of the seventh lens element is f7, a focal length of the eighth lens element is f8, and a curvature radius of the object-side surface of the second lens element is R3, the following conditions are satisfied:

$10.0 < V2 < 50.0$;

$0 < f5/f1 < 9.5$;

$-7.5 < f8/f7 < -0.55$; and $0 < R3/f < 2.0$.

According to another aspect of the present disclosure, a photographing optical system includes eight lens elements. The eight lens elements are, in order from an object side to an image side, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has positive refractive power. The fifth lens element has positive refractive power. The object-side surface of the seventh lens element is convex in a paraxial region thereof. The image-side surface of the eighth lens element is concave in a paraxial region thereof. At least one lens surface of at least one lens element of the photographing optical system has at least one critical point in an off-axis region thereof.

When an Abbe number of the second lens element is V2, a focal length of the first lens element is f1, a focal length of the fifth lens element is f5, a central thickness of the third lens element is CT3, a central thickness of the fifth lens element is CT5, and a central thickness of the seventh lens element is CT7, the following conditions are satisfied:

$10.0 < V2 < 50.0$;

$0 < f5/f1 < 3.0$;

$1.8 < CT5/CT3$; and $0.10 < CT7/CT5 < 1.3$.

According to another aspect of the present disclosure, an image capturing unit includes one of the aforementioned photographing optical systems and an image sensor, wherein the image sensor is disposed on an image surface of the photographing optical system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photographing optical system includes eight lens elements. The eight lens elements are, in order from an object side to an image side, a first lens element, a second lens element, a third lens element, a fourth lens element, a fifth lens element, a sixth lens element, a seventh lens element and an eighth lens element. Each of the eight lens elements has an object-side surface facing toward the object side and an image-side surface facing toward the image side.

The first lens element has positive refractive power. Therefore, it is favorable for reducing the size of the photographing optical system. The object-side surface of the first lens element can be convex in a paraxial region thereof. Therefore, it is favorable for light from various regions within the field of view to enter the photographing optical system evenly so as to increase peripheral relative illuminance of the image surface.

The object-side surface of the second lens element can be convex in a paraxial region thereof. Therefore, it is favorable for correcting aberrations when collaborating with the first lens element. The image-side surface of the second lens element can be concave in a paraxial region thereof. Therefore, it is favorable for correcting aberrations such as astigmatism.

The fifth lens element has positive refractive power. Therefore, it is favorable for reducing the size of the photographing optical system.

The seventh lens element can have positive refractive power. Therefore, it is favorable for dispersing the positive refractive power distribution so as to reduce sensitivity of each lens elements while reducing the size of the photographing optical system. The object-side surface of the seventh lens element is convex in a paraxial region thereof. Therefore, it is favorable for adjusting the refractive power of the seventh lens element and correcting off-axis aberrations. The eighth lens element can have negative refractive power. Therefore, it is favorable for balancing the refractive power distribution on the image side of the photographing optical system so as to reduce aberrations such as spherical aberration. The image-side surface of the eighth lens element is concave in a paraxial region thereof. Therefore, it is favorable for adjusting the back focal length and correcting off-axis aberrations such as field curvature.

Figure 25:
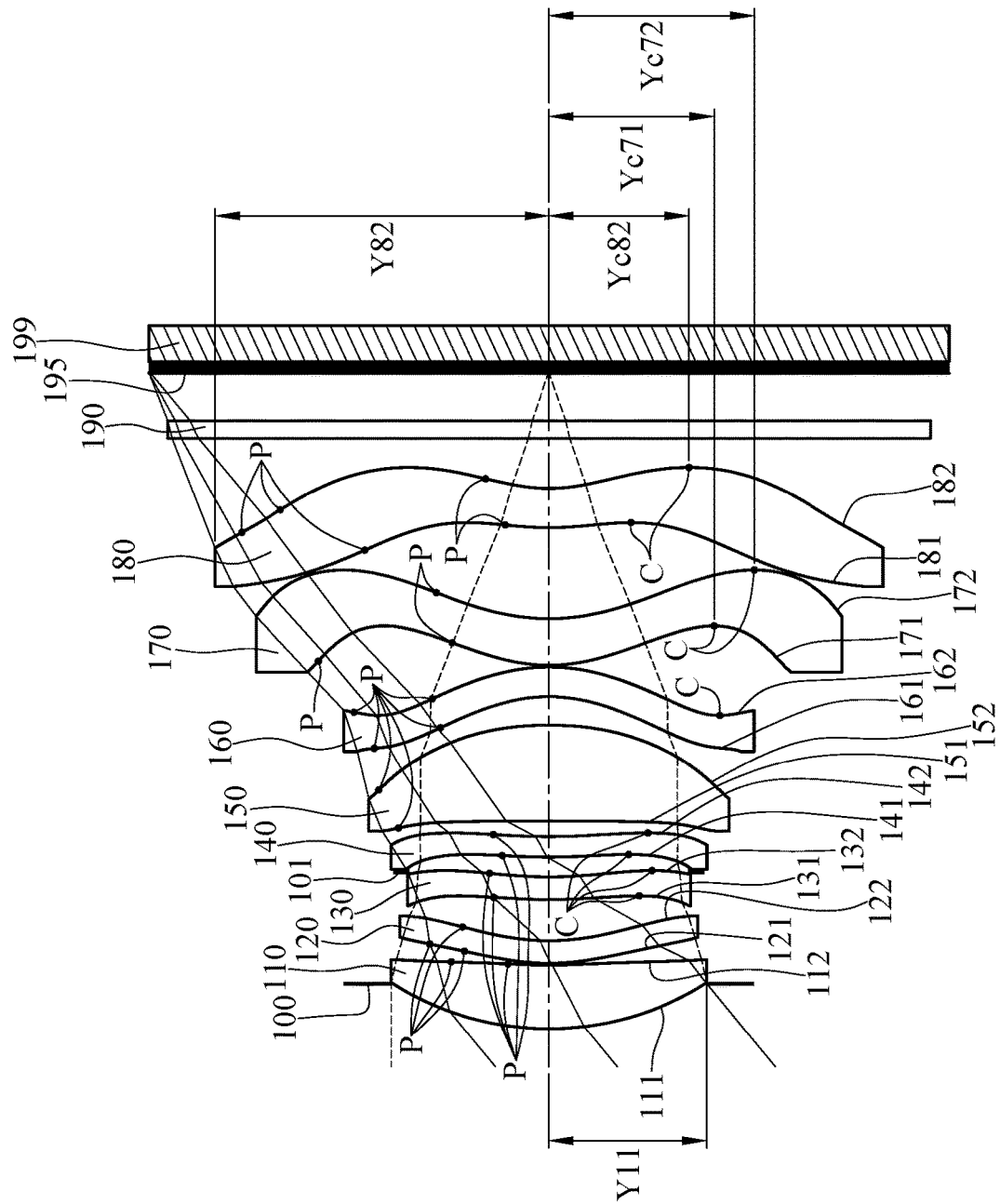
FIG. 25 shows a schematic view of Y11, Y82, Yc71, Yc72 and Yc82, as well as several inflection points and critical points of the lens elements according to the 1st embodiment of the present disclosure.

According to the present disclosure, at least one of the object-side surface and the image-side surface of at least one lens element of the photographing optical system has at least one critical point in an off-axis region thereof. Therefore, it is favorable for increasing surface shape variation of the lens element so as to correct off-axis aberrations and increase peripheral illuminance of the image surface. Moreover, at least one of the object-side surface and the image-side surface of each of at least two lens elements of the photographing optical system can have at least one critical point in an off-axis region thereof. Moreover, at least one of the object-side surface and the image-side surface of each of at least three lens elements of the photographing optical system can have at least one critical point in an off-axis region thereof. Moreover, at least one of the object-side surface and the image-side surface of the sixth lens element can have at least one critical point in an off-axis region thereof. Therefore, it is favorable for adjusting the size distribution on the image-side of the photographing optical system. Moreover, the object-side surface of the seventh lens element can have at least one critical point in an off-axis region thereof. Therefore, it is favorable for adjusting the incident angle of light on the seventh lens element so as to reduce stray light. Moreover, the image-side surface of the seventh lens element can have at least one critical point in an off-axis region thereof. Therefore, it is favorable for further correcting off-axis aberrations when collaborating with the eighth lens element. Moreover, when a vertical distance between the critical point on the object-side surface of the seventh lens element and an optical axis is Yc71, and a vertical distance between the critical point on the image-side surface of the seventh lens element and the optical axis is Yc72, the at least one critical point in the off-axis region of the object-side surface and the at least one critical point in the off-axis region of the image-side surface of the seventh lens element can satisfy the following condition: 0.80<Yc72/Yc71<1.5. Therefore, it is favorable for adjusting the surface shape of the seventh lens element so as to further correct off-axis aberrations. Moreover, the at least one critical point in the off-axis region of the object-side surface and the at least one critical point in the off-axis region of the image-side surface of the seventh lens element can also satisfy the following condition: 0.90<Yc72/Yc71<1.4. Moreover, the image-side surface of the eighth lens element can have at least one critical point in an off-axis region thereof. Therefore, it is favorable for correcting off-axis aberrations and adjusting the incident angle on the image surface so as to increase image surface illuminance and the response efficiency of the image sensor. Moreover, when a vertical distance between the critical point on the image-side surface of the eighth lens element and the optical axis is Yc82, and a maximum effective radius of the image-side surface of the eighth lens element is Y82, the at least one critical point in the off-axis region of the image-side surface of the eighth lens element can satisfy the following condition: 0.20<Yc82/Y82<0.60. Therefore, it is favorable for adjusting the surface shape of the eighth lens element so as to further increase image quality. Moreover, the at least one critical point in the off-axis region of the image-side surface of the eighth lens element can also satisfy the following condition: 0.30<Yc82/Y82<0.50. Please refer to FIG. 25, which shows a schematic view of several critical points C of the third lens element 130, the fourth lens element 140, the sixth lens element 160, the seventh lens element 170 and the eighth lens element 180, as well as Yc71, Yc72, Yc82 and Y82 according to the 1st embodiment of the present disclosure.

According to the present disclosure, at least one of the object-side surface and the image-side surface of each of at least three lens elements of the photographing optical system can have at least one inflection point. Therefore, it is favorable for increasing the surface shape variation of the lens element so as to correct aberrations and reduce the system size. Moreover, at least one of the object-side surface and the image-side surface of each of at least four lens elements of the photographing optical system can have at least one inflection point. Moreover, at least one of the object-side surface and the image-side surface of each of at least five lens elements of the photographing optical system can have at least one inflection point. Moreover, each of the object-side surface and the image-side surface of each of all lens elements of the photographing optical system can have at least one inflection point. Therefore, it is favorable for further increasing the surface shape variation of the lens elements so as to correct aberrations and reduce the system size. Please refer to FIG. 25, which shows a schematic view of several inflection points P of all lens elements according to the 1st embodiment of the present disclosure.

An axial distance between the seventh lens element and the eighth lens element can be a maximum value among axial distances between each of all adjacent lens elements of the photographing optical system. Therefore, it is favorable for adjusting the lens elements distribution so as to increase the image surface area and correct off-axis aberrations. In the present disclosure, an axial distance between two adjacent lens elements is an axial distance between two adjacent lens surfaces of the two adjacent lens elements.

When an Abbe number of the second lens element is V2, the following condition is satisfied: 10.0<V2<50.0. Therefore, it is favorable for adjusting the material of the second lens element so as to correct aberrations such as chromatic aberration. Moreover, the following condition can also be satisfied: 11.0<V2<40.0. Moreover, the following condition can also be satisfied: 12.0<V2<30.0. Moreover, the following condition can also be satisfied: 13.0<V2<25.0.

When a focal length of the first lens element is f1, and a focal length of the fifth lens element is f5, the following condition is satisfied: 0<f5/f1; or f5/f1<9.5. Therefore, it is favorable for adjusting the refractive power distribution of the photographing optical system so as to reduce the system size and adjust the system size distribution. Moreover, the following condition can also be satisfied: 0.10<f5/f1. Moreover, the following condition can also be satisfied: 0.30<f5/f1. Moreover, the following condition can also be satisfied: 0.50<f5/f1. Moreover, the following condition can also be satisfied: f5/f1<5.0. Moreover, the following condition can also be satisfied: f5/f1<3.0. Moreover, the following condition can also be satisfied: f5/f1<2.0. Moreover, the following condition can also be satisfied: 0<f5/f1<9.5. Moreover, the following condition can also be satisfied: 0<f5/f1<3.0. Moreover, the following condition can also be satisfied: 0.10<f5/f1<5.0. Moreover, the following condition can also be satisfied: 0.30<f5/f1<2.0.

When a central thickness of the fifth lens element is CT5, and a central thickness of the seventh lens element is CT7, the following condition can be satisfied: 0.10<CT7/CT5<1.3. Therefore, it is favorable for adjusting the lens elements distribution on the image side of the photographing optical system so as to reduce the size of the image side. Moreover, the following condition can also be satisfied: 0.20<CT7/CT5<1.0. Moreover, the following condition can also be satisfied: 0.40<CT7/CT5<0.70.

When a central thickness of the second lens element is CT2, and a central thickness of the third lens element is CT3, the following condition can be satisfied: 0.10<CT3/CT2<1.5. Therefore, it is favorable for the second and third lens elements to collaborate with each other so as to reduce the size on the object side of the photographing optical system. Moreover, the following condition can also be satisfied: 0.60<CT3/CT2<1.5. Moreover, the following condition can also be satisfied: 0.80<CT3/CT2<1.5.

When a focal length of the seventh lens element is f7, and a focal length of the eighth lens element is f8, the following condition can be satisfied: −7.5<f8/f7<−0.55. Therefore, it is favorable for the refractive power of the seventh and eighth lens elements to collaborate with each other so as to correct aberrations such as spherical aberration. Moreover, the following condition can also be satisfied: −4.0<f8/f7<−0.60. Moreover, the following condition can also be satisfied: −1.5<f8/f7<−0.65.

When a curvature radius of the object-side surface of the second lens element is R3, and a focal length of the photographing optical system is f, the following condition can be satisfied: 0<R3/f<2.0. Therefore, it is favorable for adjusting the surface shape and refractive power of the second lens element so as to correct aberrations. Moreover, the following condition can also be satisfied: 0.15<R3/f<1.4. Moreover, the following condition can also be satisfied: 0.30<R3/f<0.90.

When the central thickness of the third lens element is CT3, and the central thickness of the fifth lens element is CT5, the following condition can be satisfied: 1.0<CT5/CT3; or CT5/CT3<10. Therefore, it is favorable for the third and fifth lens elements to collaborate with each other so as to obtain a balance between the size distribution on the object side and the image side of the photographing optical system. Moreover, the following condition can also be satisfied: 1.5<CT5/CT3. Moreover, the following condition can also be satisfied: 1.8<CT5/CT3. Moreover, the following condition can also be satisfied: 2.0<CT5/CT3. Moreover, the following condition can also be satisfied: 2.2<CT5/CT3. Moreover, the following condition can also be satisfied: CT5/CT3<5.0. Moreover, the following condition can also be satisfied: CT5/CT3<4.5. Moreover, the following condition can also be satisfied: 1.0<CT5/CT3<5.0. Moreover, the following condition can also be satisfied: 2.0<CT5/CT3<5.0.

When the Abbe number of the second lens element is V2, an Abbe number of the third lens element is V3, and an Abbe number of the fourth lens element is V4, the following condition can be satisfied: 30.0<V2+V3+V4<120.0. Therefore, it is favorable for the second, third, and fourth lens elements to collaborate with one another so as to further correct chromatic aberration. Moreover, the following condition can also be satisfied: 35.0<V2+V3+V4<110.0. Moreover, the following condition can also be satisfied: 40.0<V2+V3+V4<100.0.

When an Abbe number of the first lens element is V1, the Abbe number of the second lens element is V2, the Abbe number of the third lens element is V3, the Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, and a minimum value of Vi/Ni is (Vi/Ni)min, the following condition can be satisfied: 6.0<(Vi/Ni)min<12.0, wherein i=1, 2, 3, 4, 5, 6, 7 or 8. Therefore, it is favorable for adjusting the material distribution of the photographing optical system so as to correct aberrations and reduce the system size.

When a curvature radius of the object-side surface of the fifth lens element is R9, and a curvature radius of the image-side surface of the fifth lens element is R10, the following condition can be satisfied: −1.5<(R9+R10)/(R9−R10)<1.5. Therefore, it is favorable for adjusting the surface shape of the fifth lens element so as to control the travelling direction of light, thereby obtaining a balance among the field of view, system size, and image surface size of the photographing optical system. Moreover, the following condition can also be satisfied: −1.1<(R9+R10)/(R9−R10)<1.1.

When an axial distance between the object-side surface of the first lens element and the image-side surface of the eighth lens element is TD, and the central thickness of the fifth lens element is CT5, the following condition can be satisfied: 3.0<TD/CT5<7.0. Therefore, it is favorable for adjusting the lens elements distribution so as to reduce the total track length of the photographing optical system.

When the focal length of the photographing optical system is f, a focal length of the second lens element is f2, and a focal length of the third lens element is f3, the following condition can be satisfied: |f/f2|+|f/f3|<0.70. Therefore, it is favorable for the refractive power of the second and third lens elements to collaborate with each other so as to correct aberrations.

When the focal length of the photographing optical system is f, and a composite focal length of the first lens element and the second lens element is f12, the following condition can be satisfied: 0.35<f/f12<0.75. Therefore, it is favorable for the first and second lens elements to collaborate with each other so as to reduce the size on the object side of the photographing optical system.

When half of a maximum field of view of the photographing optical system is HFOV, the following condition can be satisfied: 30.0 [deg.]<HFOV<50.0 [deg.]. Therefore, it is favorable for the photographing optical system to feature wide field of view and for preventing distortion generated due to overly wide field of view. Moreover, the following condition can also be satisfied: 35.0 [deg.]<HFOV<45.0 [deg.].

When the Abbe number of the second lens element is V2, and the refractive index of the second lens element is N2, the following condition can be satisfied: 6.0<V2/N2<15.0. Therefore, it is favorable for adjusting the material of the second lens element so as to correct aberrations such as chromatic aberration.

When the Abbe number of the sixth lens element is V6, the following condition can be satisfied: 15.0<V6<50.0. Therefore, it is favorable for adjusting the material of the sixth lens element so as to correct chromatic aberration.

When a central thickness of the first lens element is CT1, and the central thickness of the fifth lens element is CT5, the following condition can be satisfied: 1.1<CT5/CT1<2.0. Therefore, it is favorable for adjusting the lens elements distribution so as to reduce the system size. Moreover, the following condition can also be satisfied: 1.2<CT5/CT1<1.8.

When the axial distance between the object-side surface of the first lens element and the image-side surface of the eighth lens element is TD, and the focal length of the second lens element is f2, the following condition can be satisfied: −1.0<TD/f2<0.80. Therefore, it is favorable for adjusting the lens elements and the refractive power distribution so as to reduce the system size and correct aberrations. Moreover, the following condition can also be satisfied: −0.60<TD/f2<0.60.

When the focal length of the photographing optical system is f, the focal length of the second lens element is f2, the focal length of the third lens element is f3, and a focal length of the fourth lens element is f4, the following condition can be satisfied: −0.90<f/f2+f/f3+f/f4<0.20. Therefore, it is favorable for the refractive power of the second, third, and fourth lens elements to collaborate with one another so as to correct aberrations.

When the focal length of the fifth lens element is f5, and the central thickness of the fifth lens element is CT5, the following condition can be satisfied: 1.0<f5/CT5<30. Therefore, it is favorable for adjusting the refractive power of the fifth lens element so as to reduce the size of the photographing optical system. Moreover, the following condition can also be satisfied: 2.0<f5/CT5<20. Moreover, the following condition can also be satisfied: 3.0<f5/CT5<10.

When an f-number of the photographing optical system is Fno, the following condition can be satisfied: 1.0<Fno<2.2. Therefore, it is favorable for obtaining a balance between the aperture stop size and the depth of field. Moreover, the following condition can also be satisfied: 1.2<Fno<1.8.

When a maximum effective radius of the object-side surface of the first lens element is Y11, and the maximum effective radius of the image-side surface of the eighth lens element is Y82, the following condition can be satisfied: 1.8<Y82/Y11<3.0. Therefore, it is favorable for adjusting the outer diameters on the object and image sides of the photographing optical system so as to obtain a balance among the field of view, system size, and image surface size of the photographing optical system. Please refer to FIG. 25, which shows a schematic view of Y11 and Y82 according to the 1st embodiment of the present disclosure.

When a curvature radius of the object-side surface of the first lens element is R1, and a curvature radius of the image-side surface of the first lens element is R2, the following condition can be satisfied: −0.60<R1/R2<0.80. Therefore, it is favorable for adjusting the surface shape of the first lens element so as to adjust the travelling direction of light to provide a wide field of view configuration. Moreover, the following condition can also be satisfied: −0.30<R1/R2<0.70.

When the focal length of the photographing optical system is f, a curvature radius of the object-side surface of the sixth lens element is R11, and a curvature radius of the image-side surface of the sixth lens element is R12, the following condition can be satisfied: 2.5<f/|R11|+f/|R12|<7.5. Therefore, it is favorable for adjusting the surface shape and refractive power of the sixth lens element so as to correct aberrations when collaborating with the fifth lens element.

When the Abbe number of the second lens element is V2, and the Abbe number of the fourth lens element is V4, the following condition can be satisfied: 20.0<V2+V4<65.0. Therefore, it is favorable for the material of the second and fourth lens elements to collaborate with each other so as to further correct chromatic aberration. Moreover, the following condition can also be satisfied: 25.0<V2+V4<50.0.

When the central thickness of the first lens element is CT1, the central thickness of the second lens element is CT2, the central thickness of the third lens element is CT3, a central thickness of the fourth lens element is CT4, and the central thickness of the fifth lens element is CT5, the following condition can be satisfied: 0.10<(CT2+CT3+CT4)/(CT1+CT5)<1.0. Therefore, it is favorable for adjusting the lens elements distribution so as to reduce the size of the photographing optical system. Moreover, the following condition can also be satisfied: 0.20<(CT2+CT3+CT4)/(CT1+CT5)<0.75.

When a sum of central thicknesses of all lens elements of the photographing optical system is ΣCT, and the central thickness of the fifth lens element is CT5, the following condition can be satisfied: 2.5<ΣCT/CT5<6.0. Therefore, it is favorable for adjusting the lens elements distribution so as to reduce the size of the photographing optical system and provide a wide field of view configuration. Moreover, the following condition can also be satisfied: 3.0<ΣCT/CT5<5.0.

When an axial distance between the object-side surface of the first lens element and the image surface is TL, the following condition can be satisfied: 3.0 [mm]<TL<15.0 [mm]. Therefore, it is favorable for the photographing optical system to have a proper length for various applications.

When the axial distance between the object-side surface of the first lens element and the image surface is TL, and the focal length of the photographing optical system is f, the following condition can be satisfied: 1.0<TL/f<1.6. Therefore, it is favorable for obtaining a balance between the field of view and total track length.

When the axial distance between the object-side surface of the first lens element and the image surface is TL, and a maximum image height of the photographing optical system (half of a diagonal length of an effective photosensitive area of the image sensor) is ImgH, the following condition can be satisfied: 1.0<TL/ImgH<2.0. Therefore, it is favorable for obtaining a balance between the total track length and image surface size.

When the focal length of the photographing optical system is f, the focal length of the first lens element is f1, the focal length of the second lens element is f2, the focal length of the third lens element is f3, the focal length of the fourth lens element is f4, the focal length of the fifth lens element is f5, a focal length of the sixth lens element is f6, the focal length of the seventh lens element is f7, and the focal length of the eighth lens element is f8, at least one of the following conditions can be satisfied: 0.20<f/f1<1.0; −1.2<f/f2<1.2; −0.40<f/f3<0.40; −1.0<f/f4<1.0; 0.20<f/f5<1.0; −1.2<f/f6<1.0; 0<f/f7<2.0; and −2.0<f/f8<0. Therefore, it is favorable for adjusting the refractive power of the lens elements so as to correct aberrations, reduce the system size, and adjust field of view. Moreover, at least one of the following conditions can also be satisfied: 0.30<f/f1<0.90; −0.40<f/f2<0.40; −0.30<f/f3<0.30; −0.80<f/f4<0.40; 0.35<f/f5<0.90; −1.0<f/f6<0.50; 0.20<f/f7<1.8; and −1.7<f/f8<−0.30.

When the focal length of the photographing optical system is f, and a composite focal length of the second lens element and the third lens element is f23, the following condition can be satisfied: −0.40<f/f23<0.20. Therefore, it is favorable for the second and third lens elements to collaborate with each other so as to correct aberrations.

When the curvature radius of the object-side surface of the second lens element is R3, and a curvature radius of the image-side surface of the second lens element is R4, the following condition can be satisfied: 0.50<R3/R4<2.0. Therefore, it is favorable for adjusting the surface shape of the second lens element so as to correct aberrations such as astigmatism. Moreover, the following condition can also be satisfied: 0.70<R3/R4<1.5.

According to the present disclosure, the aforementioned features and conditions can be utilized in numerous combinations so as to achieve corresponding effects.

According to the present disclosure, the lens elements of the photographing optical system can be made of either glass or plastic material. When the lens elements are made of glass material, the refractive power distribution of the photographing optical system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the photographing optical system can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical system, based on the corresponding image sensor, can be flat or curved, especially a curved surface being concave facing towards the object side of the photographing optical system.

According to the present disclosure, an image correction unit, such as a field flattener, can be optionally disposed between the lens element closest to the image side of the photographing optical system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the photographing optical system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical system and thereby provides a wider field of view for the same.

According to the present disclosure, the photographing optical system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
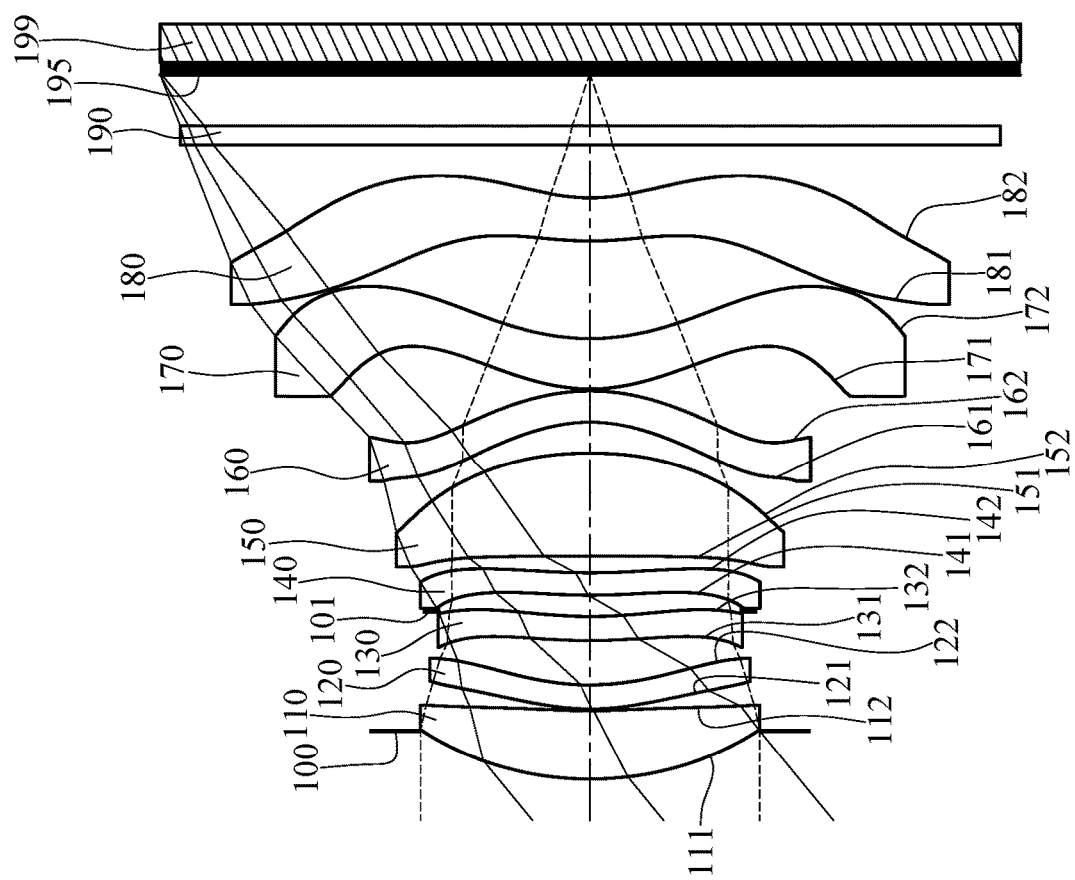
FIG. 1 is a schematic view of an image capturing unit according to the 1st embodiment of the present disclosure.
Figure 2:
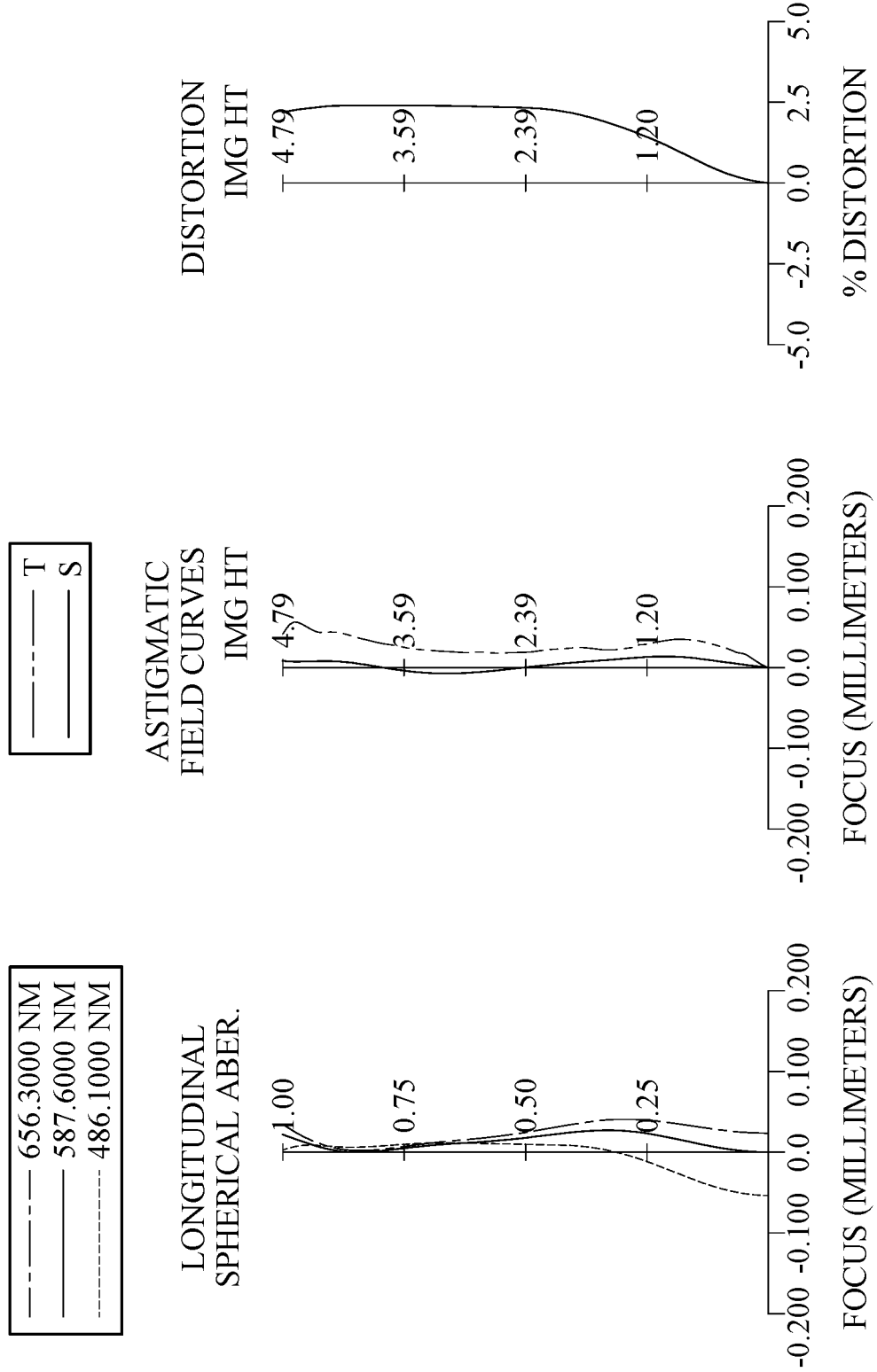
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical system (its reference numeral is omitted) of the present disclosure and an image sensor 199. The photographing optical system includes, in order from an object side to an image side, an aperture stop 100, a first lens element 110, a second lens element 120, a third lens element 130, a stop 101, a fourth lens element 140, a fifth lens element 150, a sixth lens element 160, a seventh lens element 170, an eighth lens element 180, a filter 190 and an image surface 195. The photographing optical system includes eight lens elements (110, 120, 130, 140, 150, 160, 170 and 180) with no additional lens element disposed between each of the adjacent eight lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The image-side surface 112 of the first lens element 110 has two inflection points.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has two inflection points. The image-side surface 122 of the second lens element 120 has one inflection point.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has one inflection point. The object-side surface 131 of the third lens element 130 has one critical point in an off-axis region thereof. The image-side surface 132 of the third lens element 130 has one critical point in an off-axis region thereof.

The fourth lens element 140 with positive refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has one inflection point. The image-side surface 142 of the fourth lens element 140 has one inflection point. The object-side surface 141 of the fourth lens element 140 has one critical point in an off-axis region thereof. The image-side surface 142 of the fourth lens element 140 has one critical point in an off-axis region thereof.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has one inflection point. The image-side surface 152 of the fifth lens element 150 has one inflection point.

The sixth lens element 160 with negative refractive power has an object-side surface 161 being concave in a paraxial region thereof and an image-side surface 162 being convex in a paraxial region thereof. The sixth lens element 160 is made of plastic material and has the object-side surface 161 and the image-side surface 162 being both aspheric. The object-side surface 161 of the sixth lens element 160 has two inflection points. The image-side surface 162 of the sixth lens element 160 has two inflection points. The image-side surface 162 of the sixth lens element 160 has one critical point in an off-axis region thereof.

The seventh lens element 170 with positive refractive power has an object-side surface 171 being convex in a paraxial region thereof and an image-side surface 172 being concave in a paraxial region thereof. The seventh lens element 170 is made of plastic material and has the object-side surface 171 and the image-side surface 172 being both aspheric. The object-side surface 171 of the seventh lens element 170 has two inflection points. The image-side surface 172 of the seventh lens element 170 has one inflection point. The object-side surface 171 of the seventh lens element 170 has one critical point in an off-axis region thereof. The image-side surface 172 of the seventh lens element 170 has one critical point in an off-axis region thereof.

The eighth lens element 180 with negative refractive power has an object-side surface 181 being convex in a paraxial region thereof and an image-side surface 182 being concave in a paraxial region thereof. The eighth lens element 180 is made of plastic material and has the object-side surface 181 and the image-side surface 182 being both aspheric. The object-side surface 181 of the eighth lens element 180 has two inflection points. The image-side surface 182 of the eighth lens element 180 has three inflection points. The object-side surface 181 of the eighth lens element 180 has one critical point in an off-axis region thereof. The image-side surface 182 of the eighth lens element 180 has one critical point in an off-axis region thereof.

The filter 190 is made of glass material and located between the eighth lens element 180 and the image surface 195, and will not affect the focal length of the photographing optical system. The image sensor 199 is disposed on or near the image surface 195 of the photographing optical system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is a displacement in parallel with an optical axis from an axial vertex on the aspheric surface to a point at a distance of Y from the optical axis on the aspheric surface;
Y is a vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18 and 20.

In the photographing optical system of the image capturing unit according to the 1st embodiment, when a focal length of the photographing optical system is f, an f-number of the photographing optical system is Fno, and half of a maximum field of view of the photographing optical system is HFOV, these parameters have the following values: f=5.69 millimeters (mm), Fno=1.51, HFOV=39.4 degrees (deg.).

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the seventh lens element 170 is V7, an Abbe number of the eighth lens element 180 is V8, an Abbe number of the i-th lens element is Vi, a refractive index of the first lens element 110 is N1, a refractive index of the second lens element 120 is N2, a refractive index of the third lens element 130 is N3, a refractive index of the fourth lens element 140 is N4, a refractive index of the fifth lens element 150 is N5, a refractive index of the sixth lens element 160 is N6, a refractive index of the seventh lens element 170 is N7, a refractive index of the eighth lens element 180 is N8, a refractive index of the i-th lens element is Ni, and a minimum value of Vi/Ni is (Vi/Ni)min, the following condition is satisfied: (Vi/Ni)min=10.90. In this embodiment, (Vi/Ni)min is equal to V3/N3, V4/N4 and V6/N6.

When the Abbe number of the second lens element 120 is V2, the following condition is satisfied: V2=20.4.

When the Abbe number of the second lens element 120 is V2, the Abbe number of the third lens element 130 is V3, and the Abbe number of the fourth lens element 140 is V4, the following condition is satisfied: V2+V3+V4=57.2.

When the Abbe number of the second lens element 120 is V2, and the Abbe number of the fourth lens element 140 is V4, the following condition is satisfied: V2+V4=38.8.

When the Abbe number of the second lens element 120 is V2, and the refractive index of the second lens element 120 is N2, the following condition is satisfied: V2/N2=12.29.

When the Abbe number of the sixth lens element 160 is V6, the following condition is satisfied: V6=18.4.

When a sum of central thicknesses of all lens elements of the photographing optical system is ΣCT, and a central thickness of the fifth lens element 150 is CT5, the following condition is satisfied: ΣCT/CT5=3.56. In this embodiment, ΣCT is a sum of central thicknesses of the first lens element 110, the second lens element 120, the third lens element 130, the fourth lens element 140, the fifth lens element 150, the sixth lens element 160, the seventh lens element 170 and the eighth lens element 180.

When the central thickness of the first lens element 110 is CT1, the central thickness of the second lens element 120 is CT2, the central thickness of the third lens element 130 is CT3, the central thickness of the fourth lens element 140 is CT4, and the central thickness of the fifth lens element 150 is CT5, the following condition is satisfied: (CT2+CT3+CT4)/(CT1+CT5)=0.41.

When the central thickness of the second lens element 120 is CT2, and the central thickness of the third lens element 130 is CT3, the following condition is satisfied: CT3/CT2=1.00.

When the central thickness of the first lens element 110 is CT1, and the central thickness of the fifth lens element 150 is CT5, the following condition is satisfied: CT5/CT1=1.50.

When the central thickness of the third lens element 130 is CT3, and the central thickness of the fifth lens element 150 is CT5, the following condition is satisfied: CT5/CT3=4.25.

When the central thickness of the fifth lens element 150 is CT5, and the central thickness of the seventh lens element 170 is CT7, the following condition is satisfied: CT7/CT5=0.49.

When an axial distance between the object-side surface 111 of the first lens element 110 and the image-side surface 182 of the eighth lens element 180 is TD, and the central thickness of the fifth lens element 150 is CT5, the following condition is satisfied: TD/CT5=5.64.

When the axial distance between the object-side surface 111 of the first lens element 110 and the image-side surface 182 of the eighth lens element 180 is TD, and a focal length of the second lens element 120 is f2, the following condition is satisfied: TD/f2=0.23.

When an axial distance between the object-side surface 111 of the first lens element 110 and the image surface 195 is TL, the following condition is satisfied: TL=7.85 [mm].

When the axial distance between the object-side surface 111 of the first lens element 110 and the image surface 195 is TL, and the focal length of the photographing optical system is f, the following condition is satisfied: TL/f=1.38.

When the axial distance between the object-side surface 111 of the first lens element 110 and the image surface 195 is TL, and a maximum image height of the photographing optical system is ImgH, the following condition is satisfied: TL/ImgH=1.64.

When a curvature radius of the object-side surface 111 of the first lens element 110 is R1, and a curvature radius of the image-side surface 112 of the first lens element 110 is R2, the following condition is satisfied: R1/R2=0.55.

When a curvature radius of the object-side surface 121 of the second lens element 120 is R3, and the focal length of the photographing optical system is f, the following condition is satisfied: R3/f=0.47.

When the curvature radius of the object-side surface 121 of the second lens element 120 is R3, and a curvature radius of the image-side surface 122 of the second lens element 120 is R4, the following condition is satisfied: R3/R4=0.90.

When a curvature radius of the object-side surface 151 of the fifth lens element 150 is R9, and a curvature radius of the image-side surface 152 of the fifth lens element 150 is R10, the following condition is satisfied: (R9+R10)/(R9−R10)=1.03.

When the focal length of the photographing optical system is f, and a focal length of the first lens element 110 is f1, the following condition is satisfied: f/f1=0.42.

When the focal length of the photographing optical system is f, and the focal length of the first lens element 120 is f2, the following condition is satisfied: f/f2=0.20.

When the focal length of the photographing optical system is f, the focal length of the second lens element 120 is f2, and a focal length of the third lens element 130 is f3, the following condition is satisfied: |f/f2|+|f/f3|=0.40.

When the focal length of the photographing optical system is f, the focal length of the second lens element 120 is f2, the focal length of the third lens element 130 is f3, and a focal length of the fourth lens element 140 is f4, the following condition is satisfied: f/f2+f/f3+f/f4=0.02.

When the focal length of the photographing optical system is f, and the focal length of the third lens element 130 is f3, the following condition is satisfied: f/f3=−0.20.

When the focal length of the photographing optical system is f, and the focal length of the fourth lens element 140 is f4, the following condition is satisfied: f/f4=0.02.

When the focal length of the photographing optical system is f, and a focal length of the fifth lens element 150 is f5, the following condition is satisfied: f/f5=0.73.

When the focal length of the photographing optical system is f, and a focal length of the sixth lens element 160 is f6, the following condition is satisfied: f/f6=−0.27.

When the focal length of the photographing optical system is f, and a focal length of the seventh lens element 170 is f7, the following condition is satisfied: f/f7=0.48.

When the focal length of the photographing optical system is f, and a focal length of the eighth lens element 180 is f8, the following condition is satisfied: f/f8=−0.66.

When the focal length of the photographing optical system is f, and a composite focal length of the first lens element 110 and the second lens element 120 is f12, the following condition is satisfied: f/f12=0.62.

When the focal length of the photographing optical system is f, and a composite focal length of the second lens element 120 and the third lens element 130 is f23, the following condition is satisfied: f/f23=0.02.

When the focal length of the photographing optical system is f, a curvature radius of the object-side surface 161 of the sixth lens element 160 is R11, and a curvature radius of the image-side surface 162 of the sixth lens element 160 is R12, the following condition is satisfied: f/|R11|+f/|R12|=5.69.

When the focal length of the fifth lens element 150 is f5, and the central thickness of the fifth lens element 150 is CT5, the following condition is satisfied: f5/CT5=6.84.

When the focal length of the first lens element 110 is f1, and the focal length of the fifth lens element 150 is f5, the following condition is satisfied: f5/f1=0.58.

When the focal length of the seventh lens element 170 is f7, and the focal length of the eighth lens element 180 is f8, the following condition is satisfied: f8/f7=−0.73.

When a maximum effective radius of the object-side surface 111 of the first lens element 110 is Y11, and a maximum effective radius of the image-side surface 182 of the eighth lens element 180 is Y82, the following condition is satisfied: Y82/Y11=2.12.

When a vertical distance between the critical point on the object-side surface 171 of the seventh lens element 170 and the optical axis is Yc71, and a vertical distance between the critical point on the image-side surface 172 of the seventh lens element 170 and the optical axis is Yc72, the following condition is satisfied: Yc72/Yc71=1.24.

When a vertical distance between the critical point on the image-side surface 182 of the eighth lens element 180 and the optical axis is Yc82, and the maximum effective radius of the image-side surface 182 of the eighth lens element 180 is Y82, the following condition is satisfied: Yc82/Y82=0.42.

The detailed optical data of the 1st embodiment are shown in Table 1 and the aspheric surface data are shown in Table 2 below.

TABLE 1

1st Embodiment
f = 5.69 mm, Fno = 1.51, HFOV = 39.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.538 | | | | |
| 2 | Lens 1 | 3.600 | (ASP) | 0.763 | Plastic | 1.545 | 56.1 | 13.42 |
| 3 | | 6.560 | (ASP) | 0.021 | | | | |
| 4 | Lens 2 | 2.661 | (ASP) | 0.269 | Plastic | 1.660 | 20.4 | 28.68 |
| 5 | | 2.972 | (ASP) | 0.493 | | | | |
| 6 | Lens 3 | 7.188 | (ASP) | 0.270 | Plastic | 1.686 | 18.4 | −28.78 |
| 7 | | 5.189 | (ASP) | 0.054 | | | | |
| 8 | Stop | Plano | | 0.181 | | | | |
| 9 | Lens 4 | 7.478 | (ASP) | 0.247 | Plastic | 1.686 | 18.4 | 319.11 |
| 10 | | 7.639 | (ASP) | 0.189 | | | | |
| 11 | Lens 5 | −263.852 | (ASP) | 1.148 | Plastic | 1.544 | 56.0 | 7.85 |
| 12 | | −4.210 | (ASP) | 0.344 | | | | |
| 13 | Lens 6 | −1.812 | (ASP) | 0.352 | Plastic | 1.686 | 18.4 | −20.88 |
| 14 | | −2.238 | (ASP) | 0.020 | | | | |
| 15 | Lens 7 | 2.013 | (ASP) | 0.559 | Plastic | 1.544 | 56.0 | 11.87 |
| 16 | | 2.638 | (ASP) | 1.087 | | | | |
| 17 | Lens 8 | 3.611 | (ASP) | 0.476 | Plastic | 1.566 | 37.4 | −8.69 |
| 18 | | 1.983 | (ASP) | 0.600 | | | | |
| 19 | Filter | Plano | | 0.210 | Glass | 1.517 | 64.2 | — |
| 20 | | Plano | | 0.568 | | | | |
| 21 | Image | Plano | | — | | | | | reference wavelength is 587.6 nm (d-line).
active radius of the stop 101 (Surface 8) is 1.690 mm.

TABLE 2

Aspheric Coefficients

| Surface # | 2 | 3 | 4 | 5 | 6 | 7 |
|---|---|---|---|---|---|---|
| k = | −1.5316E+00 | −2.0505E+01 | −1.9707E+00 | 3.7561E−01 | −1.7851E+00 | −1.1918E+00 |
| A4 = | 5.4169E−03 | −7.7415E−02 | −5.3318E−02 | 1.0895E−02 | −1.6493E−02 | −2.4401E−02 |
| A6 = | 3.8998E−04 | 6.9237E−02 | 1.1593E−02 | −6.4746E−02 | −1.2145E−02 | −8.7196E−03 |
| A8 = | −2.1802E−04 | −3.9281E−02 | 3.8612E−03 | 5.3696E−02 | 6.7648E−03 | 5.7511E−03 |
| A10 = | −2.9994E−05 | 1.4653E−02 | −4.9672E−03 | −2.8295E−02 | −4.9306E−03 | −4.5213E−03 |
| A12 = | 7.8712E−05 | −3.3898E−03 | 2.2673E−03 | 9.2818E−03 | 2.3840E−03 | 2.8551E−03 |
| A14 = | −2.6512E−05 | 4.3082E−04 | −5.2284E−04 | −1.7469E−03 | −6.0868E−04 | −8.6126E−04 |
| A16 = | 2.7861E−06 | −2.2144E−05 | 5.0703E−05 | 1.4354E−04 | 6.2505E−05 | 9.5014E−05 |

| Surface # | 9 | 10 | 11 | 12 | 13 | 14 |
|---|---|---|---|---|---|---|
| k = | −1.0361E+01 | −4.7713E−01 | −9.9000E+01 | −5.0143E−01 | −1.0728E+00 | −1.0268E+00 |
| A4 = | −3.0066E−02 | −2.8807E−02 | −1.4560E−02 | −3.5684E−02 | 6.2857E−02 | 3.1129E−02 |
| A6 = | −3.4948E−03 | 6.6803E−03 | 1.3312E−02 | 8.7087E−03 | −6.1731E−02 | −3.4892E−02 |
| A8 = | 2.1358E−03 | −4.4427E−03 | −8.9300E−03 | 5.6746E−03 | 5.7559E−02 | 3.2445E−02 |
| A10 = | −5.0234E−03 | 1.1418E−03 | 5.0014E−03 | −6.3903E−03 | −3.3452E−02 | −1.7643E−02 |
| A12 = | 5.0826E−03 | 8.0097E−04 | −2.0569E−03 | 2.8278E−03 | 1.2189E−02 | 5.9527E−03 |
| A14 = | −2.1194E−03 | −6.7523E−04 | 3.2985E−04 | −7.8636E−04 | −2.7249E−03 | −1.2147E−03 |
| A16 = | 3.7624E−04 | 1.6995E−04 | 3.5672E−05 | 1.4768E−04 | 3.5929E−04 | 1.4537E−04 |
| A18 = | −2.4028E−05 | −1.4523E−05 | −1.6208E−05 | −1.7067E−05 | −2.5386E−05 | −9.4402E−06 |
| A20 = | — | — | 1.2987E−06 | 9.0200E−07 | 7.2451E−07 | 2.5865E−07 |

TABLE 2-continued

| Aspheric Coefficients | | | | |
|---|---|---|---|---|
| Surface # | 15 | 16 | 17 | 18 |
| k = | −9.9019E−01 | −9.8729E−01 | −8.1861E−01 | −1.0033E+00 |
| A4 = | −4.7196E−02 | −2.6213E−03 | −9.6059E−02 | −1.0522E−01 |
| A6 = | 1.3953E−02 | −6.3230E−03 | 1.8905E−02 | 2.8532E−02 |
| A8 = | −6.5658E−03 | 1.1805E−03 | −2.1049E−03 | −6.3526E−03 |
| A10 = | 2.0216E−03 | −1.1298E−04 | 1.4038E−04 | 1.0530E−03 |
| A12 = | −4.4199E−04 | 8.8467E−06 | −4.6316E−06 | −1.2285E−04 |
| A14 = | 6.8761E−05 | −1.0998E−06 | −1.2279E−08 | 9.5584E−06 |
| A16 = | −7.1569E−06 | 1.2458E−07 | 4.6079E−09 | −4.6428E−07 |
| A18 = | 4.3612E−07 | −7.5401E−09 | −8.4513E−12 | 1.2622E−08 |
| A20 = | −1.1450E−08 | 1.7866E−10 | −3.0769E−12 | −1.4603E−10 |

In Table 1, the curvature radius, the thickness and the focal length are shown in millimeters (mm). Surface numbers 0-21 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
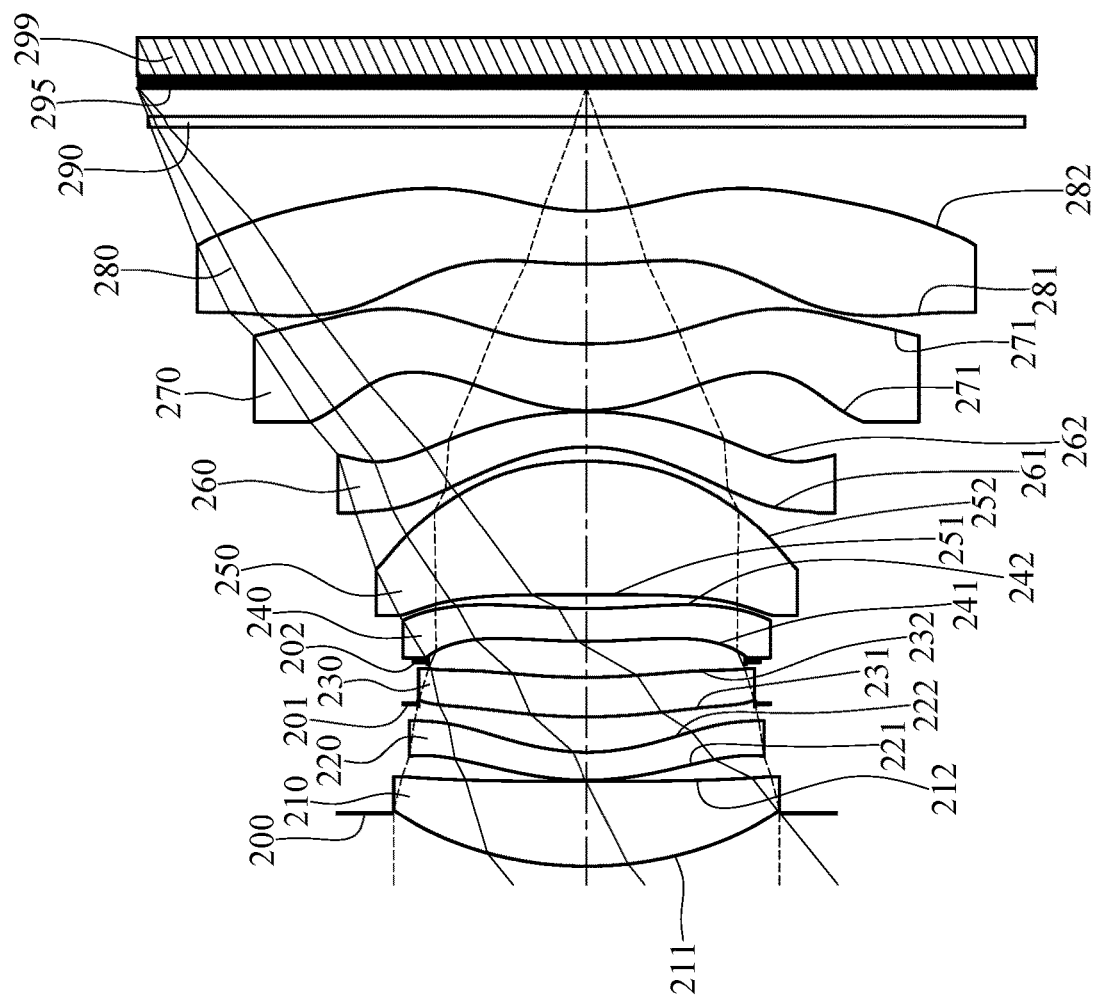
FIG. 3 is a schematic view of an image capturing unit according to the 2nd embodiment of the present disclosure.
Figure 4:
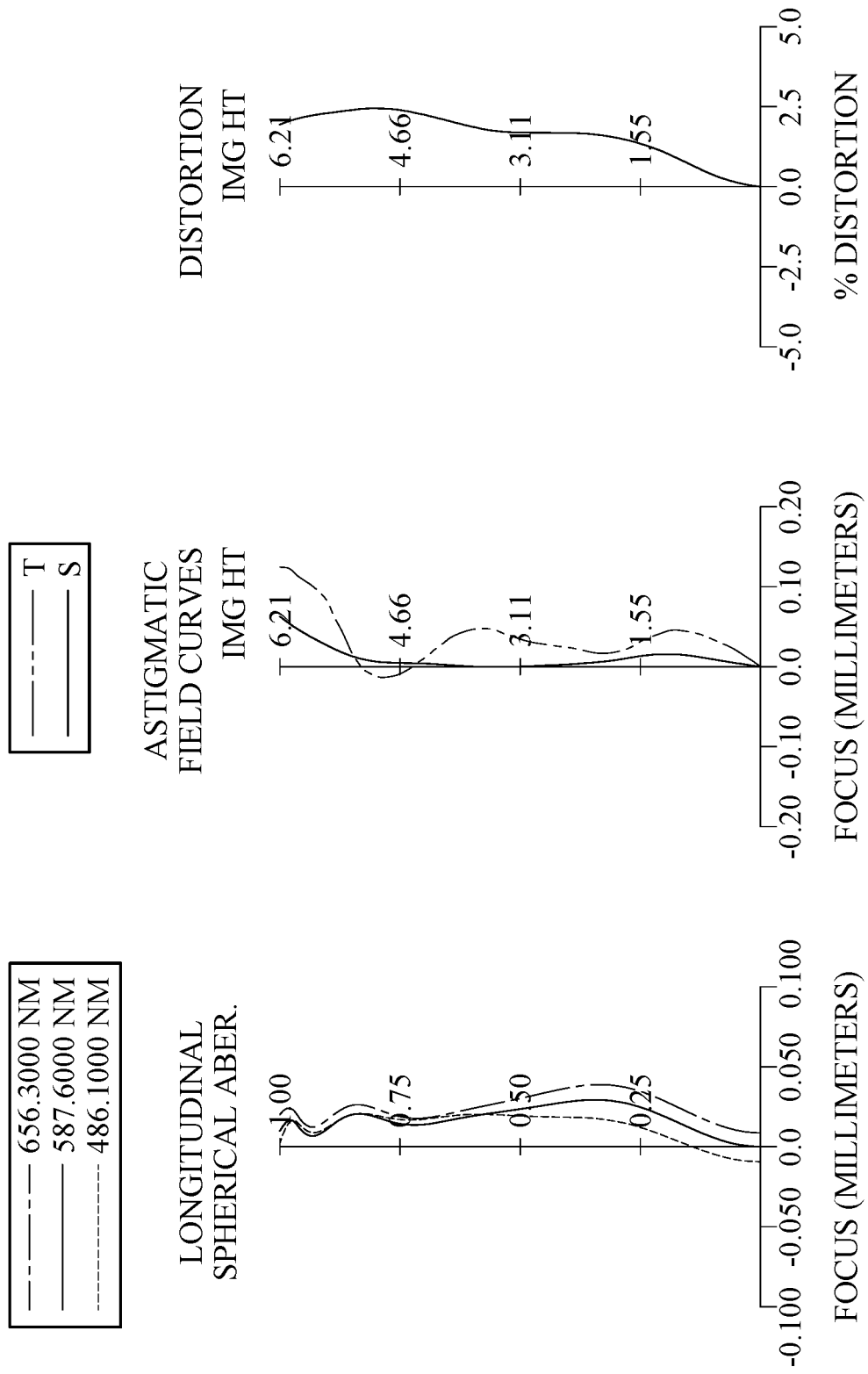
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical system (its reference numeral is omitted) of the present disclosure and an image sensor 299. The photographing optical system includes, in order from an object side to an image side, an aperture stop 200, a first lens element 210, a second lens element 220, a stop 201, a third lens element 230, a stop 202, a fourth lens element 240, a fifth lens element 250, a sixth lens element 260, a seventh lens element 270, an eighth lens element 280, a filter 290 and an image surface 295. The photographing optical system includes eight lens elements (210, 220, 230, 240, 250, 260, 270 and 280) with no additional lens element disposed between each of the adjacent eight lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric. The image-side surface 212 of the first lens element 210 has three inflection points. The image-side surface 212 of the first lens element 210 has one critical point in an off-axis region thereof.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has one inflection point. The image-side surface 222 of the second lens element 220 has one inflection point. The object-side surface 221 of the second lens element 220 has one critical point in an off-axis region thereof.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has two inflection points. The image-side surface 232 of the third lens element 230 has two inflection points.

The fourth lens element 240 with positive refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has one inflection point. The image-side surface 242 of the fourth lens element 240 has one inflection point. The object-side surface 241 of the fourth lens element 240 has one critical point in an off-axis region thereof. The image-side surface 242 of the fourth lens element 240 has one critical point in an off-axis region thereof.

The fifth lens element 250 with positive refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has one inflection point. The image-side surface 252 of the fifth lens element 250 has one inflection point.

The sixth lens element 260 with negative refractive power has an object-side surface 261 being concave in a paraxial region thereof and an image-side surface 262 being convex in a paraxial region thereof. The sixth lens element 260 is made of plastic material and has the object-side surface 261 and the image-side surface 262 being both aspheric. The object-side surface 261 of the sixth lens element 260 has two inflection points. The image-side surface 262 of the sixth lens element 260 has two inflection points. The image-side surface 262 of the sixth lens element 260 has one critical point in an off-axis region thereof.

The seventh lens element 270 with positive refractive power has an object-side surface 271 being convex in a paraxial region thereof and an image-side surface 272 being concave in a paraxial region thereof. The seventh lens element 270 is made of plastic material and has the object-side surface 271 and the image-side surface 272 being both aspheric. The object-side surface 271 of the seventh lens element 270 has two inflection points. The image-side surface 272 of the seventh lens element 270 has four inflection points. The object-side surface 271 of the seventh lens element 270 has one critical point in an off-axis region thereof. The image-side surface 272 of the seventh lens element 270 has one critical point in an off-axis region thereof.

The eighth lens element 280 with negative refractive power has an object-side surface 281 being convex in a paraxial region thereof and an image-side surface 282 being concave in a paraxial region thereof. The eighth lens element 280 is made of plastic material and has the object-side surface 281 and the image-side surface 282 being both aspheric. The object-side surface 281 of the eighth lens element 280 has three inflection points. The image-side surface 282 of the eighth lens element 280 has one inflection point. The object-side surface 281 of the eighth lens element 280 has two critical points in an off-axis region thereof. The image-side surface 282 of the eighth lens element 280 has one critical point in an off-axis region thereof.

The filter 290 is made of glass material and located between the eighth lens element 280 and the image surface 295, and will not affect the focal length of the photographing optical system. The image sensor 299 is disposed on or near the image surface 295 of the photographing optical system.

The detailed optical data of the 2nd embodiment are shown in Table 3 and the aspheric surface data are shown in Table 4 below.

TABLE 3

2nd Embodiment
f = 7.51 mm, Fno = 1.40, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.742 | | | | |
| 2 | Lens 1 | 5.317 | (ASP) | 1.181 | Plastic | 1.545 | 56.1 | 9.58 |
| 3 | | −260.138 | (ASP) | 0.015 | | | | |
| 4 | Lens 2 | 4.142 | (ASP) | 0.386 | Plastic | 1.701 | 14.8 | −20.05 |
| 5 | | 3.076 | (ASP) | 0.671 | | | | |
| 6 | Stop | Plano | | −0.181 | | | | |
| 7 | Lens 3 | 7.553 | (ASP) | 0.547 | Plastic | 1.679 | 18.4 | 146.33 |
| 8 | | 7.935 | (ASP) | 0.217 | | | | |
| 9 | Stop | Plano | | 0.283 | | | | |
| 10 | Lens 4 | 9.151 | (ASP) | 0.452 | Plastic | 1.701 | 14.8 | 357.82 |
| 11 | | 9.305 | (ASP) | 0.192 | | | | |
| 12 | Lens 5 | −224.800 | (ASP) | 1.854 | Plastic | 1.529 | 58.1 | 8.51 |
| 13 | | −4.428 | (ASP) | 0.198 | | | | |
| 14 | Lens 6 | −2.477 | (ASP) | 0.487 | Plastic | 1.639 | 23.3 | −8.83 |
| 15 | | −4.756 | (ASP) | 0.015 | | | | |
| 16 | Lens 7 | 2.762 | (ASP) | 0.920 | Plastic | 1.582 | 30.2 | 8.09 |
| 17 | | 5.862 | (ASP) | 1.103 | | | | |
| 18 | Lens 8 | 6.115 | (ASP) | 0.742 | Plastic | 1.562 | 44.6 | −9.21 |
| 19 | | 2.681 | (ASP) | 1.160 | | | | |
| 20 | Filter | Plano | | 0.145 | Glass | 1.517 | 64.2 | — |
| 21 | | Plano | | 0.393 | | | | |
| 22 | Image | Plano | | — | | | | | reference wavelength is 587.6 nm (d-line).
active radius of the stop 201 (Surface 6) is 2.327 mm.
active radius of the stop 202 (Surface 9) is 2.197 mm.

TABLE 4

Aspheric Coefficients

| Surface # | 2 | 3 | 4 | 5 | 7 | 8 |
|---|---|---|---|---|---|---|
| k = | −4.2387E−01 | 3.6069E−07 | −6.5312E−02 | −1.2296E−04 | −1.4590E+01 | −1.1188E+01 |
| A4 = | 1.1046E−03 | 1.0617E−02 | −7.2459E−03 | −2.0747E−03 | −4.8566E−03 | −1.0705E−02 |
| A6 = | −5.4784E−05 | −7.0047E−03 | −1.3240E−03 | 5.7793E−03 | 2.3956E−03 | 9.8640E−04 |
| A8 = | 1.3739E−05 | 2.8654E−03 | −5.2433E−04 | −4.2536E−03 | −8.2257E−04 | 1.0677E−03 |
| A10 = | 4.6754E−06 | −7.3218E−04 | 3.3685E−04 | 1.4547E−03 | −2.8540E−05 | −9.8270E−04 |
| A12 = | −1.9760E−06 | 1.1635E−04 | −7.1903E−05 | −2.9874E−04 | 3.8202E−05 | 3.2282E−04 |
| A14 = | 3.3785E−07 | −1.0365E−05 | 6.6162E−06 | 3.4337E−05 | −3.0007E−06 | −4.6687E−05 |
| A16 = | −1.8923E−08 | 3.8899E−07 | −2.1207E−07 | −1.6365E−06 | — | 2.5835E−06 |

| Surface # | 10 | 11 | 12 | 13 | 14 | 15 |
|---|---|---|---|---|---|---|
| k = | 1.1643E+01 | 3.2859E−01 | 9.0000E+01 | −5.4352E−01 | −9.6866E−01 | −6.7041E−01 |
| A4 = | −1.8441E−02 | −1.0217E−02 | −2.1875E−03 | −1.4989E−02 | 2.7318E−02 | 3.7977E−03 |
| A6 = | −4.8440E−03 | −7.6415E−03 | −4.3883E−03 | −5.1236E−03 | −1.4206E−02 | −4.3452E−03 |
| A8 = | 4.4350E−03 | 6.1277E−03 | 1.9688E−03 | 6.0111E−03 | 6.3816E−03 | 1.7038E−03 |
| A10 = | −2.2525E−03 | −2.6920E−03 | −2.7812E−04 | −2.4399E−03 | −1.7331E−03 | −3.2716E−04 |
| A12 = | 5.9516E−04 | 7.0304E−04 | −1.0019E−04 | 5.8136E−04 | 2.9189E−04 | 3.3374E−05 |
| A14 = | −7.7784E−05 | −1.0580E−04 | 5.0803E−05 | −8.9818E−05 | −2.9978E−05 | −1.0505E−06 |
| A16 = | 3.8510E−06 | 8.3919E−06 | −9.4496E−06 | 8.8948E−06 | 1.7909E−06 | −9.7746E−08 |

TABLE 4-continued

| Aspheric Coefficients | | | | | |
|---|---|---|---|---|---|
| A18 = | — | −2.7056E−07 | 8.4941E−07 | −5.1421E−07 | −5.5567E−08 | 9.1429E−09 |
| A20 = | — | — | −3.0361E−08 | 1.3215E−08 | 6.4700E−10 | −2.1629E−10 |

| Surface # | 16 | 17 | 18 | 19 |
|---|---|---|---|---|
| k = | −1.0382E+00 | −9.4254E−01 | −2.6935E+00 | −9.1653E−01 |
| A4 = | −1.2092E−02 | 3.0652E−02 | −3.4492E−02 | −4.4028E−02 |
| A6 = | −7.8531E−04 | −1.4098E−02 | 2.0654E−03 | 6.0916E−03 |
| A8 = | −2.4697E−04 | 2.8759E−03 | 1.7082E−04 | −7.0450E−04 |
| A10 = | 1.4113E−04 | −3.7594E−04 | −2.9240E−05 | 6.3487E−05 |
| A12 = | −2.7389E−05 | 3.2208E−05 | 1.7337E−06 | −3.9713E−06 |
| A14 = | 2.7069E−06 | −1.7693E−06 | −5.3907E−08 | 1.6049E−07 |
| A16 = | −1.4235E−07 | 5.9719E−08 | 8.8210E−10 | −3.9595E−09 |
| A18 = | 3.7582E−09 | −1.1266E−09 | −6.1047E−12 | 5.4063E−11 |
| A20 = | −3.8709E−11 | 9.0964E−12 | 2.2779E−15 | −3.1273E−13 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 7.51 | R3/R4 | 1.35 |
| Fno | 1.40 | (R9 + R10)/(R9 − R10) | 1.04 |
| HFOV [deg.] | 39.0 | f/f1 | 0.78 |
| (Vi/Ni)min | 8.70 | f/f2 | −0.37 |
| V2 | 14.8 | |f/f2| + |f/f3| | 0.43 |
| V2 + V3 + V4 | 48.0 | f/f2 + f/f3 + f/f4 | −0.30 |
| V2 + V4 | 29.6 | f/f3 | 0.05 |
| V2/N2 | 8.70 | f/f4 | 0.02 |
| V6 | 23.3 | f/f5 | 0.88 |
| ΣCT/CT5 | 3.54 | f/f6 | −0.85 |
| (CT2 + CT3 + CT4)/(CT1 + CT5) | 0.46 | f/f7 | 0.93 |
| CT3/CT2 | 1.42 | f/f8 | −0.82 |
| CT5/CT1 | 1.57 | f/f12 | 0.48 |
| CT5/CT3 | 3.39 | f/f23 | −0.33 |
| CT7/CT5 | 0.50 | f/|R11| + f/|R12| | 4.61 |
| TD/CT5 | 4.90 | f5/CT5 | 4.59 |
| TD/f2 | −0.45 | f5/f1 | 0.89 |
| TL [mm] | 10.78 | f8/f7 | −1.14 |
| TL/f | 1.43 | Y82/Y11 | 2.01 |
| TL/ImgH | 1.74 | Yc72/Yc71 | 1.13 |
| R1/R2 | −0.02 | Yc82/Y82 | 0.40 |
| R3/f | 0.55 | — | — |

3rd Embodiment

Figure 5:
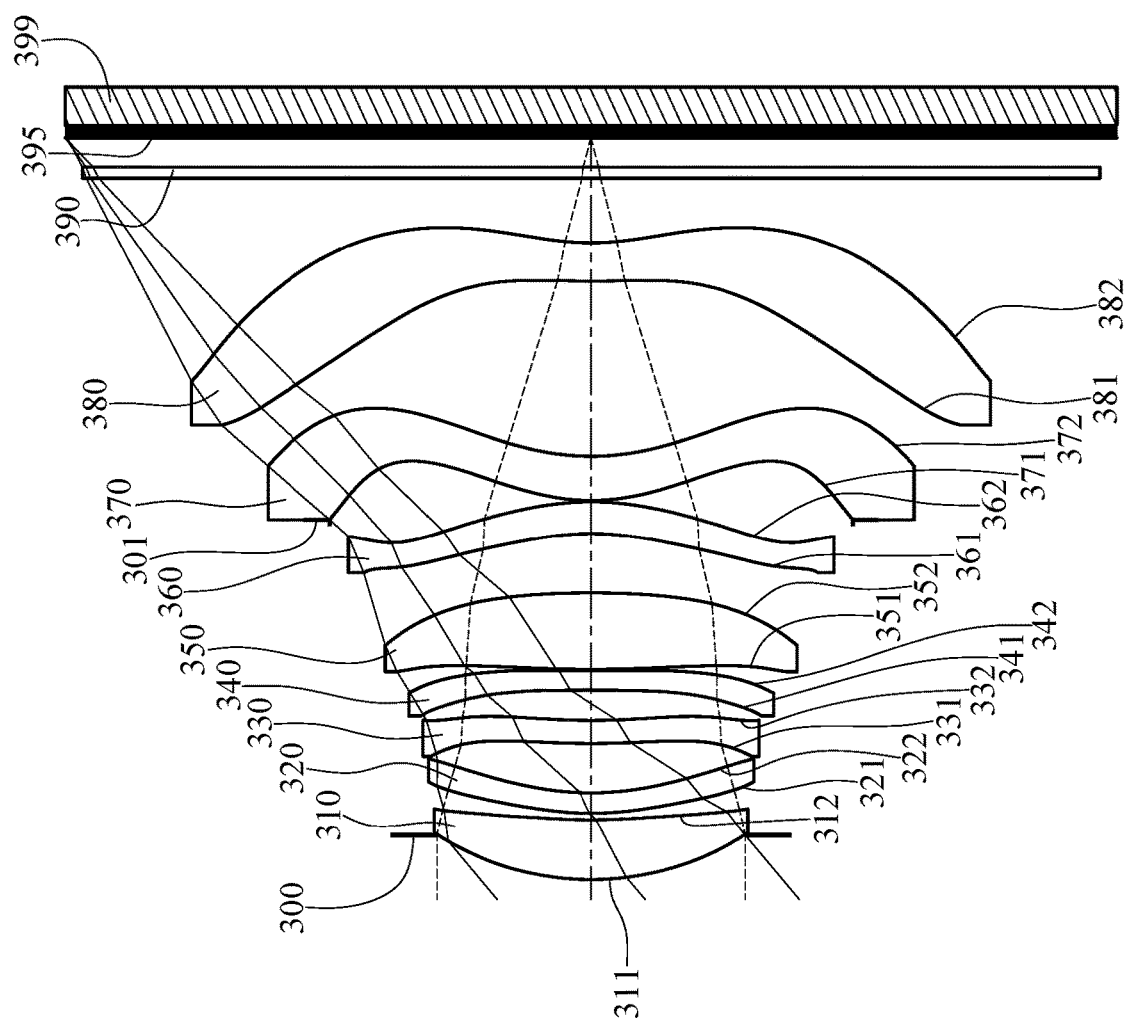
FIG. 5 is a schematic view of an image capturing unit according to the 3rd embodiment of the present disclosure.
Figure 6:
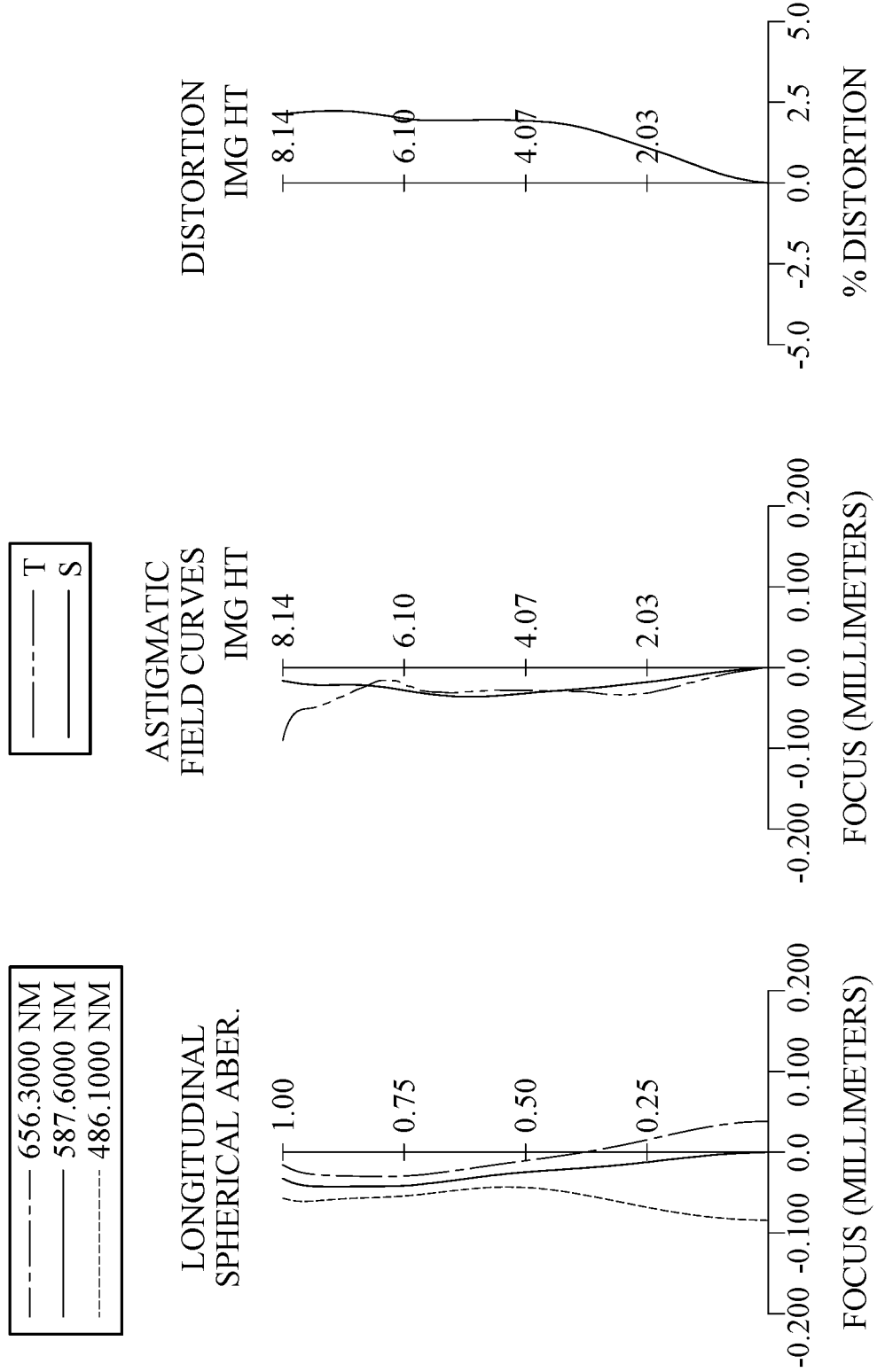
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical system (its reference numeral is omitted) of the present disclosure and an image sensor 399. The photographing optical system includes, in order from an object side to an image side, an aperture stop 300, a first lens element 310, a second lens element 320, a third lens element 330, a fourth lens element 340, a fifth lens element 350, a sixth lens element 360, a stop 301, a seventh lens element 370, an eighth lens element 380, a filter 390 and an image surface 395. The photographing optical system includes eight lens elements (310, 320, 330, 340, 350, 360, 370 and 380) with no additional lens element disposed between each of the adjacent eight lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The image-side surface 322 of the second lens element 320 has one inflection point.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has two inflection points. The object-side surface 331 of the third lens element 330 has one critical point in an off-axis region thereof. The image-side surface 332 of the third lens element 330 has two critical points in an off-axis region thereof.

The fourth lens element 340 with negative refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has three inflection points. The image-side surface 342 of the fourth lens element 340 has two critical points in an off-axis region thereof.

The fifth lens element 350 with positive refractive power has an object-side surface 351 being convex in a paraxial region thereof and an image-side surface 352 being convex in a paraxial region thereof. The fifth lens element 350 is made of glass material and has the object-side surface 351 and the image-side surface 352 being both aspheric. The object-side surface 351 of the fifth lens element 350 has two inflection points. The image-side surface 352 of the fifth lens element 350 has one inflection point. The object-side surface 351 of the fifth lens element 350 has one critical point in an off-axis region thereof.

The sixth lens element 360 with positive refractive power has an object-side surface 361 being concave in a paraxial region thereof and an image-side surface 362 being convex in a paraxial region thereof. The sixth lens element 360 is made of plastic material and has the object-side surface 361 and the image-side surface 362 being both aspheric. The object-side surface 361 of the sixth lens element 360 has two inflection points. The image-side surface 362 of the sixth lens element 360 has two inflection points. The image-side surface 362 of the sixth lens element 360 has one critical point in an off-axis region thereof.

The seventh lens element 370 with positive refractive power has an object-side surface 371 being convex in a paraxial region thereof and an image-side surface 372 being concave in a paraxial region thereof. The seventh lens element 370 is made of plastic material and has the object-side surface 371 and the image-side surface 372 being both aspheric. The object-side surface 371 of the seventh lens element 370 has three inflection points. The image-side surface 372 of the seventh lens element 370 has one inflection point. The object-side surface 371 of the seventh lens element 370 has one critical point in an off-axis region thereof. The image-side surface 372 of the seventh lens element 370 has one critical point in an off-axis region thereof.

The eighth lens element 380 with negative refractive power has an object-side surface 381 being convex in a paraxial region thereof and an image-side surface 382 being concave in a paraxial region thereof. The eighth lens element 380 is made of plastic material and has the object-side surface 381 and the image-side surface 382 being both aspheric. The object-side surface 381 of the eighth lens element 380 has four inflection points. The image-side surface 382 of the eighth lens element 380 has two inflection points. The object-side surface 381 of the eighth lens element 380 has one critical point in an off-axis region thereof. The image-side surface 382 of the eighth lens element 380 has one critical point in an off-axis region thereof.

The filter 390 is made of glass material and located between the eighth lens element 380 and the image surface 395, and will not affect the focal length of the photographing optical system. The image sensor 399 is disposed on or near the image surface 395 of the photographing optical system.

The detailed optical data of the 3rd embodiment are shown in Table 5 and the aspheric surface data are shown in Table 6 below.

TABLE 5

3rd Embodiment
f = 9.54 mm, Fno = 2.00, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.689 | | | | |
| 2 | Lens 1 | 4.425 | (ASP) | 0.932 | Plastic | 1.545 | 56.1 | 14.57 |
| 3 | | 9.250 | (ASP) | 0.103 | | | | |
| 4 | Lens 2 | 4.628 | (ASP) | 0.316 | Plastic | 1.660 | 20.4 | 540.04 |
| 5 | | 4.562 | (ASP) | 0.767 | | | | |
| 6 | Lens 3 | 13.308 | (ASP) | 0.353 | Plastic | 1.686 | 18.4 | −69.80 |
| 7 | | 10.301 | (ASP) | 0.473 | | | | |
| 8 | Lens 4 | −37.267 | (ASP) | 0.300 | Plastic | 1.686 | 18.4 | −81.05 |
| 9 | | −113.361 | (ASP) | 0.020 | | | | |
| 10 | Lens 5 | 33.431 | (ASP) | 1.180 | Glass | 1.522 | 62.2 | 19.92 |
| 11 | | −14.926 | (ASP) | 0.921 | | | | |
| 12 | Lens 6 | −4.409 | (ASP) | 0.500 | Plastic | 1.686 | 18.4 | 133.28 |
| 13 | | −4.400 | (ASP) | −0.281 | | | | |
| 14 | Stop | Plano | | 0.301 | | | | |
| 15 | Lens 7 | 3.262 | (ASP) | 0.683 | Plastic | 1.562 | 44.6 | 24.05 |
| 16 | | 3.976 | (ASP) | 2.711 | | | | |
| 17 | Lens 8 | 15.486 | (ASP) | 0.600 | Plastic | 1.582 | 30.2 | −9.46 |
| 18 | | 4.005 | (ASP) | 1.000 | | | | |
| 19 | Filter | Plano | | 0.170 | Glass | 1.517 | 64.2 | — |
| 20 | | Plano | | 0.458 | | | | |
| 21 | Image | Plano | | — | | | | | reference wavelength is 587.6 nm (d-line).
active radius of the stop 301 (Surface 14) is 4.046 mm.

TABLE 6

Aspheric Coefficients

| Surface # | 2 | 3 | 4 | 5 | 6 | 7 |
|---|---|---|---|---|---|---|
| k = | −1.2367E+00 | −1.6065E+01 | −9.2460E−01 | 3.1206E−01 | −4.5855E+01 | 1.5211E+00 |
| A4 = | 1.7440E−03 | −1.5332E−02 | −1.8156E−02 | −5.2127E−03 | −5.4129E−03 | −8.4180E−03 |
| A6 = | 4.4393E−05 | 6.4677E−03 | 4.5492E−03 | −9.7079E−04 | −7.5981E−04 | −8.6287E−04 |
| A8 = | 2.5039E−05 | −1.9054E−03 | −9.9599E−04 | 5.5239E−04 | 3.0438E−05 | 3.3014E−04 |
| A10 = | −1.6161E−05 | 3.9134E−04 | 1.6740E−04 | −1.7321E−04 | −6.6168E−05 | −1.8490E−04 |

TABLE 6-continued

Aspheric Coefficients

| A12 = | 4.7207E−06 | −5.0477E−05 | −1.5303E−05 | 3.2272E−05 | 2.0557E−05 | 5.2671E−05 |
| A14 = | −6.9892E−07 | 3.6088E−06 | 5.6640E−07 | −3.3755E−06 | −2.3067E−06 | −5.9524E−06 |
| A16 = | 4.4634E−08 | −9.9422E−08 | 8.4122E−09 | 1.4404E−07 | 9.5954E−08 | 2.3942E−07 |

| Surface # | 8 | 9 | 10 | 11 | 12 | 13 |
|---|---|---|---|---|---|---|
| k = | 3.0680E+01 | 9.0000E+01 | −9.9000E+01 | 5.4086E+00 | −7.9118E−01 | −1.2475E+00 |
| A4 = | −1.5592E−03 | 1.5834E−02 | 1.9309E−02 | −6.4954E−03 | 1.2804E−02 | 2.9456E−03 |
| A6 = | −5.4576E−03 | −1.8156E−02 | −1.7157E−02 | 2.9081E−03 | 6.6261E−04 | 2.2626E−03 |
| A8 = | 2.5428E−03 | 7.4926E−03 | 7.0032E−03 | −1.2264E−03 | −1.1605E−03 | −1.1130E−03 |
| A10 = | −7.6838E−04 | −1.7592E−03 | −1.6547E−03 | 2.6099E−04 | 3.5409E−04 | 2.7912E−04 |
| A12 = | 1.5602E−04 | 2.4631E−04 | 2.3182E−04 | −2.7716E−05 | −6.2401E−05 | −4.3803E−05 |
| A14 = | −1.8866E−05 | −1.9917E−05 | −1.8441E−05 | 5.7284E−07 | 7.1689E−06 | 4.4773E−06 |
| A16 = | 1.1895E−06 | 8.0428E−07 | 6.6755E−07 | 1.8475E−07 | −5.1840E−07 | −2.8144E−07 |
| A18 = | −3.0498E−08 | −1.0224E−08 | 2.6690E−09 | −1.8792E−08 | 2.1138E−08 | 9.6832E−09 |
| A20 = | — | — | −6.3507E−10 | 5.7839E−10 | −3.7013E−10 | −1.3840E−10 |

| Surface # | 15 | 16 | 17 | 18 |
|---|---|---|---|---|
| k = | −1.1200E+00 | −1.3169E+00 | 1.7580E+00 | −1.0917E+00 |
| A4 = | −9.6758E−03 | 2.0007E−03 | −2.5336E−02 | −2.6457E−02 |
| A6 = | 8.4460E−04 | −2.2602E−03 | 3.2655E−03 | 3.5164E−03 |
| A8 = | −4.2216E−04 | 3.7777E−04 | −3.3965E−04 | −3.7128E−04 |
| A10 = | 1.1298E−04 | −4.1739E−05 | 2.6851E−05 | 2.7761E−05 |
| A12 = | −1.8414E−05 | 3.1912E−06 | −1.4296E−06 | −1.4134E−06 |
| A14 = | 1.8669E−06 | −1.6495E−07 | 4.8282E−08 | 4.7350E−08 |
| A16 = | −1.1556E−07 | 5.4390E−09 | −9.8613E−10 | −9.9034E−10 |
| A18 = | 3.9714E−09 | −1.0229E−10 | 1.1104E−11 | 1.1650E−11 |
| A20 = | −5.7480E−11 | 8.2950E−13 | −5.2956E−14 | −5.8565E−14 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

3rd Embodiment

| f [mm] | 9.54 | R3/R4 | 1.01 |
|---|---|---|---|
| Fno | 2.00 | (R9 + R10)/(R9 − R10) | 0.38 |
| HFOV [deg.] | 40.0 | f/f1 | 0.65 |
| (Vi/Ni)min | 10.90 | f/f2 | 0.02 |
| V2 | 20.4 | |f/f2| + |f/f3| | 0.15 |
| V2 + V3 + V4 | 57.2 | f/f2 + f/f3 + f/f4 | −0.24 |
| V2 + V4 | 38.8 | f/f3 | −0.14 |
| V2/N2 | 12.29 | f/f4 | −0.12 |
| V6 | 18.4 | f/f5 | 0.48 |
| ΣCT/CT5 | 4.12 | f/f6 | 0.07 |
| (CT2 + CT3 + CT4)/ (CT1 + CT5) | 0.46 | f/f7 | 0.40 |
| CT3/CT2 | 1.12 | f/f8 | −1.01 |
| CT5/CT1 | 1.27 | f/f12 | 0.69 |
| CT5/CT3 | 3.34 | f/f23 | −0.11 |
| CT7/CT5 | 0.58 | f/|R11| + f/|R12| | 4.33 |
| TD/CT5 | 8.37 | f5/CT5 | 16.88 |
| TD/f2 | 0.02 | f5/f1 | 1.37 |
| TL [mm] | 11.51 | f8/f7 | −0.39 |
| TL/f | 1.21 | Y82/Y11 | 2.58 |
| TL/ImgH | 1.41 | Yc72/Yc71 | 1.20 |
| R1/R2 | 0.48 | Yc82/Y82 | 0.37 |
| R3/f | 0.49 | — | — |

4th Embodiment

Figure 7:
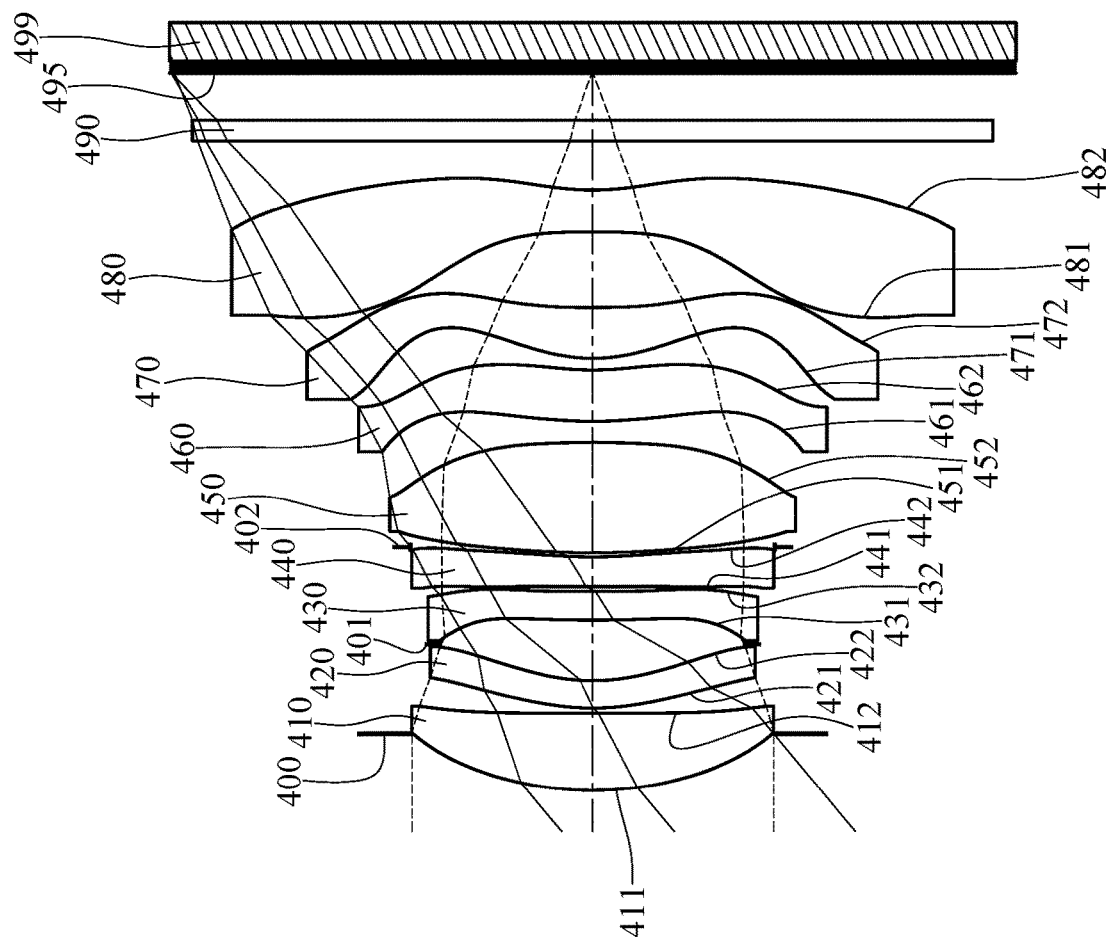
FIG. 7 is a schematic view of an image capturing unit according to the 4th embodiment of the present disclosure.

FIG. 7 is a schematic view of an image capturing unit according to the 4th embodiment of the present disclosure.

Figure 8:
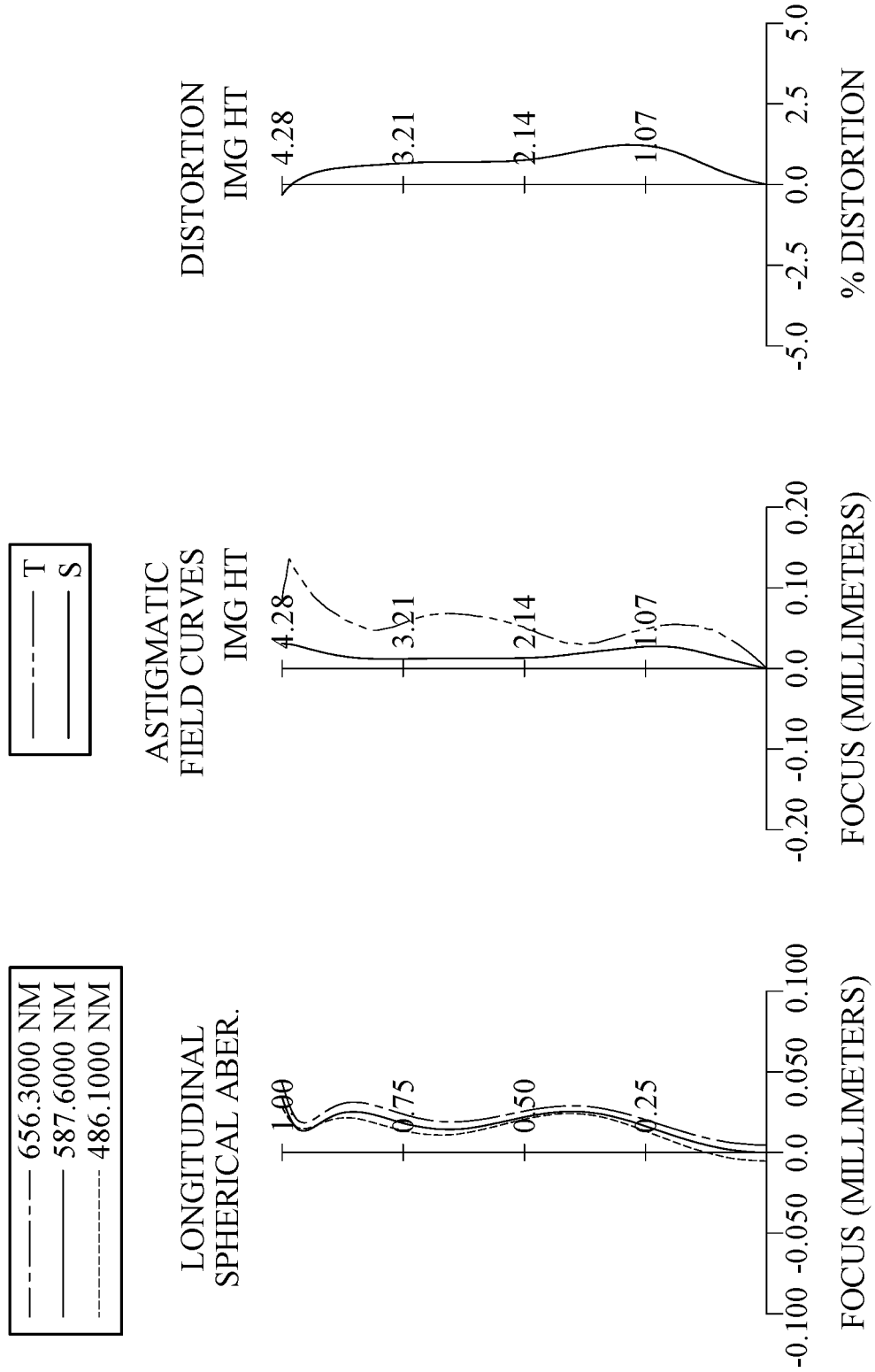
FIG. 8 shows spherical aberration curves, astigmatic field curves and a distortion curve of the image capturing unit according to the 4th embodiment.

FIG. 8 shows, in order from left to right, spherical aberration curves, astigmatic field curves and a distortion curve of the image capturing unit according to the 4th embodiment. In FIG. 7, the image capturing unit includes the photographing optical system (its reference numeral is omitted) of the present disclosure and an image sensor 499. The photographing optical system includes, in order from an object side to an image side, an aperture stop 400, a first lens element 410, a second lens element 420, a stop 401, a third lens element 430, a fourth lens element 440, a stop 402, a fifth lens element 450, a sixth lens element 460, a seventh lens element 470, an eighth lens element 480, a filter 490 and an image surface 495. The photographing optical system includes eight lens elements (410, 420, 430, 440, 450, 460, 470 and 480) with no additional lens element disposed between each of the adjacent eight lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. The image-side surface 412 of the first lens element 410 has two inflection points. The image-side surface 412 of the first lens element 410 has one critical point in an off-axis region thereof.

The second lens element 420 with negative refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has two inflection points. The image-side surface 422 of the second lens element 420 has one inflection point.

The third lens element 430 with positive refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has one inflection point. The image-side surface 432 of the third lens element 430 has two inflection points. The object-side surface 431 of the third lens element 430 has one critical point in an off-axis region thereof. The image-side surface 432 of the third lens element 430 has one critical point in an off-axis region thereof.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has three inflection points. The image-side surface 442 of the fourth lens element 440 has three inflection points. The object-side surface 441 of the fourth lens element 440 has three critical points in an off-axis region thereof. The image-side surface 442 of the fourth lens element 440 has one critical point in an off-axis region thereof.

The fifth lens element 450 with positive refractive power has an object-side surface 451 being convex in a paraxial region thereof and an image-side surface 452 being convex in a paraxial region thereof. The fifth lens element 450 is made of plastic material and has the object-side surface 451 and the image-side surface 452 being both aspheric. The image-side surface 452 of the fifth lens element 450 has one inflection point.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has one inflection point. The image-side surface 462 of the sixth lens element 460 has two inflection points. The object-side surface 461 of the sixth lens element 460 has one critical point in an off-axis region thereof. The image-side surface 462 of the sixth lens element 460 has one critical point in an off-axis region thereof.

The seventh lens element 470 with positive refractive power has an object-side surface 471 being convex in a paraxial region thereof and an image-side surface 472 being concave in a paraxial region thereof. The seventh lens element 470 is made of plastic material and has the object-side surface 471 and the image-side surface 472 being both aspheric. The object-side surface 471 of the seventh lens element 470 has three inflection points. The image-side surface 472 of the seventh lens element 470 has three inflection points. The object-side surface 471 of the seventh lens element 470 has one critical point in an off-axis region thereof. The image-side surface 472 of the seventh lens element 470 has one critical point in an off-axis region thereof.

The eighth lens element 480 with negative refractive power has an object-side surface 481 being concave in a paraxial region thereof and an image-side surface 482 being concave in a paraxial region thereof. The eighth lens element 480 is made of plastic material and has the object-side surface 481 and the image-side surface 482 being both aspheric. The object-side surface 481 of the eighth lens element 480 has one inflection point. The image-side surface 482 of the eighth lens element 480 has one inflection point. The object-side surface 481 of the eighth lens element 480 has one critical point in an off-axis region thereof. The image-side surface 482 of the eighth lens element 480 has one critical point in an off-axis region thereof.

The filter 490 is made of glass material and located between the eighth lens element 480 and the image surface 495, and will not affect the focal length of the photographing optical system. The image sensor 499 is disposed on or near the image surface 495 of the photographing optical system.

The detailed optical data of the 4th embodiment are shown in Table 7 and the aspheric surface data are shown in Table 8 below.

TABLE 7

4th Embodiment
f = 5.16 mm, Fno = 1.41, HFOV = 39.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.578 | | | | |
| 2 | Lens 1 | 3.616 | (ASP) | 0.788 | Plastic | 1.545 | 56.1 | 6.58 |
| 3 | | −441.899 | (ASP) | 0.050 | | | | |
| 4 | Lens 2 | 2.639 | (ASP) | 0.280 | Plastic | 1.669 | 19.5 | −17.28 |
| 5 | | 2.057 | (ASP) | 0.366 | | | | |
| 6 | Stop | Plano | | 0.249 | | | | |
| 7 | Lens 3 | 15.083 | (ASP) | 0.290 | Plastic | 1.669 | 19.5 | 29.47 |
| 8 | | 63.676 | (ASP) | 0.050 | | | | |
| 9 | Lens 4 | 95.335 | (ASP) | 0.300 | Plastic | 1.662 | 20.0 | −8.44 |
| 10 | | 5.268 | (ASP) | 0.101 | | | | |
| 11 | Stop | Plano | | −0.058 | | | | |
| 12 | Lens 5 | 9.356 | (ASP) | 1.129 | Plastic | 1.544 | 56.0 | 9.96 |
| 13 | | −12.315 | (ASP) | 0.212 | | | | |
| 14 | Lens 6 | 4.603 | (ASP) | 0.520 | Plastic | 1.555 | 46.7 | −14.15 |
| 15 | | 2.785 | (ASP) | 0.119 | | | | |
| 16 | Lens 7 | 1.665 | (ASP) | 0.518 | Plastic | 1.544 | 56.0 | 3.35 |
| 17 | | 17.241 | (ASP) | 0.768 | | | | |
| 18 | Lens 8 | −11.677 | (ASP) | 0.430 | Plastic | 1.534 | 55.9 | −3.91 |
| 19 | | 2.573 | (ASP) | 0.500 | | | | |

TABLE 7-continued

4th Embodiment
f = 5.16 mm, Fno = 1.41, HFOV = 39.7 deg.

| Surface # | | Curvature Radius | Thickness | Material | Index | Abbe # | Focal Length |
|---|---|---|---|---|---|---|---|
| 20 | Filter | Plano | 0.210 | Glass | 1.517 | 64.2 | — |
| 21 | | Plano | 0.478 | | | | |
| 22 | Image | Plano | — | | | | | reference wavelength is 587.6 nm (d-line).
active radius of the stop 401 (Surface 6) is 1.550 mm.
active radius of the stop 402 (Surface 11) is 1.850 mm.

TABLE 8

Aspheric Coefficients

| Surface # | 2 | 3 | 4 | 5 | 7 | 8 |
|---|---|---|---|---|---|---|
| k = | −2.6519E−02 | −9.9000E+01 | −5.9466E+00 | −4.5336E+00 | 4.8994E+01 | 0.0000E+00 |
| A4 = | 2.6894E−03 | 4.2721E−03 | −6.2726E−03 | 1.4806E−03 | 1.2128E−02 | 6.9446E−02 |
| A6 = | 4.6335E−03 | 3.4587E−03 | −1.5104E−02 | −1.9432E−02 | −4.0352E−02 | −8.3295E−02 |
| A8 = | −6.2205E−03 | −1.6987E−03 | 2.3011E−02 | 1.3742E−02 | 2.9880E−03 | 3.3598E−02 |
| A10 = | 4.6607E−03 | 5.7709E−04 | −1.7891E−02 | −5.4534E−03 | −2.3333E−03 | −6.6360E−03 |
| A12 = | −1.8506E−03 | −8.1603E−05 | 8.2740E−03 | 8.5600E−04 | 3.0819E−03 | 5.8919E−04 |
| A14 = | 3.9136E−04 | −3.0153E−06 | −2.1524E−03 | −2.8154E−05 | −6.8927E−04 | — |
| A16 = | −3.4043E−05 | — | 2.3636E−04 | — | — | — |

| surface # | 9 | 10 | 12 | 13 | 14 | 15 |
|---|---|---|---|---|---|---|
| k = | −9.9000E+01 | 4.1306E+00 | 7.8608E+00 | 2.2030E+01 | −6.2016E+01 | −5.0806E+00 |
| A4 = | −2.9498E−03 | −6.1994E−02 | 4.1759E−03 | −2.0986E−02 | 8.1004E−03 | −1.9209E−01 |
| A6 = | −3.5249E−02 | 8.9070E−03 | −2.4472E−02 | −5.0104E−03 | 4.9346E−03 | 1.4016E−01 |
| A8 = | 4.9610E−02 | 1.0122E−02 | 2.1278E−02 | 2.2583E−03 | −1.7958E−02 | −7.5469E−02 |
| A10 = | −2.4833E−02 | −3.9634E−03 | −8.3443E−03 | −8.7975E−04 | 1.1303E−02 | 2.6357E−02 |
| A12 = | 5.3400E−03 | −3.1863E−04 | 1.6894E−03 | 4.3014E−04 | −4.3596E−03 | −6.0659E−03 |
| A14 = | −4.2561E−04 | 3.1296E−04 | −1.7006E−04 | −1.1375E−04 | 1.0638E−03 | 9.0863E−04 |
| A16 = | — | −3.7362E−05 | 6.8725E−06 | 1.1390E−05 | −1.4391E−04 | −7.9150E−05 |
| A18 = | — | — | — | — | 7.9921E−06 | 2.9778E−06 |

| surface # | 16 | 17 | 18 | 19 |
|---|---|---|---|---|
| k = | −7.0799E−01 | 7.0623E+00 | 9.3687E+00 | −1.5501E+00 |
| A4 = | −9.2597E−02 | 1.3218E−01 | −8.8703E−02 | −1.1052E−01 |
| A6 = | 2.0038E−02 | −1.0891E−01 | −3.9230E−03 | 3.2182E−02 |
| A8 = | −1.2230E−02 | 4.0161E−02 | 1.7040E−02 | −5.0862E−03 |
| A10 = | 2.7647E−03 | −8.7531E−03 | −5.9077E−03 | 3.3324E−04 |
| A12 = | 1.8258E−04 | 1.0802E−03 | 1.0355E−03 | 2.3243E−05 |
| A14 = | −2.1230E−04 | −5.2813E−05 | −1.0717E−04 | −6.5473E−06 |
| A16 = | 3.8066E−05 | −3.1462E−06 | 6.6372E−06 | 5.5635E−07 |
| A18 = | −2.2151E−06 | 5.1803E−07 | −2.2828E−07 | −2.2452E−08 |
| A20 = | — | −1.8784E−08 | 3.3650E−09 | 3.6254E−10 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 5.16 | R3/R4 | 1.28 |
| Fno | 1.41 | (R9 + R10)/(R9 − R10) | −0.14 |
| HFOV [deg.] | 39.7 | f/f1 | 0.78 |
| (Vi/Ni)min | 11.65 | f/f2 | −0.30 |
| V2 | 19.5 | |f/f2| + |f/f3| | 0.47 |
| V2 + V3 + V4 | 58.9 | f/f2 + f/f3 + f/f4 | −0.74 |
| V2 + V4 | 39.4 | f/f3 | 0.18 |
| V2/N2 | 11.65 | f/f4 | −0.61 |
| V6 | 46.7 | f/f5 | 0.52 |
| ΣCT/CT5 | 3.77 | f/f6 | −0.36 |
| (CT2 + CT3 + CT4)/(CT1 + CT5) | 0.45 | f/f7 | 1.54 |
| CT3/CT2 | 1.04 | f/f8 | −1.32 |
| CT5/CT1 | 1.43 | f/f12 | 0.55 |
| CT5/CT3 | 3.89 | f/f23 | −0.13 |
| CT7/CT5 | 0.46 | f/|R11| + f/|R12| | 2.98 |
| TD/CT5 | 5.41 | f5/CT5 | 8.82 |
| TD/f2 | −0.35 | f5/f1 | 1.51 |
| TL [mm] | 7.30 | f8/f7 | −1.17 |
| TL/f | 1.41 | Y82/Y11 | 2.00 |

-continued

| 4th Embodiment | | | |
|---|---|---|---|
| TL/ImgH | 1.70 | Yc72/Yc71 | 1.04 |
| R1/R2 | −0.01 | Yc82/Y82 | 0.36 |
| R3/f | 0.51 | — | — |

5th Embodiment

Figure 9:
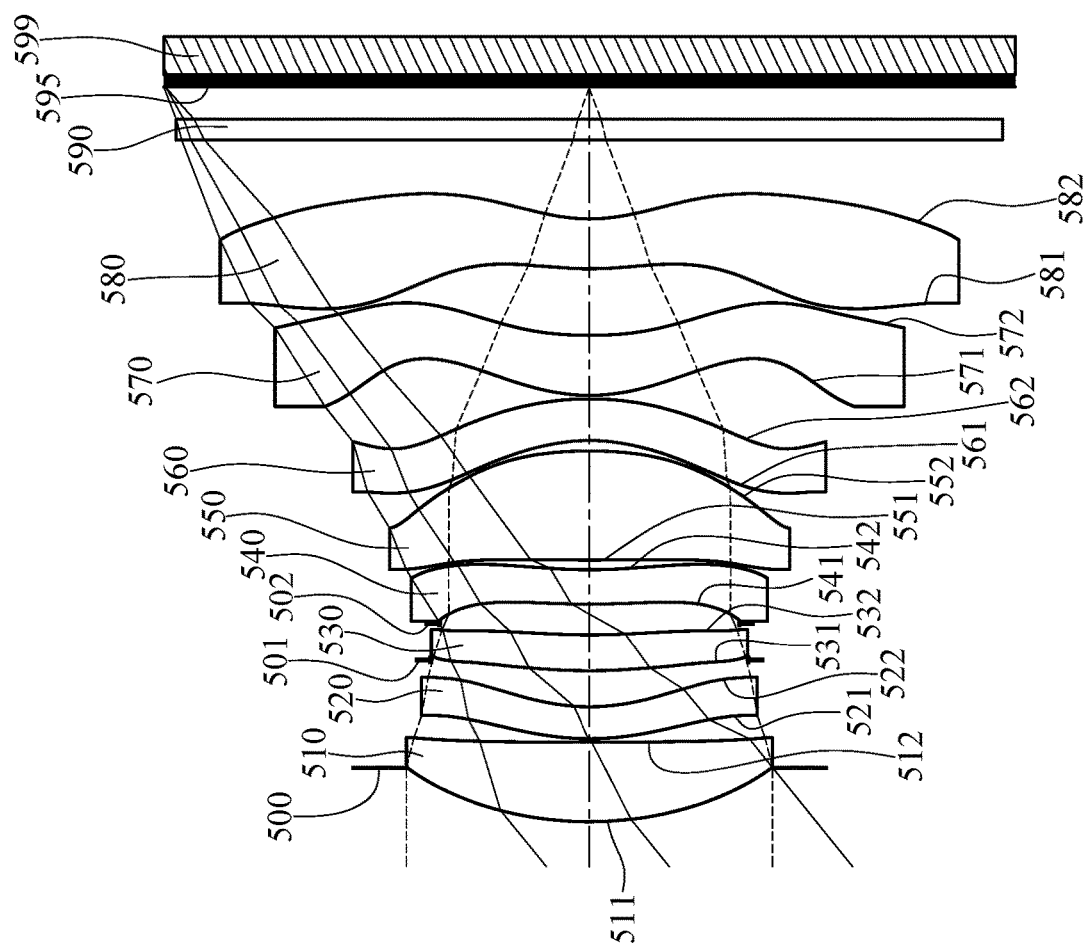
FIG. 9 is a schematic view of an image capturing unit according to the 5th embodiment of the present disclosure.
Figure 10:
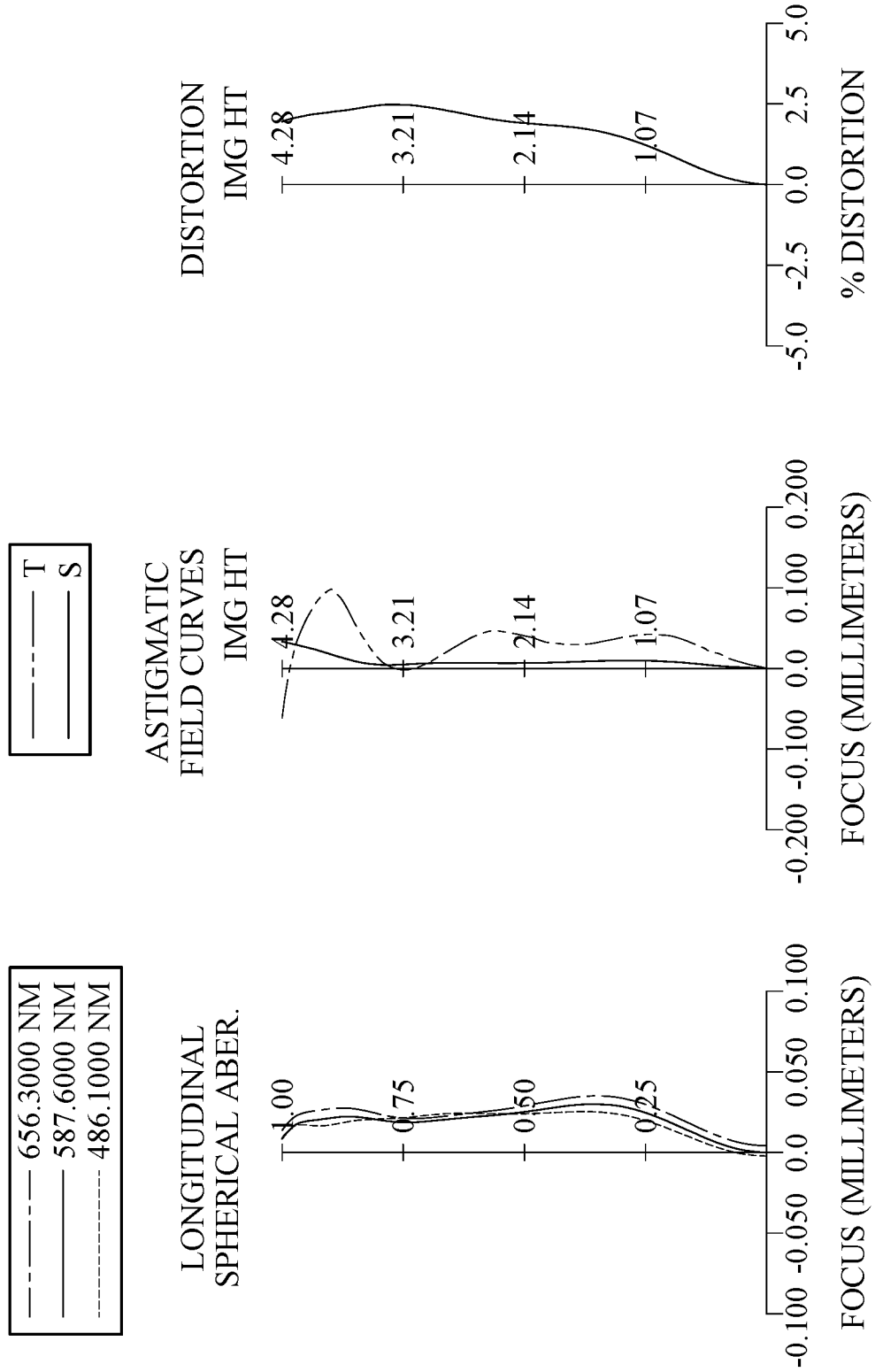
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical system (its reference numeral is omitted) of the present disclosure and an image sensor 599. The photographing optical system includes, in order from an object side to an image side, an aperture stop 500, a first lens element 510, a second lens element 520, a stop 501, a third lens element 530, a stop 502, a fourth lens element 540, a fifth lens element 550, a sixth lens element 560, a seventh lens element 570, an eighth lens element 580, a filter 590 and an image surface 595. The photographing optical system includes eight lens elements (510, 520, 530, 540, 550, 560, 570 and 580) with no additional lens element disposed between each of the adjacent eight lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The image-side surface 512 of the first lens element 510 has one inflection point. The image-side surface 512 of the first lens element 510 has one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has one inflection point. The image-side surface 522 of the second lens element 520 has one inflection point. The object-side surface 521 of the second lens element 520 has one critical point in an off-axis region thereof.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has two inflection points. The image-side surface 532 of the third lens element 530 has two inflection points. The image-side surface 532 of the third lens element 530 has two critical points in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has one inflection point. The image-side surface 542 of the fourth lens element 540 has one inflection point. The object-side surface 541 of the fourth lens element 540 has one critical point in an off-axis region thereof. The image-side surface 542 of the fourth lens element 540 has one critical point in an off-axis region thereof.

The fifth lens element 550 with positive refractive power has an object-side surface 551 being convex in a paraxial region thereof and an image-side surface 552 being convex in a paraxial region thereof. The fifth lens element 550 is made of plastic material and has the object-side surface 551 and the image-side surface 552 being both aspheric. The object-side surface 551 of the fifth lens element 550 has three inflection points. The image-side surface 552 of the fifth lens element 550 has one inflection point. The object-side surface 551 of the fifth lens element 550 has one critical point in an off-axis region thereof.

The sixth lens element 560 with negative refractive power has an object-side surface 561 being concave in a paraxial region thereof and an image-side surface 562 being convex in a paraxial region thereof. The sixth lens element 560 is made of plastic material and has the object-side surface 561 and the image-side surface 562 being both aspheric. The object-side surface 561 of the sixth lens element 560 has one inflection point. The image-side surface 562 of the sixth lens element 560 has two inflection points. The object-side surface 561 of the sixth lens element 560 has one critical point in an off-axis region thereof. The image-side surface 562 of the sixth lens element 560 has one critical point in an off-axis region thereof.

The seventh lens element 570 with positive refractive power has an object-side surface 571 being convex in a paraxial region thereof and an image-side surface 572 being concave in a paraxial region thereof. The seventh lens element 570 is made of plastic material and has the object-side surface 571 and the image-side surface 572 being both aspheric. The object-side surface 571 of the seventh lens element 570 has two inflection points. The image-side surface 572 of the seventh lens element 570 has four inflection points. The object-side surface 571 of the seventh lens element 570 has one critical point in an off-axis region thereof. The image-side surface 572 of the seventh lens element 570 has one critical point in an off-axis region thereof.

The eighth lens element 580 with negative refractive power has an object-side surface 581 being convex in a paraxial region thereof and an image-side surface 582 being concave in a paraxial region thereof. The eighth lens element 580 is made of plastic material and has the object-side surface 581 and the image-side surface 582 being both aspheric. The object-side surface 581 of the eighth lens element 580 has three inflection points. The image-side surface 582 of the eighth lens element 580 has one inflection point. The object-side surface 581 of the eighth lens element 580 has two critical points in an off-axis region thereof. The image-side surface 582 of the eighth lens element 580 has one critical point in an off-axis region thereof.

The filter 590 is made of glass material and located between the eighth lens element 580 and the image surface 595, and will not affect the focal length of the photographing optical system. The image sensor 599 is disposed on or near the image surface 595 of the photographing optical system.

The detailed optical data of the 5th embodiment are shown in Table 9 and the aspheric surface data are shown in Table 10 below.

TABLE 9

5th Embodiment
f = 5.18 mm, Fno = 1.40, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.543 | | | | |
| 2 | Lens 1 | 3.682 | (ASP) | 0.804 | Plastic | 1.545 | 56.1 | 6.58 |
| 3 | | −122.745 | (ASP) | 0.035 | | | | |
| 4 | Lens 2 | 2.901 | (ASP) | 0.320 | Plastic | 1.669 | 19.5 | −14.19 |
| 5 | | 2.124 | (ASP) | 0.477 | | | | |
| 6 | Stop | Plano | | −0.111 | | | | |
| 7 | Lens 3 | 6.193 | (ASP) | 0.367 | Plastic | 1.544 | 56.0 | 65.33 |
| 8 | | 7.343 | (ASP) | 0.115 | | | | |
| 9 | Stop | Plano | | 0.195 | | | | |
| 10 | Lens 4 | 7.026 | (ASP) | 0.350 | Plastic | 1.669 | 19.5 | −31.50 |
| 11 | | 5.164 | (ASP) | 0.097 | | | | |
| 12 | Lens 5 | 18.400 | (ASP) | 1.100 | Plastic | 1.544 | 56.0 | 6.34 |
| 13 | | −4.152 | (ASP) | 0.108 | | | | |
| 14 | Lens 6 | −1.834 | (ASP) | 0.420 | Plastic | 1.584 | 28.2 | −9.22 |
| 15 | | −3.017 | (ASP) | 0.035 | | | | |
| 16 | Lens 7 | 1.949 | (ASP) | 0.614 | Plastic | 1.544 | 56.0 | 6.00 |
| 17 | | 4.293 | (ASP) | 0.673 | | | | |
| 18 | Lens 8 | 3.739 | (ASP) | 0.500 | Plastic | 1.534 | 55.9 | −6.56 |
| 19 | | 1.725 | (ASP) | 0.800 | | | | |
| 20 | Filter | Plano | | 0.210 | Glass | 1.517 | 64.2 | — |
| 21 | | Plano | | 0.325 | | | | |
| 22 | Image | Plano | | — | | | | | reference wavelength is 587.6 nm (d-line).
active radius of the stop 501 (Surface 6) is 1.605 mm.
active radius of the stop 502 (Surface 9) is 1.515 mm.

TABLE 10

Aspheric Coefficients

| Surface # | 2 | 3 | 4 | 5 | 7 | 8 |
|---|---|---|---|---|---|---|
| k = | −3.8301E−01 | 0.0000E+00 | 0.0000E+00 | 0.0000E+00 | −1.2701E+01 | −9.9618E+00 |
| A4 = | 3.3457E−03 | 3.1080E−02 | −1.1795E−02 | −4.7194E−02 | −9.3118E−03 | −3.2069E−02 |
| A6 = | 5.3209E−04 | −4.0668E−02 | −2.8434E−02 | 3.9451E−03 | 1.4574E−02 | 8.7149E−03 |
| A8 = | 5.5213E−05 | 3.1959E−02 | 8.4738E−03 | −2.7541E−02 | −2.1030E−02 | 3.4697E−03 |
| A10 = | −4.2169E−04 | −1.5322E−02 | 4.2272E−03 | 2.6183E−02 | 8.5561E−03 | −1.9207E−02 |
| A12 = | 2.8564E−04 | 4.5562E−03 | −3.9783E−03 | −1.3431E−02 | −9.1632E−04 | 1.7476E−02 |
| A14 = | −6.9022E−05 | −7.7228E−04 | 1.0982E−03 | 3.6485E−03 | 1.3193E−05 | −6.0516E−03 |
| A16 = | 6.1250E−06 | 5.6791E−05 | −1.0458E−04 | −3.9543E−04 | — | 7.4493E−04 |

| Surface # | 10 | 11 | 12 | 13 | 14 | 15 |
|---|---|---|---|---|---|---|
| k = | 1.2423E+01 | 1.3203E−01 | 8.8600E+01 | −8.8185E−01 | −9.6984E−01 | −8.0226E−01 |
| A4 = | −6.7989E−02 | −6.6548E−02 | −4.5475E−02 | −2.8815E−02 | 9.9388E−02 | 9.8134E−04 |
| A6 = | 1.6834E−02 | 2.7006E−02 | 1.6774E−02 | −3.8965E−02 | −1.1724E−01 | −1.5649E−02 |
| A8 = | −6.9501E−03 | 1.2512E−02 | 1.7014E−02 | 3.4192E−02 | 9.7748E−02 | 2.2429E−02 |
| A10 = | −1.7436E−02 | −3.8760E−02 | −2.3155E−02 | −5.4432E−04 | −4.9187E−02 | −1.5236E−02 |
| A12 = | 1.9061E−02 | 2.8809E−02 | 7.1384E−03 | −1.1288E−02 | 1.6068E−02 | 6.0710E−03 |
| A14 = | −7.0389E−03 | −1.0334E−02 | 1.3147E−03 | 6.5272E−03 | −3.3711E−03 | −1.3937E−03 |
| A16 = | 8.6756E−04 | 1.8573E−03 | −1.2739E−03 | −1.7663E−03 | 4.2950E−04 | 1.8129E−04 |
| A18 = | — | −1.3525E−04 | 2.8460E−04 | 2.4374E−04 | −2.9663E−05 | −1.2446E−05 |
| A20 = | — | — | −2.2209E−05 | −1.3710E−05 | 8.3048E−07 | 3.5052E−07 |

| Surface # | 16 | 17 | 18 | 19 |
|---|---|---|---|---|
| k = | −1.0014E+00 | −7.5632E−01 | −2.6306E+00 | −9.2400E−01 |
| A4 = | −3.5806E−02 | 8.9864E−02 | −1.0128E−01 | −1.3840E−01 |
| A6 = | −1.2874E−03 | −8.4239E−02 | 1.1717E−02 | 4.1232E−02 |
| A8 = | −5.6061E−03 | 3.5938E−02 | 2.5804E−03 | −1.0109E−02 |
| A10 = | 4.6488E−03 | −1.0054E−02 | −8.5251E−04 | 1.8994E−03 |
| A12 = | −1.7886E−03 | 1.8590E−03 | 1.0234E−04 | −2.4794E−04 |
| A14 = | 3.7546E−04 | −2.2030E−04 | −6.2547E−06 | 2.1003E−05 |
| A16 = | −4.3285E−05 | 1.5989E−05 | 1.7796E−07 | −1.0886E−06 |
| A18 = | 2.5712E−06 | −6.4628E−07 | −7.1276E−10 | 3.1204E−08 |
| A20 = | −6.1554E−08 | 1.1144E−08 | −4.7919E−11 | −3.7790E−10 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.18 | R3/R4 | 1.37 |
| Fno | 1.40 | (R9 + R10)/(R9 − R10) | 0.63 |
| HFOV [deg.] | 39.0 | f/f1 | 0.79 |
| (Vi/Ni)min | 11.65 | f/f2 | −0.36 |
| V2 | 19.5 | |f/f2| + |f/f3| | 0.44 |
| V2 + V3 + V4 | 94.9 | f/f2 + f/f3 + f/f4 | −0.45 |
| V2 + V4 | 38.9 | f/f3 | 0.08 |
| V2/N2 | 11.65 | f/f4 | −0.16 |
| V6 | 28.2 | f/f5 | 0.82 |
| ΣCT/CT5 | 4.07 | f/f6 | −0.56 |
| (CT2 + CT3 + CT4)/(CT1 + CT5) | 0.54 | f/f7 | 0.86 |
| CT3/CT2 | 1.15 | f/f8 | −0.79 |
| CT5/CT1 | 1.37 | f/f12 | 0.50 |
| CT5/CT3 | 3.00 | f/f23 | −0.29 |
| CT7/CT5 | 0.56 | f/|R11| + f/|R12| | 4.54 |
| TD/CT5 | 5.54 | f5/CT5 | 5.76 |
| TD/f2 | −0.43 | f5/f1 | 0.96 |
| TL [mm] | 7.43 | f8/f7 | −1.09 |
| TL/f | 1.44 | Y82/Y11 | 2.02 |
| TL/ImgH | 1.74 | Yc72/Yc71 | 1.12 |
| R1/R2 | −0.03 | Yc82/Y82 | 0.44 |
| R3/f | 0.56 | — | — |

6th Embodiment

Figure 11:
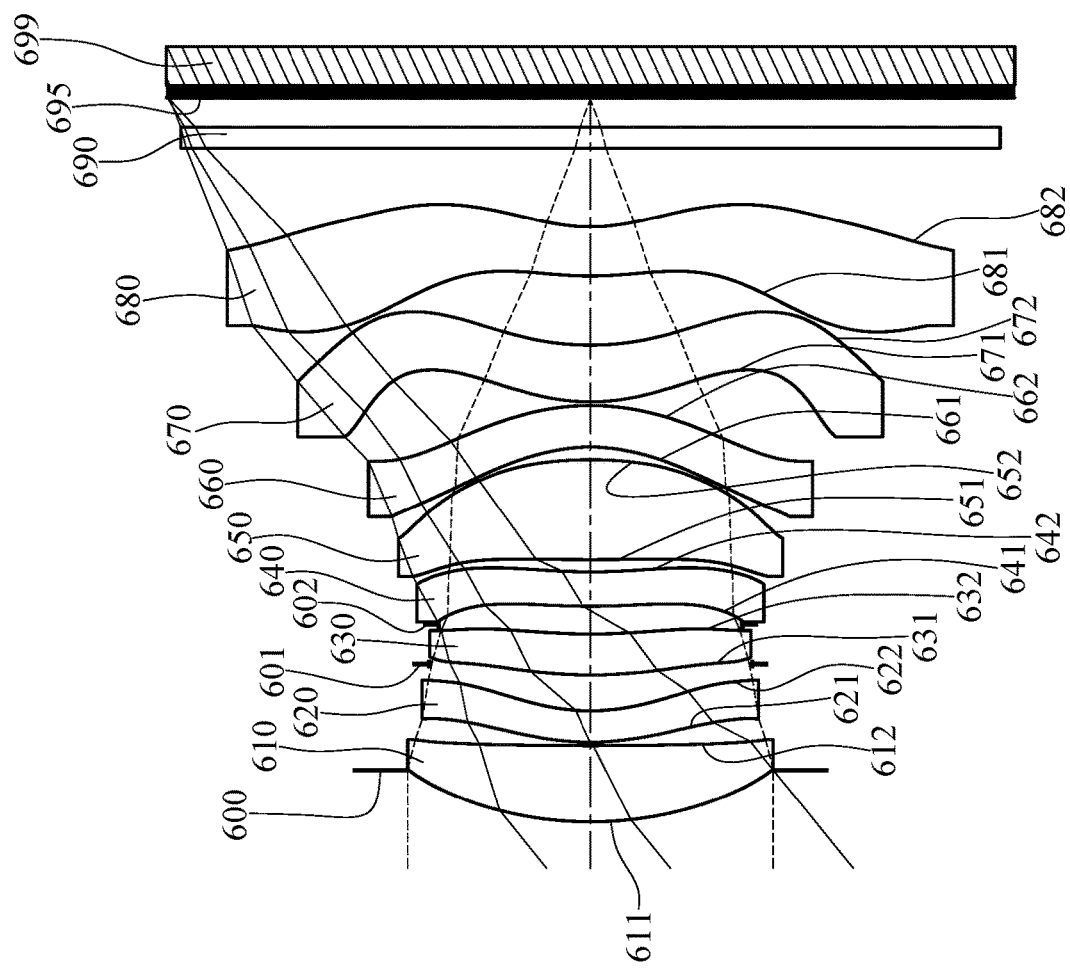
FIG. 11 is a schematic view of an image capturing unit according to the 6th embodiment of the present disclosure.
Figure 12:
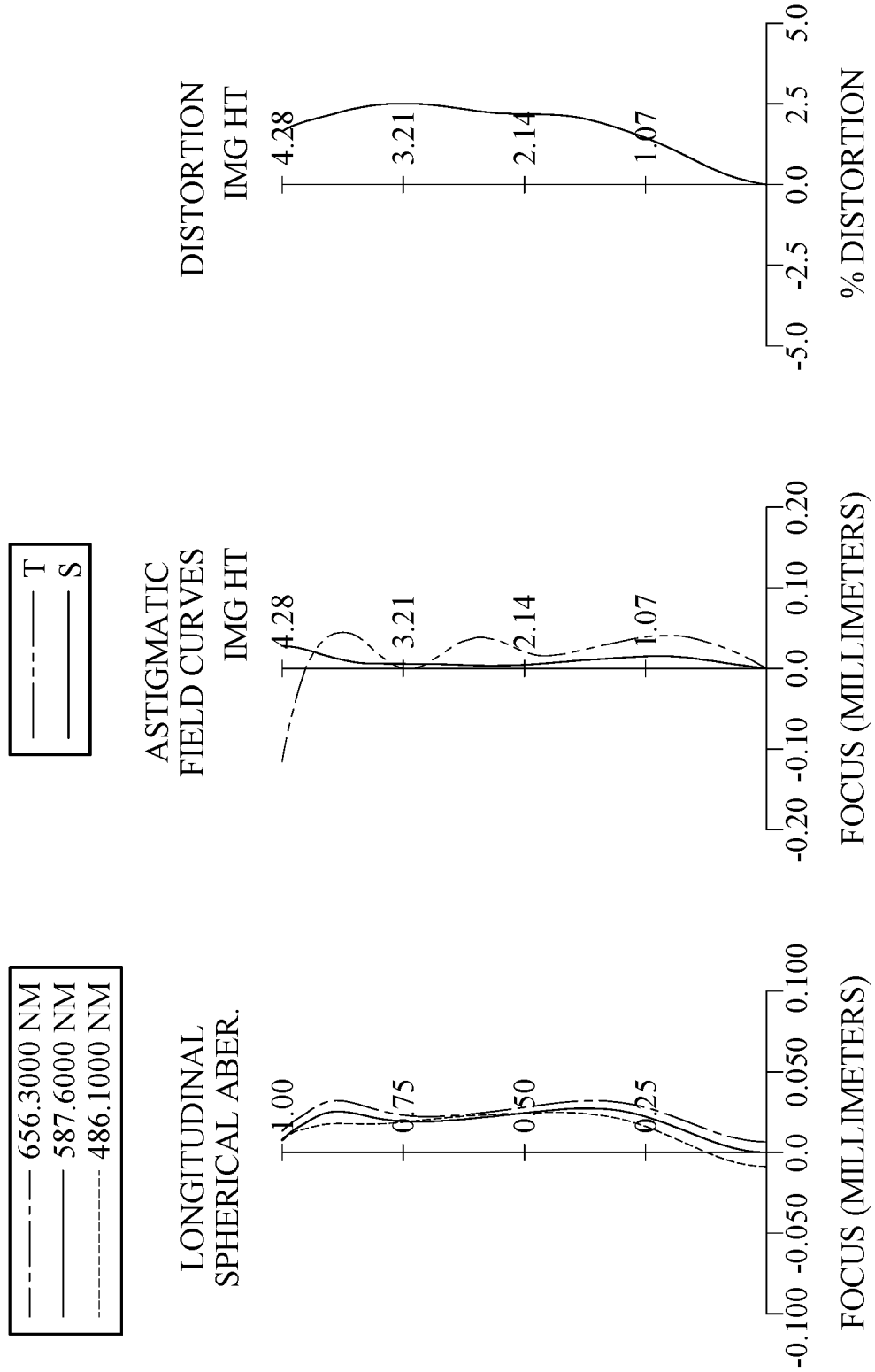
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical system (its reference numeral is omitted) of the present disclosure and an image sensor 699. The photographing optical system includes, in order from an object side to an image side, an aperture stop 600, a first lens element 610, a second lens element 620, a stop 601, a third lens element 630, a stop 602, a fourth lens element 640, a fifth lens element 650, a sixth lens element 660, a seventh lens element 670, an eighth lens element 680, a filter 690 and an image surface 695. The photographing optical system includes eight lens elements (610, 620, 630, 640, 650, 660, 670 and 680) with no additional lens element disposed between each of the adjacent eight lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has one inflection point. The image-side surface 622 of the second lens element 620 has one inflection point. The object-side surface 621 of the second lens element 620 has one critical point in an off-axis region thereof.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has two inflection points. The image-side surface 632 of the third lens element 630 has two inflection points. The image-side surface 632 of the third lens element 630 has two critical points in an off-axis region thereof.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has one inflection point. The image-side surface 642 of the fourth lens element 640 has one inflection point. The object-side surface 641 of the fourth lens element 640 has one critical point in an off-axis region thereof. The image-side surface 642 of the fourth lens element 640 has one critical point in an off-axis region thereof.

The fifth lens element 650 with positive refractive power has an object-side surface 651 being convex in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has two inflection points. The image-side surface 652 of the fifth lens element 650 has one inflection point. The object-side surface 651 of the fifth lens element 650 has one critical point in an off-axis region thereof.

The sixth lens element 660 with negative refractive power has an object-side surface 661 being concave in a paraxial region thereof and an image-side surface 662 being convex in a paraxial region thereof. The sixth lens element 660 is made of plastic material and has the object-side surface 661 and the image-side surface 662 being both aspheric. The object-side surface 661 of the sixth lens element 660 has two inflection points. The image-side surface 662 of the sixth lens element 660 has one inflection point. The image-side surface 662 of the sixth lens element 660 has one critical point in an off-axis region thereof.

The seventh lens element 670 with positive refractive power has an object-side surface 671 being convex in a paraxial region thereof and an image-side surface 672 being concave in a paraxial region thereof. The seventh lens element 670 is made of plastic material and has the object-side surface 671 and the image-side surface 672 being both aspheric. The object-side surface 671 of the seventh lens element 670 has two inflection points. The image-side surface 672 of the seventh lens element 670 has two inflection points. The object-side surface 671 of the seventh lens element 670 has one critical point in an off-axis region thereof. The image-side surface 672 of the seventh lens element 670 has one critical point in an off-axis region thereof.

The eighth lens element 680 with negative refractive power has an object-side surface 681 being convex in a paraxial region thereof and an image-side surface 682 being concave in a paraxial region thereof. The eighth lens element 680 is made of plastic material and has the object-side surface 681 and the image-side surface 682 being both aspheric. The object-side surface 681 of the eighth lens element 680 has three inflection points. The image-side surface 682 of the eighth lens element 680 has three inflection points. The object-side surface 681 of the eighth lens element 680 has two critical points in an off-axis region thereof. The image-side surface 682 of the eighth lens element 680 has one critical point in an off-axis region thereof.

The filter 690 is made of glass material and located between the eighth lens element 680 and the image surface 695, and will not affect the focal length of the photographing optical system. The image sensor 699 is disposed on or near the image surface 695 of the photographing optical system.

The detailed optical data of the 6th embodiment are shown in Table 11 and the aspheric surface data are shown in Table 12 below.

TABLE 11

6th Embodiment
f = 5.18 mm, Fno = 1.40, HFOV = 39.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.529 | | | | |
| 2 | Lens 1 | 3.764 | (ASP) | 0.775 | Plastic | 1.545 | 56.1 | 7.28 |
| 3 | | 68.551 | (ASP) | 0.035 | | | | |
| 4 | Lens 2 | 2.738 | (ASP) | 0.320 | Plastic | 1.660 | 20.4 | −16.48 |
| 5 | | 2.086 | (ASP) | 0.471 | | | | |
| 6 | Stop | Plano | | −0.111 | | | | |
| 7 | Lens 3 | 4.782 | (ASP) | 0.416 | Plastic | 1.544 | 56.0 | 41.54 |
| 8 | | 5.879 | (ASP) | 0.097 | | | | |
| 9 | Stop | Plano | | 0.182 | | | | |
| 10 | Lens 4 | 6.442 | (ASP) | 0.350 | Plastic | 1.669 | 19.5 | −75.39 |
| 11 | | 5.588 | (ASP) | 0.124 | | | | |
| 12 | Lens 5 | 25.044 | (ASP) | 1.015 | Plastic | 1.544 | 56.0 | 6.25 |
| 13 | | −3.878 | (ASP) | 0.129 | | | | |
| 14 | Lens 6 | −1.758 | (ASP) | 0.420 | Plastic | 1.669 | 19.5 | −13.05 |
| 15 | | −2.412 | (ASP) | 0.035 | | | | |
| 16 | Lens 7 | 2.057 | (ASP) | 0.575 | Plastic | 1.544 | 56.0 | 10.05 |
| 17 | | 2.972 | (ASP) | 0.700 | | | | |
| 18 | Lens 8 | 3.593 | (ASP) | 0.500 | Plastic | 1.534 | 55.9 | −7.75 |
| 19 | | 1.830 | (ASP) | 0.800 | | | | |
| 20 | Filter | Plano | | 0.210 | Glass | 1.517 | 64.2 | — |
| 21 | | Plano | | 0.300 | | | | |
| 22 | Image | Plano | | — | | | | | reference wavelength is 587.6 nm (d-line).
active radius of the stop 601 (Surface 6) is 1.635 mm.
active radius of the stop 602 (Surface 9) is 1.538 mm.

TABLE 12

Aspheric Coefficients

| Surface # | 2 | 3 | 4 | 5 | 7 | 8 |
|---|---|---|---|---|---|---|
| k = | −4.0891E−01 | 0.0000E+00 | 0.0000E+00 | 0.0000E+00 | −1.2943E+01 | −2.0093E+01 |
| A4 = | 3.3195E−03 | 1.1113E−02 | −3.1787E−02 | −5.2038E−02 | 7.4506E−04 | −2.9018E−02 |
| A6 = | 2.3048E−04 | −1.2629E−02 | −2.3498E−03 | 7.1476E−03 | 1.7014E−03 | 3.5472E−03 |
| A8 = | 9.2968E−05 | 6.8236E−03 | −1.5974E−02 | −3.1423E−02 | −3.4432E−03 | 1.5803E−02 |
| A10 = | −4.1752E−04 | −1.4854E−03 | 1.8235E−02 | 2.8751E−02 | −6.1897E−03 | −3.1635E−02 |
| A12 = | 2.8403E−04 | 7.3721E−05 | −8.5165E−03 | −1.4138E−02 | 4.3604E−03 | 2.1525E−02 |
| A14 = | −6.6596E−05 | 2.1025E−05 | 1.8663E−03 | 3.7086E−03 | −6.5709E−04 | −6.3492E−03 |
| A16 = | 5.7722E−06 | −2.7842E−06 | −1.5903E−04 | −3.9415E−04 | — | 7.1335E−04 |

| Surface # | 10 | 11 | 12 | 13 | 14 | 15 |
|---|---|---|---|---|---|---|
| k = | 1.3233E+01 | −2.5167E+00 | 1.0121E−01 | −8.9563E−01 | −8.5916E−01 | 0.0000E+00 |
| A4 = | −7.1216E−02 | −3.9539E−02 | −8.0866E−03 | −2.3398E−02 | 8.7465E−02 | 3.4160E−02 |
| A6 = | −1.0634E−02 | −5.0461E−02 | −3.5113E−02 | 1.3687E−03 | −8.0707E−02 | −3.9157E−02 |
| A8 = | 4.3691E−02 | 9.9711E−02 | 2.8499E−02 | −6.4786E−02 | 3.1387E−02 | 5.1769E−02 |
| A10 = | −5.3195E−02 | −9.0819E−02 | 9.7406E−02 | 1.1358E−01 | 2.7140E−02 | −3.9031E−02 |
| A12 = | 3.0481E−02 | 4.5424E−02 | −3.2342E−02 | −8.5813E−02 | −3.5137E−02 | 1.8658E−02 |
| A14 = | −8.4208E−03 | −1.2662E−02 | 2.2513E−02 | 3.5080E−02 | 1.6729E−02 | −5.5982E−03 |
| A16 = | 8.7183E−04 | 1.8326E−03 | −7.4694E−03 | −8.1304E−03 | −4.1734E−03 | 1.0194E−03 |
| A18 = | — | −1.0704E−04 | 1.2358E−03 | 1.0077E−03 | 5.4359E−04 | −1.0275E−04 |
| A20 = | — | — | −8.2057E−05 | −5.1815E−05 | −2.9299E−05 | 4.3939E−06 |

TABLE 12-continued

| | Aspheric Coefficients | | | |
|---|---|---|---|---|
| Surface # | 16 | 17 | 18 | 19 |
| k = | −1.2443E+00 | −4.1178E+00 | −4.4446E+00 | −9.0845E−01 |
| A4 = | −3.7578E−02 | 4.8746E−02 | −1.0795E−01 | −1.3566E−01 |
| A6 = | 2.0103E−03 | −4.9650E−02 | 2.5107E−02 | 4.3019E−02 |
| A8 = | −6.4992E−03 | 2.1366E−02 | −4.8027E−03 | −1.1804E−02 |
| A10 = | 5.2574E−03 | −6.5848E−03 | 1.0710E−03 | 2.3715E−03 |
| A12 = | −2.5081E−03 | 1.4491E−03 | −1.8713E−04 | −3.1460E−04 |
| A14 = | 7.4977E−04 | −2.1962E−04 | 2.0772E−05 | 2.6461E−05 |
| A16 = | −1.3611E−04 | 2.1496E−05 | −1.3840E−06 | −1.3558E−06 |
| A18 = | 1.3422E−05 | −1.2053E−06 | 5.0918E−08 | 3.8661E−08 |
| A20 = | −5.4142E−07 | 2.9095E−08 | −7.9904E−10 | −4.7173E−10 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.18 | R3/R4 | 1.31 |
| Fno | 1.40 | (R9 + R10)/(R9 − R10) | 0.73 |
| HFOV [deg.] | 39.1 | f/f1 | 0.71 |
| (Vi/Ni)min | 11.65 | f/f2 | −0.31 |
| V2 | 20.4 | |f/f2| + |f/f3| | 0.44 |
| V2 + V3 + V4 | 95.8 | f/f2 + f/f3 + f/f4 | −0.26 |
| V2 + V4 | 39.9 | f/f3 | 0.12 |
| V2/N2 | 12.29 | f/f4 | −0.07 |
| V6 | 19.5 | f/f5 | 0.83 |
| ΣCT/CT5 | 4.31 | f/f6 | −0.40 |
| (CT2 + CT3 + CT4)/(CT1 + CT5) | 0.61 | f/f7 | 0.52 |
| CT3/CT2 | 1.30 | f/f8 | −0.67 |
| CT5/CT1 | 1.31 | f/f12 | 0.46 |
| CT5/CT3 | 2.44 | f/f23 | −0.20 |
| CT7/CT5 | 0.57 | f/|R11| + f/|R12| | 5.09 |
| TD/CT5 | 5.94 | f5/CT5 | 6.16 |
| TD/f2 | −0.37 | f5/f1 | 0.86 |
| TL [mm] | 7.34 | f8/f7 | −0.77 |
| TL/f | 1.42 | Y82/Y11 | 1.99 |
| TL/ImgH | 1.71 | Yc72/Yc71 | 1.11 |
| R1/R2 | 0.05 | Yc82/Y82 | 0.41 |
| R3/f | 0.53 | — | — |

7th Embodiment

Figure 13:
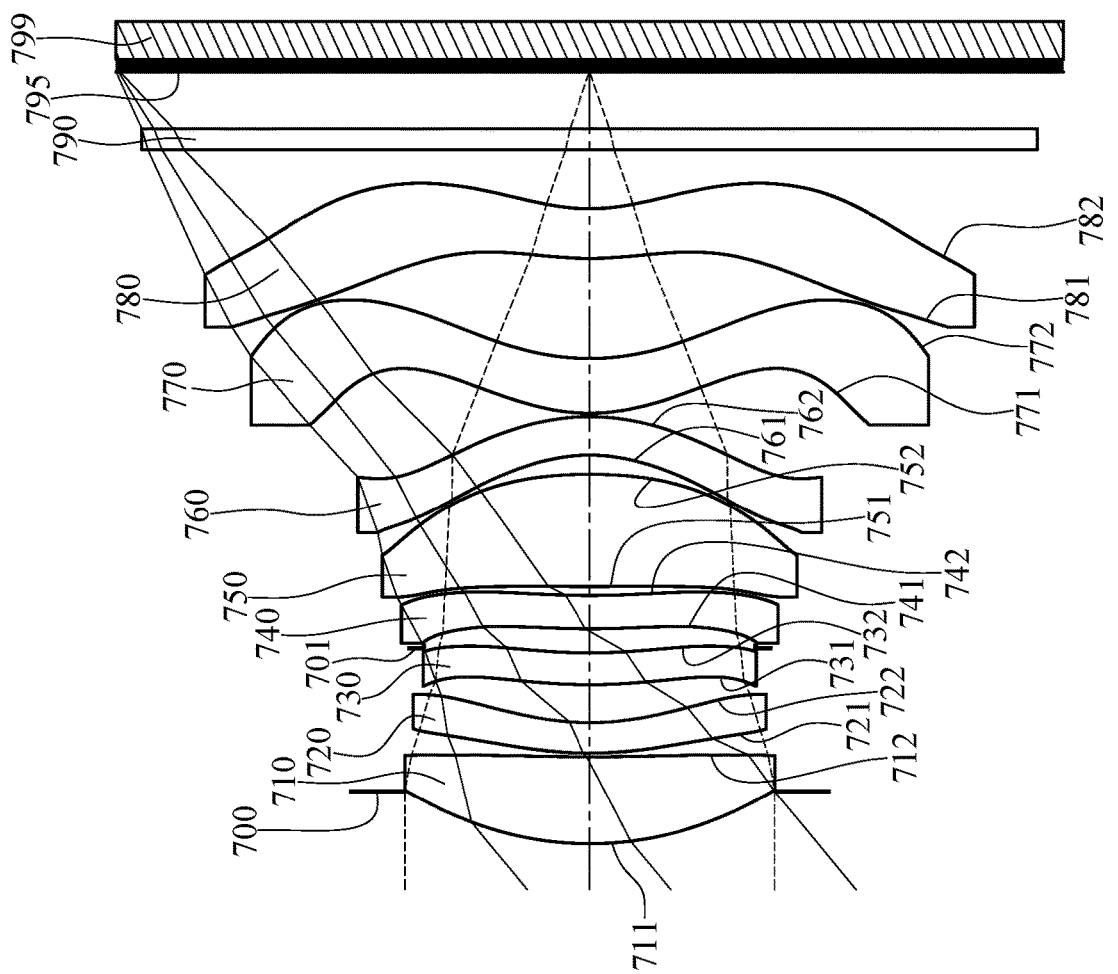
FIG. 13 is a schematic view of an image capturing unit according to the 7th embodiment of the present disclosure.
Figure 14:
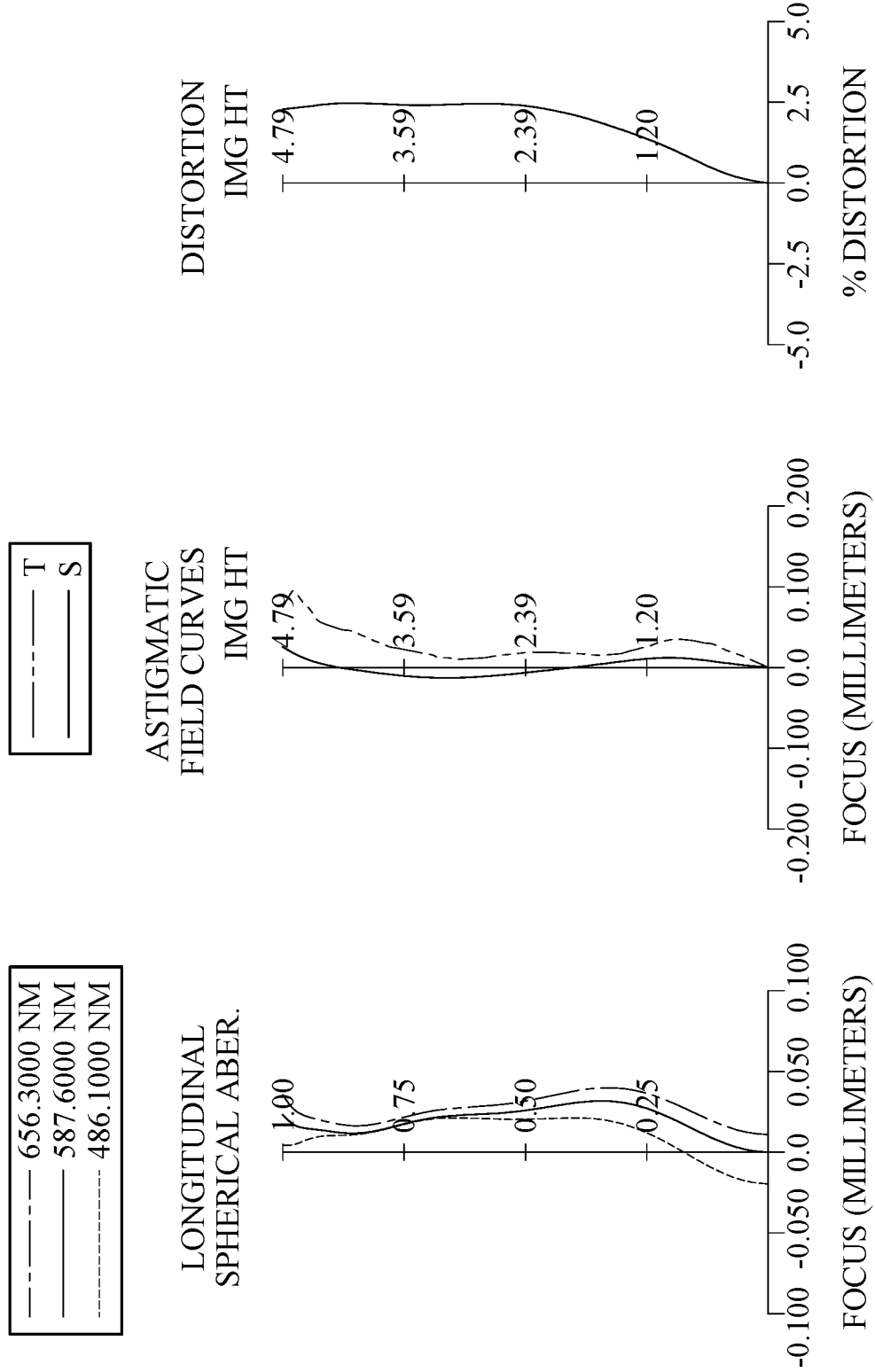
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical system (its reference numeral is omitted) of the present disclosure and an image sensor 799. The photographing optical system includes, in order from an object side to an image side, an aperture stop 700, a first lens element 710, a second lens element 720, a third lens element 730, a stop 701, a fourth lens element 740, a fifth lens element 750, a sixth lens element 760, a seventh lens element 770, an eighth lens element 780, a filter 790 and an image surface 795. The photographing optical system includes eight lens elements (710, 720, 730, 740, 750, 760, 770 and 780) with no additional lens element disposed between each of the adjacent eight lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has one inflection point. The image-side surface 712 of the first lens element 710 has one inflection point. The image-side surface 712 of the first lens element 710 has one critical point in an off-axis region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has two inflection points. The image-side surface 722 of the second lens element 720 has one inflection point.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has one inflection point. The image-side surface 732 of the third lens element 730 has one inflection point. The object-side surface 731 of the third lens element 730 has one critical point in an off-axis region thereof. The image-side surface 732 of the third lens element 730 has one critical point in an off-axis region thereof.

The fourth lens element 740 with positive refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has one inflection point. The image-side surface 742 of the fourth lens element 740 has one inflection point. The object-side surface 741 of the fourth lens element 740 has one critical point in an off-axis region thereof. The image-side surface 742 of the fourth lens element 740 has one critical point in an off-axis region thereof.

The fifth lens element 750 with positive refractive power has an object-side surface 751 being convex in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has two inflection points. The image-side surface 752 of the fifth lens element 750 has one inflection point. The object-side surface 751 of the fifth lens element 750 has one critical point in an off-axis region thereof.

The sixth lens element 760 with negative refractive power has an object-side surface 761 being concave in a paraxial region thereof and an image-side surface 762 being convex in a paraxial region thereof. The sixth lens element 760 is made of plastic material and has the object-side surface 761 and the image-side surface 762 being both aspheric. The object-side surface 761 of the sixth lens element 760 has two inflection points. The image-side surface 762 of the sixth lens element 760 has one inflection point. The image-side surface 762 of the sixth lens element 760 has one critical point in an off-axis region thereof.

The seventh lens element 770 with positive refractive power has an object-side surface 771 being convex in a paraxial region thereof and an image-side surface 772 being concave in a paraxial region thereof. The seventh lens element 770 is made of plastic material and has the object-side surface 771 and the image-side surface 772 being both aspheric. The object-side surface 771 of the seventh lens element 770 has two inflection points. The image-side surface 772 of the seventh lens element 770 has two inflection points. The object-side surface 771 of the seventh lens element 770 has one critical point in an off-axis region thereof. The image-side surface 772 of the seventh lens element 770 has one critical point in an off-axis region thereof.

The eighth lens element 780 with negative refractive power has an object-side surface 781 being convex in a paraxial region thereof and an image-side surface 782 being concave in a paraxial region thereof. The eighth lens element 780 is made of plastic material and has the object-side surface 781 and the image-side surface 782 being both aspheric. The object-side surface 781 of the eighth lens element 780 has four inflection points. The image-side surface 782 of the eighth lens element 780 has three inflection points. The object-side surface 781 of the eighth lens element 780 has one critical point in an off-axis region thereof. The image-side surface 782 of the eighth lens element 780 has one critical point in an off-axis region thereof.

The filter 790 is made of glass material and located between the eighth lens element 780 and the image surface 795, and will not affect the focal length of the photographing optical system. The image sensor 799 is disposed on or near the image surface 795 of the photographing optical system.

The detailed optical data of the 7th embodiment are shown in Table 13 and the aspheric surface data are shown in Table 14 below.

TABLE 13

7th Embodiment
f = 5.67 mm, Fno = 1.51, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.533 | | | | |
| 2 | Lens 1 | 3.415 | (ASP) | 0.888 | Plastic | 1.545 | 56.1 | 7.50 |
| 3 | | 18.869 | (ASP) | 0.035 | | | | |
| 4 | Lens 2 | 3.701 | (ASP) | 0.310 | Plastic | 1.669 | 19.5 | −20.59 |
| 5 | | 2.819 | (ASP) | 0.386 | | | | |
| 6 | Lens 3 | 5.625 | (ASP) | 0.324 | Plastic | 1.669 | 19.5 | −278.48 |
| 7 | | 5.334 | (ASP) | 0.048 | | | | |
| 8 | Stop | Plano | | 0.195 | | | | |
| 9 | Lens 4 | 8.799 | (ASP) | 0.340 | Plastic | 1.669 | 19.5 | 3093.10 |
| 10 | | 8.700 | (ASP) | 0.090 | | | | |
| 11 | Lens 5 | 57.035 | (ASP) | 1.144 | Plastic | 1.544 | 56.0 | 7.95 |
| 12 | | −4.646 | (ASP) | 0.198 | | | | |
| 13 | Lens 6 | −1.695 | (ASP) | 0.390 | Plastic | 1.669 | 19.5 | −17.41 |
| 14 | | −2.166 | (ASP) | 0.035 | | | | |
| 15 | Lens 7 | 1.985 | (ASP) | 0.556 | Plastic | 1.544 | 56.0 | 11.83 |
| 16 | | 2.587 | (ASP) | 1.016 | | | | |
| 17 | Lens 8 | 3.616 | (ASP) | 0.510 | Plastic | 1.545 | 56.1 | −9.44 |
| 18 | | 2.018 | (ASP) | 0.600 | | | | |
| 19 | Filter | Plano | | 0.210 | Glass | 1.517 | 64.2 | — |
| 20 | | Plano | | 0.578 | | | | |
| 21 | Image | Plano | | — | | | | | reference wavelength is 587.6 nm (d-line).
active radius of the stop 701 (Surface 8) is 1.685 mm.

TABLE 14

Aspheric Coefficients

| Surface # | 2 | 3 | 4 | 5 | 6 | 7 |
|---|---|---|---|---|---|---|
| k = | −1.7504E+00 | 0.0000E+00 | −1.0965E+00 | 1.3351E−01 | −3.3437E−01 | −1.9277E+00 |
| A4 = | 4.9695E−03 | −1.6207E−02 | −2.8445E−02 | −2.2187E−02 | −2.3183E−02 | −3.5738E−02 |
| A6 = | 1.8340E−03 | 7.8154E−03 | 2.0141E−03 | −9.6625E−03 | 5.8441E−03 | 9.5618E−03 |

TABLE 14-continued

Aspheric Coefficients

| | | | | | |
|---|---|---|---|---|---|
| A8 = | −1.8037E−03 | −3.6175E−03 | −1.6842E−03 | 4.3351E−03 | −7.3937E−03 | −7.3112E−03 |
| A10 = | 8.7042E−04 | 1.4743E−03 | 2.2951E−03 | −1.5205E−03 | 2.5521E−03 | 2.0227E−03 |
| A12 = | −2.3479E−04 | −4.2717E−04 | −9.7879E−04 | 4.5373E−04 | −6.4085E−04 | 2.3595E−04 |
| A14 = | 3.1579E−05 | 6.5190E−05 | 1.7159E−04 | −1.4707E−04 | 9.8782E−05 | −1.8020E−04 |
| A16 = | −1.9360E−06 | −3.7468E−06 | −8.3518E−06 | 2.3364E−05 | −4.8487E−06 | 1.6476E−05 |

| Surface # | 9 | 10 | 11 | 12 | 13 | 14 |
|---|---|---|---|---|---|---|
| k = | 0.0000E+00 | 6.4462E−01 | 0.0000E+00 | −1.1099E−01 | −1.0000E+00 | −1.0000E+00 |
| A4 = | −3.5647E−02 | −2.9396E−02 | −2.0362E−02 | −3.8398E−02 | 7.0280E−02 | 3.2205E−02 |
| A6 = | 2.0027E−03 | 1.9626E−02 | 2.7805E−02 | 1.4928E−02 | −5.4183E−02 | −2.6309E−02 |
| A8 = | −4.3317E−03 | −2.7609E−02 | −3.0796E−02 | −2.5175E−03 | 3.7564E−02 | 1.8723E−02 |
| A10 = | 9.4333E−04 | 1.9168E−02 | 1.6077E−02 | −4.7988E−03 | −2.0107E−02 | −8.4381E−03 |
| A12 = | 2.1208E−03 | −6.8961E−03 | −2.7614E−03 | 4.2828E−03 | 7.9536E−03 | 2.6480E−03 |
| A14 = | −1.3869E−03 | 1.2421E−03 | −1.1717E−03 | −1.6293E−03 | −2.0365E−03 | −5.5793E−04 |
| A16 = | 3.1895E−04 | −8.7541E−05 | 6.8926E−04 | 3.2872E−04 | 3.0698E−04 | 7.6730E−05 |
| A18 = | −2.8389E−05 | −3.9294E−07 | −1.2876E−04 | −3.4638E−05 | −2.4027E−05 | −6.3825E−06 |
| A20 = | — | — | 8.5004E−06 | 1.5362E−06 | 6.9831E−07 | 2.4385E−07 |

| surface # | 15 | 16 | 17 | 18 |
|---|---|---|---|---|
| k = | −1.0000E+00 | −1.0000E+00 | −1.00000E+00 | −1.0000E+00 |
| A4 = | −4.6607E−02 | 2.3749E−03 | −9.2672E−02 | −1.0166E−01 |
| A6 = | 1.3183E−02 | −8.8938E−03 | 2.1419E−02 | 2.8558E−02 |
| A8 = | −6.8213E−03 | 1.5920E−03 | −3.8325E−03 | −6.7977E−03 |
| A10 = | 2.1927E−03 | −9.2175E−05 | 6.4837E−04 | 1.2148E−03 |
| A12 = | −4.8423E−04 | −9.2374E−06 | −9.2158E−05 | −1.5413E−04 |
| A14 = | 7.4023E−05 | 1.8687E−06 | 9.2698E−06 | 1.3100E−05 |
| A16 = | −7.5083E−06 | −1.1342E−07 | −5.9028E−07 | −6.9446E−07 |
| A18 = | 4.5360E−07 | 1.9103E−09 | 2.1104E−08 | 2.0531E−08 |
| A20 = | −1.2119E−08 | 3.4886E−11 | −3.2117E−10 | −2.5726E−10 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.67 | R3/R4 | 1.31 |
| Fno | 1.51 | (R9 + R10)/(R9 − R10) | 0.85 |
| HFOV [deg.] | 39.5 | f/f1 | 0.76 |
| (Vi/Ni)min | 11.65 | f/f2 | −0.28 |
| V2 | 19.5 | \|f/f2\| + \|f/f3\| | 0.30 |
| V2 + V3 + V4 | 58.4 | f/f2 + f/f3 + f/f4 | −0.29 |
| V2 + V4 | 38.9 | f/f3 | −0.02 |
| V2/N2 | 11.65 | f/f4 | 0.002 |
| V6 | 19.5 | f/f5 | 0.71 |
| ΣCT/CT5 | 3.90 | f/f6 | −0.33 |
| (CT2 + CT3 + CT4)/(CT1 + CT5) | 0.48 | f/f7 | 0.48 |
| CT3/CT2 | 1.05 | f/f8 | −0.60 |
| CT5/CT1 | 1.29 | f/f12 | 0.54 |
| CT5/CT3 | 3.53 | f/f23 | −0.30 |
| CT7/CT5 | 0.49 | f/\|R11\| + f/\|R12\| | 5.97 |
| TD/CT5 | 5.65 | f5/CT5 | 6.95 |
| TD/f2 | −0.31 | f5/f1 | 1.06 |
| TL [mm] | 7.85 | f8/f7 | −0.80 |
| TL/f | 1.38 | Y82/Y11 | 2.08 |
| TL/ImgH | 1.64 | Yc72/Yc71 | 1.28 |
| R1/R2 | 0.18 | Yc82/Y82 | 0.44 |
| R3/f | 0.65 | — | — |

8th Embodiment

Figure 15:
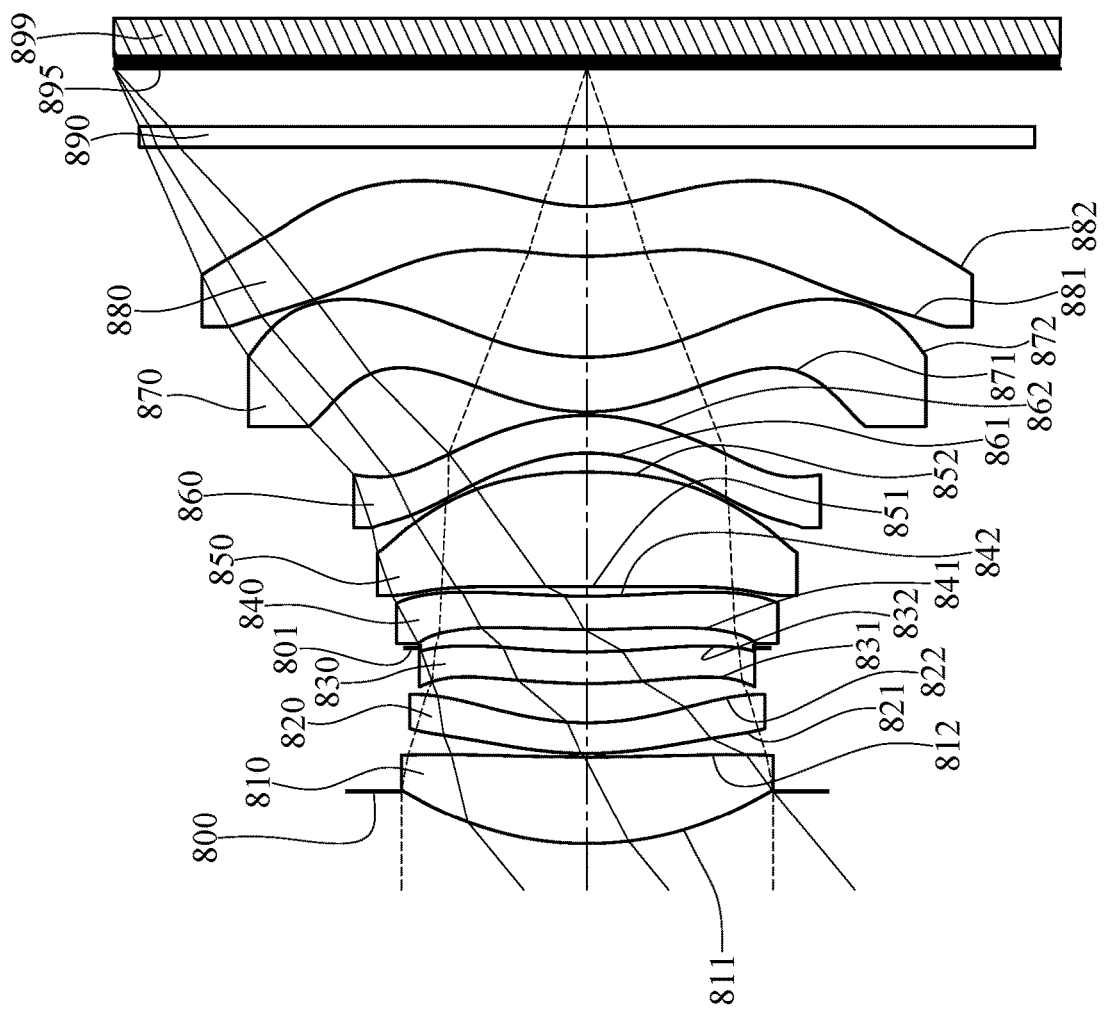
FIG. 15 is a schematic view of an image capturing unit according to the 8th embodiment of the present disclosure.
Figure 16:
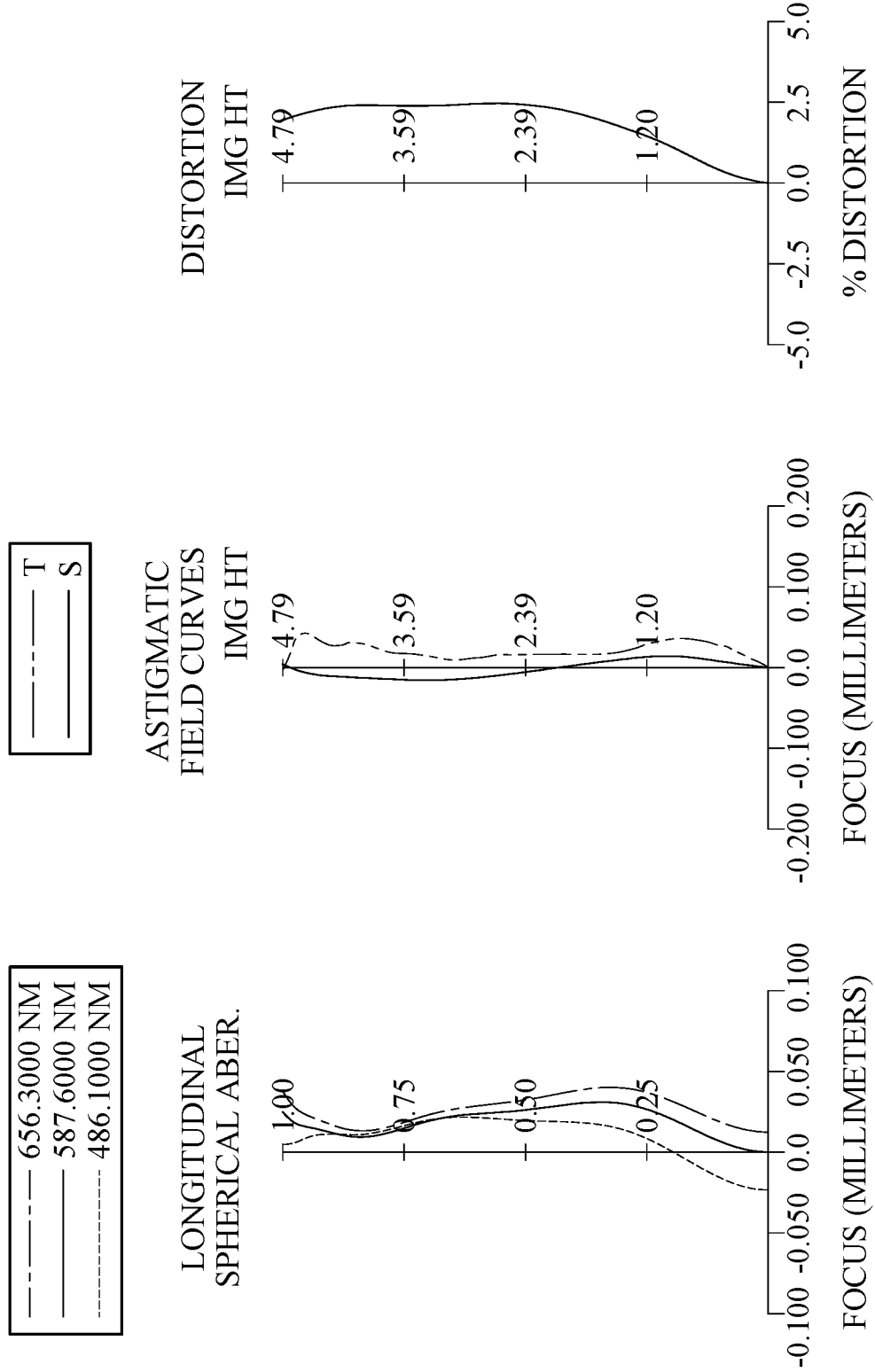
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical system (its reference numeral is omitted) of the present disclosure and an image sensor 899. The photographing optical system includes, in order from an object side to an image side, an aperture stop 800, a first lens element 810, a second lens element 820, a third lens element 830, a stop 801, a fourth lens element 840, a fifth lens element 850, a sixth lens element 860, a seventh lens element 870, an eighth lens element 880, a filter 890 and an image surface 895.

The photographing optical system includes eight lens elements (810, 820, 830, 840, 850, 860, 870 and 880) with no additional lens element disposed between each of the adjacent eight lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has one inflection point. The image-side surface 812 of the first lens element 810 has one inflection point. The image-side surface 812 of the first lens element 810 has one critical point in an off-axis region thereof.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has two inflection points. The image-side surface 822 of the second lens element 820 has one inflection point.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has one inflection point. The image-side surface 832 of the third lens element 830 has one inflection point. The object-side surface 831 of the third lens element 830 has one critical point in an off-axis region thereof. The image-side surface 832 of the third lens element 830 has one critical point in an off-axis region thereof.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has one inflection point. The image-side surface 842 of the fourth lens element 840 has one inflection point. The object-side surface 841 of the fourth lens element 840 has one critical point in an off-axis region thereof. The image-side surface 842 of the fourth lens element 840 has one critical point in an off-axis region thereof.

The fifth lens element 850 with positive refractive power has an object-side surface 851 being convex in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has two inflection points. The image-side surface 852 of the fifth lens element 850 has one inflection point. The object-side surface 851 of the fifth lens element 850 has one critical point in an off-axis region thereof.

The sixth lens element 860 with negative refractive power has an object-side surface 861 being concave in a paraxial region thereof and an image-side surface 862 being convex in a paraxial region thereof. The sixth lens element 860 is made of plastic material and has the object-side surface 861 and the image-side surface 862 being both aspheric. The object-side surface 861 of the sixth lens element 860 has two inflection points. The image-side surface 862 of the sixth lens element 860 has one inflection point. The image-side surface 862 of the sixth lens element 860 has one critical point in an off-axis region thereof.

The seventh lens element 870 with positive refractive power has an object-side surface 871 being convex in a paraxial region thereof and an image-side surface 872 being concave in a paraxial region thereof. The seventh lens element 870 is made of plastic material and has the object-side surface 871 and the image-side surface 872 being both aspheric. The object-side surface 871 of the seventh lens element 870 has two inflection points. The image-side surface 872 of the seventh lens element 870 has two inflection points. The object-side surface 871 of the seventh lens element 870 has one critical point in an off-axis region thereof. The image-side surface 872 of the seventh lens element 870 has one critical point in an off-axis region thereof.

The eighth lens element 880 with negative refractive power has an object-side surface 881 being convex in a paraxial region thereof and an image-side surface 882 being concave in a paraxial region thereof. The eighth lens element 880 is made of plastic material and has the object-side surface 881 and the image-side surface 882 being both aspheric. The object-side surface 881 of the eighth lens element 880 has four inflection points. The image-side surface 882 of the eighth lens element 880 has four inflection points. The object-side surface 881 of the eighth lens element 880 has one critical point in an off-axis region thereof. The image-side surface 882 of the eighth lens element 880 has one critical point in an off-axis region thereof.

The filter 890 is made of glass material and located between the eighth lens element 880 and the image surface 895, and will not affect the focal length of the photographing optical system. The image sensor 899 is disposed on or near the image surface 895 of the photographing optical system.

The detailed optical data of the 8th embodiment are shown in Table 15 and the aspheric surface data are shown in Table 16 below.

TABLE 15

8th Embodiment
f = 5.67 mm, Fno = 1.51, HFOV = 39.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.534 | | | | |
| 2 | Lens 1 | 3.428 | (ASP) | 0.883 | Plastic | 1.545 | 56.1 | 7.79 |
| 3 | | 16.214 | (ASP) | 0.035 | | | | |
| 4 | Lens 2 | 3.600 | (ASP) | 0.310 | Plastic | 1.669 | 19.5 | −24.99 |
| 5 | | 2.860 | (ASP) | 0.397 | | | | |
| 6 | Lens 3 | 6.292 | (ASP) | 0.320 | Plastic | 1.669 | 19.5 | −237.44 |
| 7 | | 5.929 | (ASP) | 0.037 | | | | |
| 8 | Stop | Plano | | 0.188 | | | | |
| 9 | Lens 4 | 9.244 | (ASP) | 0.340 | Plastic | 1.669 | 19.5 | −237.72 |
| 10 | | 8.608 | (ASP) | 0.096 | | | | |
| 11 | Lens 5 | 50.195 | (ASP) | 1.164 | Plastic | 1.544 | 56.0 | 8.19 |
| 12 | | −4.848 | (ASP) | 0.193 | | | | |
| 13 | Lens 6 | −1.740 | (ASP) | 0.378 | Plastic | 1.669 | 19.5 | −19.06 |
| 14 | | −2.191 | (ASP) | 0.035 | | | | |
| 15 | Lens 7 | 1.984 | (ASP) | 0.555 | Plastic | 1.544 | 56.0 | 11.97 |
| 16 | | 2.572 | (ASP) | 1.020 | | | | |

TABLE 15-continued

8th Embodiment
f = 5.67 mm, Fno = 1.51, HFOV = 39.6 deg.

| Surface # | | Curvature Radius | | Thickness | Material | Index | Abbe # | Focal Length |
|---|---|---|---|---|---|---|---|---|
| 17 | Lens 8 | 3.415 | (ASP) | 0.510 | Plastic | 1.545 | 56.1 | −9.41 |
| 18 | | 1.942 | (ASP) | 0.600 | | | | |
| 19 | Filter | Plano | | 0.210 | Glass | 1.517 | 64.2 | — |
| 20 | | Plano | | 0.581 | | | | |
| 21 | Image | Plano | | — | | | | | reference wavelength is 587.6 nm (d-line).
active radius of the stop 801 (Surface 8) is 1.690 mm.

TABLE 16

| Aspheric Coefficients | | | | | | |
|---|---|---|---|---|---|---|
| Surface # | 2 | 3 | 4 | 5 | 6 | 7 |
| k = | −1.7305E+00 | 0.0000E+00 | −1.2625E+00 | 2.1940E−01 | 1.4551E+00 | −3.1361E−01 |
| A4 = | 4.9471E−03 | −2.1364E−02 | −3.0922E−02 | −1.9983E−02 | −2.0200E−02 | −3.4239E−02 |
| A6 = | 1.9867E−03 | 1.2095E−02 | 3.5897E−02 | −1.3527E−02 | 2.5809E−03 | 1.2158E−02 |
| A8 = | −2.0137E−03 | −6.0456E−03 | −2.7015E−03 | 7.2857E−03 | −5.5344E−03 | −1.3972E−02 |
| A10 = | 1.0166E−03 | 2.4414E−03 | 3.0576E−03 | −2.7942E−03 | 1.4978E−03 | 7.9503E−03 |
| A12 = | −2.8845E−04 | −6.8271E−04 | −1.3247E−03 | 8.2538E−04 | 8.4562E−05 | −2.1414E−03 |
| A14 = | 4.1534E−05 | 1.0587E−04 | 2.5267E−04 | −2.1391E−04 | −1.7155E−04 | 2.4448E−04 |
| A16 = | −2.6336E−06 | −6.6604E−06 | −1.6042E−05 | 2.8250E−05 | 3.1195E−05 | −9.3062E−06 |
| Surface # | 9 | 10 | 11 | 12 | 13 | 14 |
| k = | 0.0000E+00 | 5.5358E+00 | 0.0000E+00 | −4.9658E−02 | −1.0000E+00 | −1.0000E+00 |
| A4 = | −3.7301E−02 | −3.5065E−02 | −2.4897E−02 | −4.0500E−02 | 7.2719E−02 | 3.6045E−02 |
| A6 = | 1.3115E−02 | 3.4172E−02 | 3.6747E−02 | 1.3341E−02 | −6.9643E−02 | −3.6883E−02 |
| A8 = | −1.8395E−02 | −4.0870E−02 | −3.6580E−02 | −1.4145E−03 | 5.8201E−02 | 3.1020E−02 |
| A10 = | 1.0897E−02 | 2.7491E−02 | 2.0030E−02 | −2.2885E−03 | −3.3615E−02 | −1.6529E−02 |
| A12 = | −1.7033E−03 | −1.0580E−02 | −5.5609E−03 | 1.4981E−03 | 1.3105E−02 | 5.8302E−03 |
| A14 = | −6.8261E−04 | 2.2669E−03 | 1.4281E−04 | −4.1206E−04 | −3.2313E−03 | −1.3177E−03 |
| A16 = | 2.8286E−04 | −2.4481E−04 | 3.3305E−04 | 5.2440E−05 | 4.7217E−04 | 1.8481E−04 |
| A18 = | −3.1526E−05 | 9.7038E−06 | −7.8024E−05 | −2.3456E−06 | −3.6496E−05 | −1.4816E−05 |
| A20 = | — | — | 5.5633E−06 | −4.2338E−09 | 1.0955E−06 | 5.2183E−07 |
| Surface # | 15 | 16 | 17 | 18 | | |
| k = | −1.0000E+00 | −1.0000E+00 | −1.0000E+00 | 1.0000E+00 | | |
| A4 = | −4.9892E−02 | −3.6695E−03 | −9.9850E−02 | −1.0842E−01 | | |
| A6 = | 1.5818E−02 | −3.5100E−03 | 2.3121E−02 | 3.1129E−02 | | |
| A8 = | −7.5900E−03 | −8.2471E−04 | −3.8552E−03 | −7.4738E−03 | | |
| A10 = | 2.1914E−03 | 5.5081E−04 | 5.5559E−04 | 1.3379E−03 | | |
| A12 = | −4.3550E−04 | −1.1744E−04 | −6.6598E−05 | −1.6973E−04 | | |
| A14 = | 6.2691E−05 | 1.3489E−05 | 5.9463E−06 | 1.4443E−05 | | |
| A16 = | −6.4685E−06 | −8.8149E−07 | −3.5648E−07 | −7.6824E−07 | | |
| A18 = | 4.2414E−07 | 3.0153E−08 | 1.2545E−08 | 2.2828E−08 | | |
| A20 = | −1.2584E−08 | −4.0331E−10 | −1.9301E−10 | −2.8775E−10 | | |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.67 | R3/R4 | 1.26 |
| Fno | 1.51 | (R9 + R10)/(R9 − R10) | 0.82 |
| HFOV [deg.] | 39.6 | f/f1 | 0.73 |
| (Vi/Ni)min | 11.65 | f/f2 | −0.23 |
| V2 | 19.5 | \|f/f2\| + \|f/f3\| | 0.25 |
| V2 + V3 + V4 | 58.4 | f/f2 + f/f3 + f/f4 | −0.27 |
| V2 + V4 | 38.9 | f/f3 | −0.02 |
| V2/N2 | 11.65 | f/f4 | −0.02 |
| V6 | 19.5 | f/f5 | 0.69 |
| ΣCT/CT5 | 3.83 | f/f6 | −0.30 |
| (CT2 + CT3 + CT4)/(CT1 + CT5) | 0.47 | f/f7 | 0.47 |
| CT3/CT2 | 1.03 | f/f8 | −0.60 |
| CT5/CT1 | 1.32 | f/f12 | 0.55 |
| CT5/CT3 | 3.64 | f/f23 | −0.26 |
| CT7/CT5 | 0.48 | f/\|R11\| + f/\|R12\| | 5.85 |
| TD/CT5 | 5.55 | f5/CT5 | 7.03 |
| TD/f2 | −0.26 | f5/f1 | 1.05 |

-continued

| 8th Embodiment | | | |
|---|---|---|---|
| TL [mm] | 7.85 | f8/f7 | −0.79 |
| TL/f | 1.38 | Y82/Y11 | 2.07 |
| TL/ImgH | 1.64 | Yc72/Yc71 | 1.28 |
| R1/R2 | 0.21 | Yc82/Y82 | 0.44 |
| R3/f | 0.63 | — | — |

9th Embodiment

Figure 17:
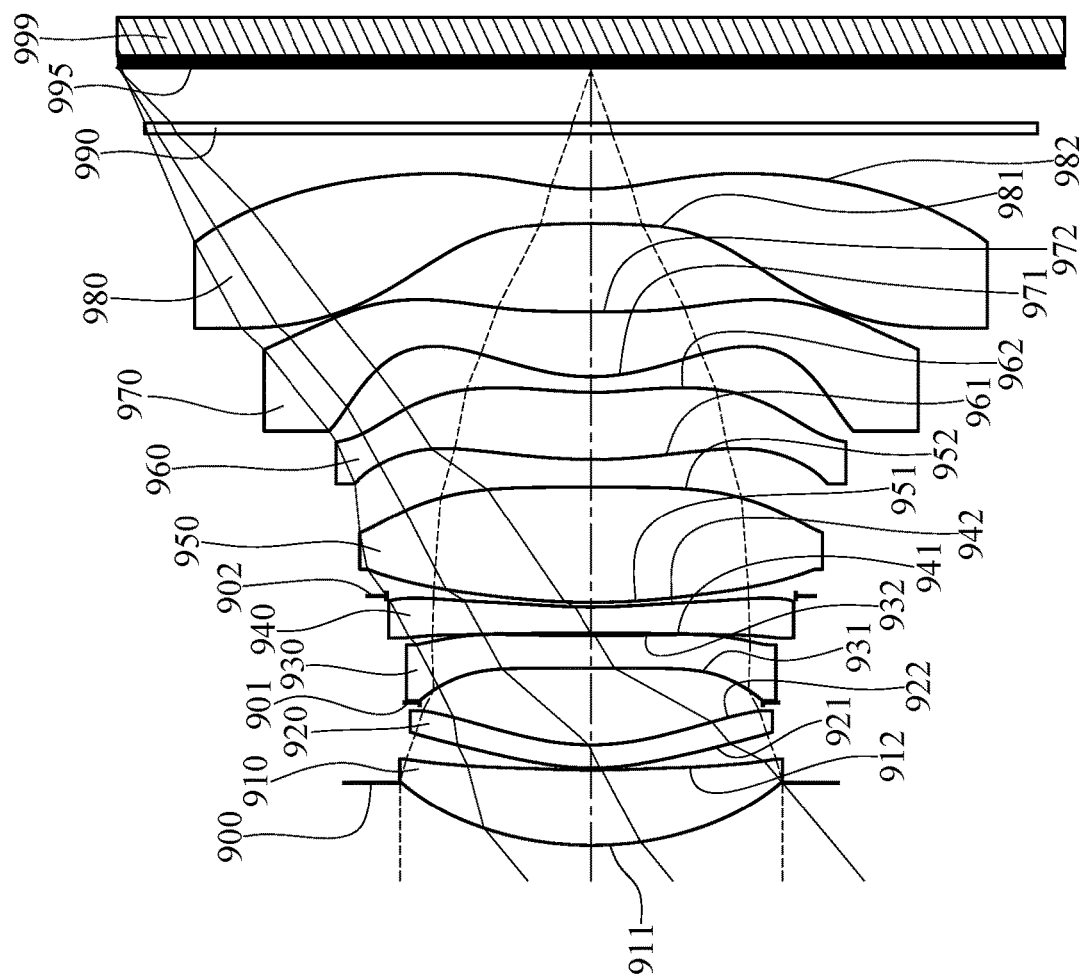
FIG. 17 is a schematic view of an image capturing unit according to the 9th embodiment of the present disclosure.
Figure 18:
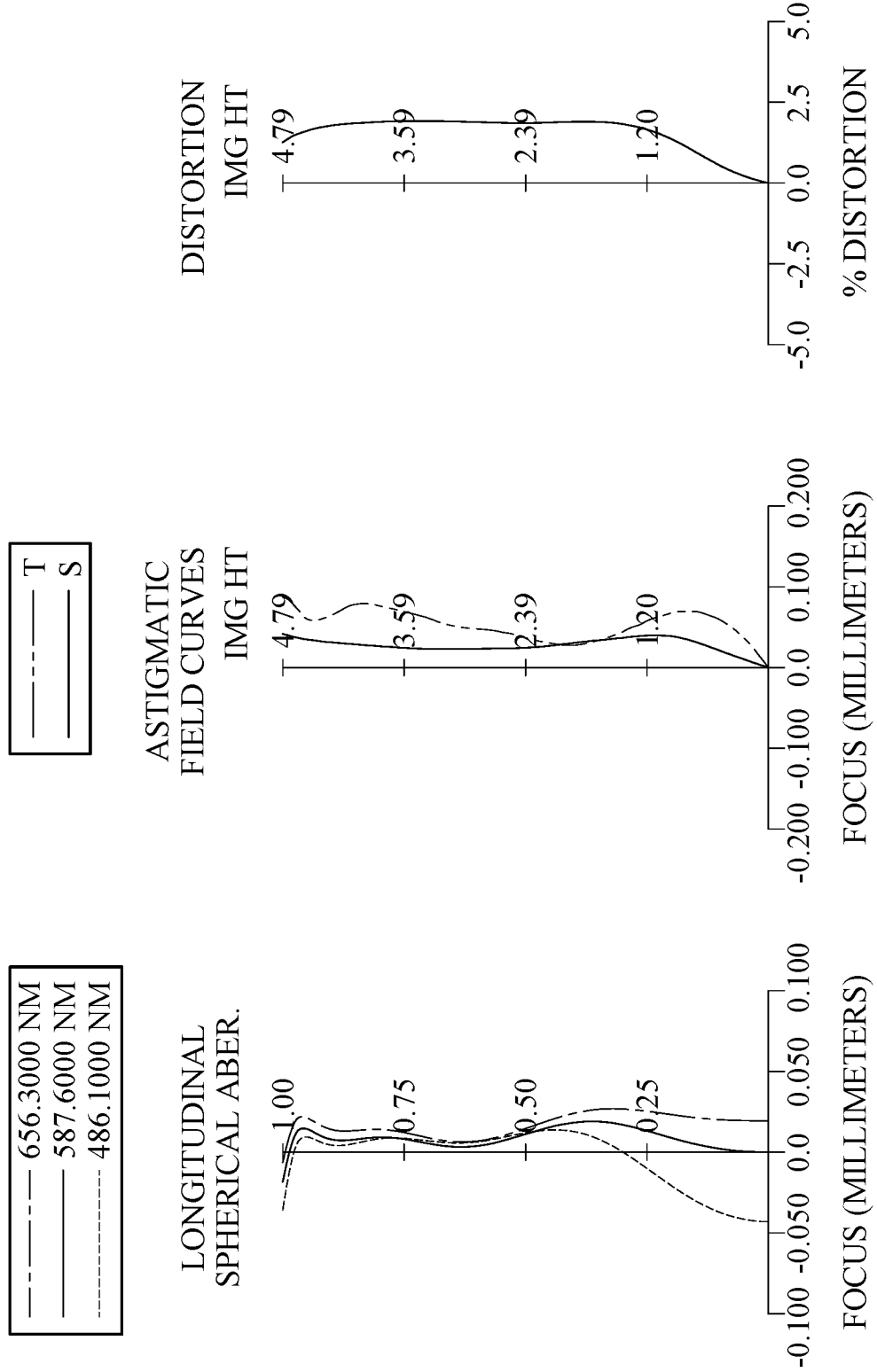
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical system (its reference numeral is omitted) of the present disclosure and an image sensor 999. The photographing optical system includes, in order from an object side to an image side, an aperture stop 900, a first lens element 910, a second lens element 920, a stop 901, a third lens element 930, a fourth lens element 940, a stop 902, a fifth lens element 950, a sixth lens element 960, a seventh lens element 970, an eighth lens element 980, a filter 990 and an image surface 995. The photographing optical system includes eight lens elements (910, 920, 930, 940, 950, 960, 970 and 980) with no additional lens element disposed between each of the adjacent eight lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The image-side surface 912 of the first lens element 910 has three inflection points.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The image-side surface 922 of the second lens element 920 has one inflection point. The image-side surface 922 of the second lens element 920 has one critical point in an off-axis region thereof.

The third lens element 930 with positive refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has two inflection points. The image-side surface 932 of the third lens element 930 has three inflection points. The image-side surface 932 of the third lens element 930 has three critical points in an off-axis region thereof.

The fourth lens element 940 with negative refractive power has an object-side surface 941 being concave in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has three inflection points. The image-side surface 942 of the fourth lens element 940 has three inflection points. The image-side surface 942 of the fourth lens element 940 has one critical point in an off-axis region thereof.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has two inflection points. The image-side surface 952 of the fifth lens element 950 has one critical point in an off-axis region thereof.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has one inflection point. The image-side surface 962 of the sixth lens element 960 has two inflection points. The object-side surface 961 of the sixth lens element 960 has one critical point in an off-axis region thereof. The image-side surface 962 of the sixth lens element 960 has one critical point in an off-axis region thereof.

The seventh lens element 970 with positive refractive power has an object-side surface 971 being convex in a paraxial region thereof and an image-side surface 972 being convex in a paraxial region thereof. The seventh lens element 970 is made of plastic material and has the object-side surface 971 and the image-side surface 972 being both aspheric. The object-side surface 971 of the seventh lens element 970 has two inflection points. The image-side surface 972 of the seventh lens element 970 has four inflection points. The object-side surface 971 of the seventh lens element 970 has one critical point in an off-axis region thereof. The image-side surface 972 of the seventh lens element 970 has two critical points in an off-axis region thereof.

The eighth lens element 980 with negative refractive power has an object-side surface 981 being concave in a paraxial region thereof and an image-side surface 982 being concave in a paraxial region thereof. The eighth lens element 980 is made of plastic material and has the object-side surface 981 and the image-side surface 982 being both aspheric. The object-side surface 981 of the eighth lens element 980 has one inflection point. The image-side surface 982 of the eighth lens element 980 has one inflection point. The image-side surface 982 of the eighth lens element 980 has one critical point in an off-axis region thereof.

The filter 990 is made of glass material and located between the eighth lens element 980 and the image surface 995, and will not affect the focal length of the photographing optical system. The image sensor 999 is disposed on or near the image surface 995 of the photographing optical system.

The detailed optical data of the 9th embodiment are shown in Table 17 and the aspheric surface data are shown in Table 18 below.

TABLE 17

9th Embodiment
f = 5.69 mm, Fno = 1.47, HFOV = 39.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.641 | | | | |
| 2 | Lens 1 | 3.533 | (ASP) | 0.771 | Plastic | 1.545 | 56.1 | 10.13 |
| 3 | | 9.063 | (ASP) | 0.020 | | | | |
| 4 | Lens 2 | 2.590 | (ASP) | 0.235 | Plastic | 1.679 | 18.4 | 101.16 |
| 5 | | 2.593 | (ASP) | 0.426 | | | | |
| 6 | Stop | Plano | | 0.349 | | | | |
| 7 | Lens 3 | −195.313 | (ASP) | 0.336 | Plastic | 1.679 | 18.4 | 93.51 |
| 8 | | −47.962 | (ASP) | 0.020 | | | | |
| 9 | Lens 4 | −229.606 | (ASP) | 0.263 | Plastic | 1.639 | 23.5 | −9.37 |
| 10 | | 6.146 | (ASP) | 0.113 | | | | |
| 11 | Stop | Plano | | −0.066 | | | | |
| 12 | Lens 5 | 7.570 | (ASP) | 1.173 | Plastic | 1.544 | 56.0 | 14.29 |
| 13 | | 269.542 | (ASP) | 0.282 | | | | |
| 14 | Lens 6 | 4.631 | (ASP) | 0.680 | Plastic | 1.562 | 44.6 | −30.94 |
| 15 | | 3.464 | (ASP) | 0.158 | | | | |
| 16 | Lens 7 | 2.035 | (ASP) | 0.659 | Plastic | 1.544 | 56.0 | 3.70 |
| 17 | | −188.679 | (ASP) | 0.897 | | | | |
| 18 | Lens 8 | −13.062 | (ASP) | 0.350 | Plastic | 1.534 | 55.9 | −4.04 |
| 19 | | 2.611 | (ASP) | 0.560 | | | | |
| 20 | Filter | Plano | | 0.110 | Glass | 1.517 | 64.2 | — |
| 21 | | Plano | | 0.556 | | | | |
| 22 | Image | Plano | | — | | | | | reference wavelength is 587.6 nm (d-line).
active radius of the stop 901 (Surface 6) is 1.738 mm.
active radius of the stop 902 (Surface 11) is 2.074 mm.

TABLE 18

Aspheric Coefficients

| Surface # | 2 | 3 | 4 | 5 | 7 | 8 |
|---|---|---|---|---|---|---|
| k = | 5.3870E−02 | −9.9000E+01 | −6.6463E+00 | −4.5732E+00 | −9.9000E+01 | −9.9000E+01 |
| A4 = | 4.5974E−03 | −4.1530E−02 | −1.4312E−02 | 1.8460E−02 | 1.2173E−02 | 6.8900E−02 |
| A6 = | −8.8344E−04 | 3.9438E−02 | −1.9189E−02 | −5.1369E−02 | −3.0855E−02 | −7.4555E−02 |
| A8 = | −8.5696E−04 | −1.8042E−02 | 3.0911E−02 | 4.2622E−02 | 5.2873E−03 | 2.9837E−02 |
| A10 = | 1.3077E−03 | 4.8140E−03 | −1.9234E−02 | −1.8801E−02 | −7.0960E−04 | −6.1939E−03 |
| A12 = | −6.0344E−04 | −6.8608E−04 | 6.4091E−03 | 4.2737E−03 | 5.3096E−04 | 5.7945E−04 |
| A14 = | 1.3052E−04 | 3.8796E−05 | −1.1297E−03 | −4.0056E−04 | −1.0803E−04 | — |
| A16 = | −1.0982E−05 | — | 8.3137E−05 | — | — | — |

| Surface # | 9 | 10 | 12 | 13 | 14 | 15 |
|---|---|---|---|---|---|---|
| k = | 9.0000E+01 | 4.1332E+00 | 5.1893E+00 | 9.0000E+01 | −5.9873E+01 | −6.1866E+00 |
| A4 = | 2.4018E−03 | −5.2518E−02 | 5.3577E−03 | −3.0806E−02 | 1.7289E−03 | −1.3528E−01 |
| A6 = | −2.5230E−02 | 1.6565E−02 | −1.3508E−02 | 1.5587E−02 | 2.8606E−03 | 7.3277E−02 |
| A8 = | 2.5354E−02 | −1.3403E−03 | 6.7561E−03 | −1.0595E−02 | −4.4874E−03 | −2.7914E−02 |
| A10 = | −1.0110E−02 | 3.9710E−04 | −1.5311E−03 | 3.8383E−03 | 1.4402E−03 | 6.6565E−03 |
| A12 = | 1.7396E−03 | −5.3271E−04 | 1.5083E−04 | −7.4337E−04 | −3.7219E−04 | −1.0401E−03 |
| A14 = | −1.0558E−04 | 1.4793E−04 | −1.0665E−06 | 7.3950E−05 | 8.4162E−05 | 1.1068E−04 |
| A16 = | — | −1.2842E−05 | −5.7391E−07 | −2.9214E−06 | −1.0693E−05 | −7.2841E−06 |
| A18 = | — | — | — | — | 5.0813E−07 | 2.1496E−07 |

| Surface # | 16 | 17 | 18 | 19 |
|---|---|---|---|---|
| k = | −7.0247E−01 | −9.9000E+01 | 9.3821E+00 | −1.6981E+00 |
| A4 = | −6.3664E−02 | 9.1981E−02 | −6.1133E−02 | −8.3365E−02 |
| A6 = | 6.4182E−03 | −5.8061E−02 | −3.5240E−03 | 2.0710E−02 |
| A8 = | 7.3294E−04 | 1.8445E−02 | 8.0553E−03 | −3.0238E−03 |
| A10 = | −1.8560E−03 | −3.7362E−03 | −2.2045E−03 | 2.4783E−04 |
| A12 = | 7.2607E−04 | 4.9469E−04 | 3.0998E−04 | −7.8099E−06 |
| A14 = | −1.3597E−04 | −4.2291E−05 | −2.5933E−05 | −4.2273E−07 |
| A16 = | 1.2692E−05 | 2.2505E−06 | 1.3057E−06 | 5.0517E−08 |
| A18 = | −4.6653E−07 | −6.8088E−08 | −3.6682E−08 | −1.8635E−09 |
| A20 = | — | 9.0052E−10 | 4.4343E−10 | 2.5048E−11 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 5.69 | R3/R4 | 1.00 |
| Fno | 1.47 | (R9 + R10)/(R9 − R10) | −1.06 |
| HFOV [deg.] | 39.7 | f/f1 | 0.56 |
| (Vi/Ni)min | 10.98 | f/f2 | 0.06 |
| V2 | 18.4 | \|f/f2\| + \|f/f3\| | 0.12 |
| V2 + V3 + V4 | 60.4 | f/f2 + f/f3 + f/f4 | −0.49 |
| V2 + V4 | 41.9 | f/f3 | 0.06 |
| V2/N2 | 10.98 | f/f4 | −0.61 |
| V6 | 44.6 | f/f5 | 0.40 |
| ΣCT/CT5 | 3.81 | f/f6 | −0.18 |
| (CT2 + CT3 + CT4)/(CT1 + CT5) | 0.43 | f/f7 | 1.54 |
| CT3/CT2 | 1.43 | f/f8 | −1.41 |
| CT5/CT1 | 1.52 | f/f12 | 0.63 |
| CT5/CT3 | 3.49 | f/f23 | 0.11 |
| CT7/CT5 | 0.56 | f/\|R11\| + f/\|R12\| | 2.87 |
| TD/CT5 | 5.68 | f5/CT5 | 12.18 |
| TD/f2 | 0.07 | f5/f1 | 1.41 |
| TL [mm] | 7.89 | f8/f7 | −1.09 |
| TL/f | 1.39 | Y82/Y11 | 2.07 |
| TL/ImgH | 1.65 | Yc72/Yc71 | 0.08; 1.09 |
| R1/R2 | 0.39 | Yc82/Y82 | 0.38 |
| R3/f | 0.46 | — | — |

10th Embodiment

Figure 19:
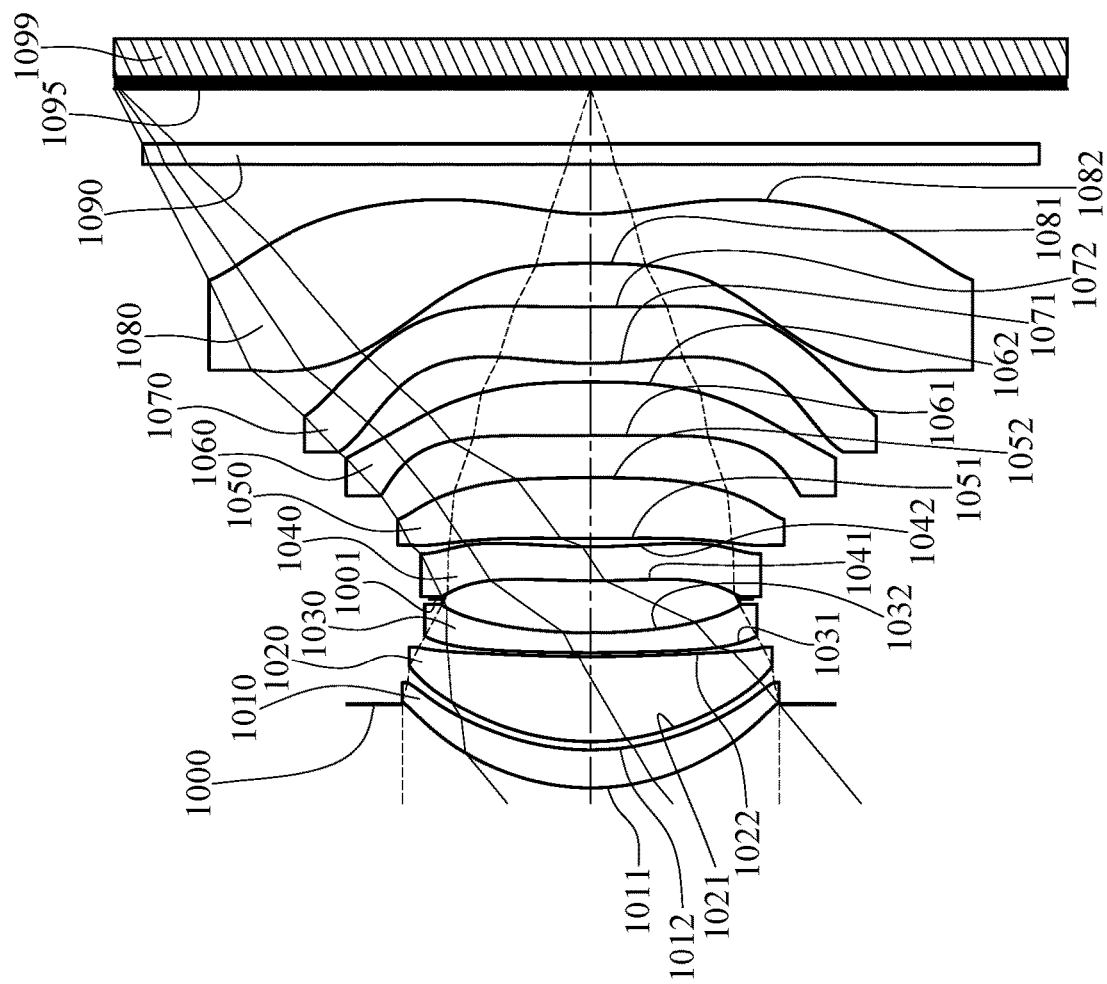
FIG. 19 is a schematic view of an image capturing unit according to the 10th embodiment of the present disclosure.
Figure 20:
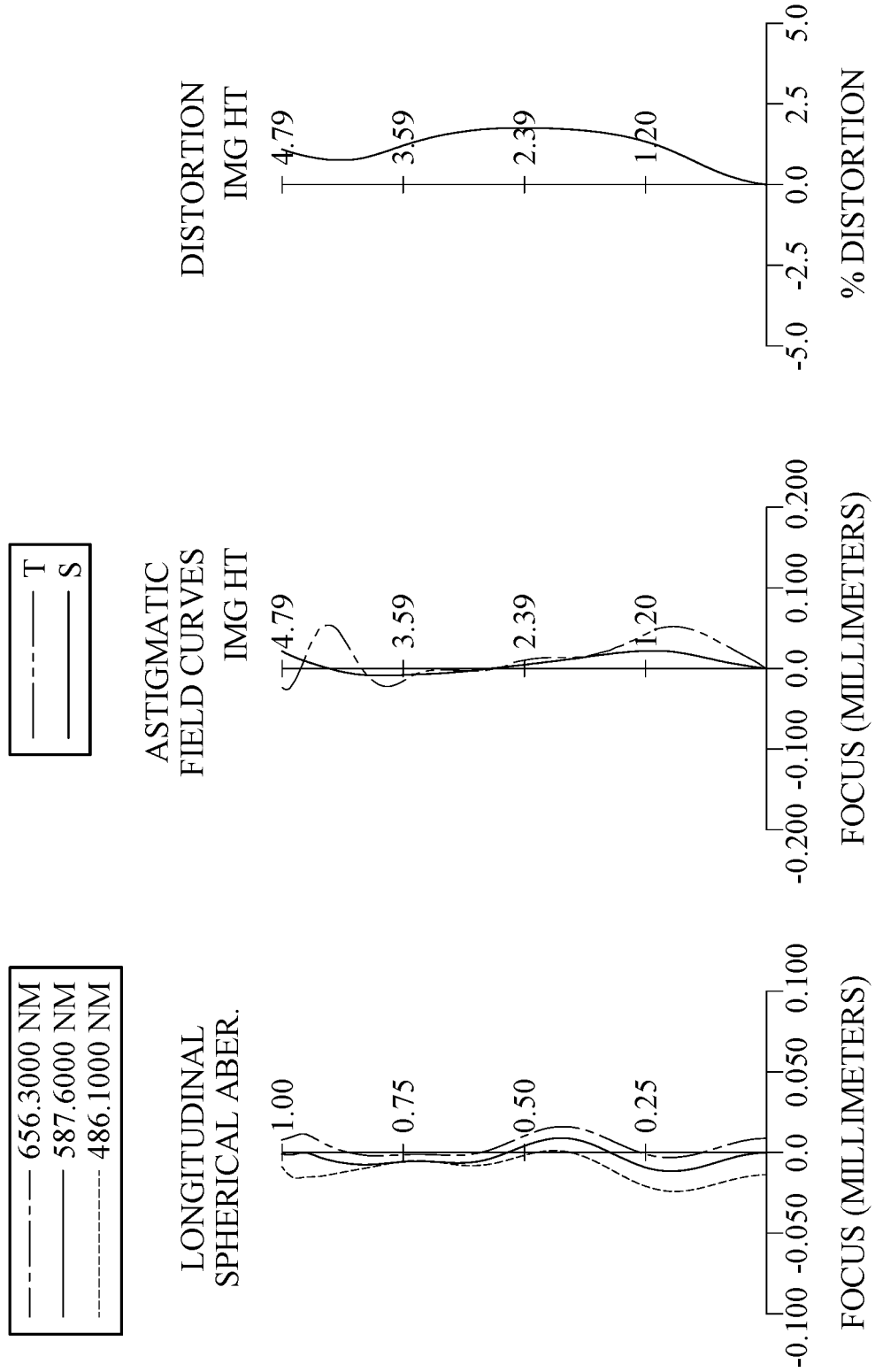
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical system (its reference numeral is omitted) of the present disclosure and an image sensor 1099. The photographing optical system includes, in order from an object side to an image side, an aperture stop 1000, a first lens element 1010, a second lens element 1020, a third lens element 1030, a stop 1001, a fourth lens element 1040, a fifth lens element 1050, a sixth lens element 1060, a seventh lens element 1070, an eighth lens element 1080, a filter 1090 and an image surface 1095. The photographing optical system includes eight lens elements (1010, 1020, 1030, 1040, 1050, 1060, 1070 and 1080) with no additional lens element disposed between each of the adjacent eight lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The object-side surface 1011 of the first lens element 1010 has one inflection point. The image-side surface 1012 of the first lens element 1010 has one inflection point.

The second lens element 1020 with positive refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has one inflection point. The image-side surface 1042 of the fourth lens element 1040 has two inflection points. The object-side surface 1041 of the fourth lens element 1040 has one critical point in an off-axis region thereof. The image-side surface 1042 of the fourth lens element 1040 has two critical points in an off-axis region thereof.

The fifth lens element 1050 with positive refractive power has an object-side surface 1051 being convex in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has two inflection points. The image-side surface 1052 of the fifth lens element 1050 has one inflection point. The object-side surface 1051 of the fifth lens element 1050 has two critical points in an off-axis region thereof.

The sixth lens element 1060 with positive refractive power has an object-side surface 1061 being convex in a paraxial region thereof and an image-side surface 1062 being convex in a paraxial region thereof. The sixth lens element 1060 is made of plastic material and has the object-side surface 1061 and the image-side surface 1062 being both aspheric. The object-side surface 1061 of the sixth lens element 1060 has two inflection points. The image-side surface 1062 of the sixth lens element 1060 has two inflection points. The object-side surface 1061 of the sixth lens element 1060 has one critical point in an off-axis region thereof.

The seventh lens element 1070 with positive refractive power has an object-side surface 1071 being convex in a paraxial region thereof and an image-side surface 1072 being convex in a paraxial region thereof. The seventh lens element 1070 is made of plastic material and has the object-side surface 1071 and the image-side surface 1072 being both aspheric. The object-side surface 1071 of the seventh lens element 1070 has two inflection points. The image-side surface 1072 of the seventh lens element 1070 has three inflection points. The object-side surface 1071 of the seventh lens element 1070 has one critical point in an off-axis region thereof. The image-side surface 1072 of the seventh lens element 1070 has two critical points in an off-axis region thereof.

The eighth lens element 1080 with negative refractive power has an object-side surface 1081 being concave in a paraxial region thereof and an image-side surface 1082 being concave in a paraxial region thereof. The eighth lens element 1080 is made of plastic material and has the object-side surface 1081 and the image-side surface 1082 being both aspheric. The object-side surface 1081 of the eighth lens element 1080 has one inflection point. The image-side surface 1082 of the eighth lens element 1080 has two inflection points. The object-side surface 1081 of the eighth lens element 1080 has one critical point in an off-axis region thereof. The image-side surface 1082 of the eighth lens element 1080 has one critical point in an off-axis region thereof.

The filter 1090 is made of glass material and located between the eighth lens element 1080 and the image surface 1095, and will not affect the focal length of the photographing optical system. The image sensor 1099 is disposed on or near the image surface 1095 of the photographing optical system.

The detailed optical data of the 10th embodiment are shown in Table 19 and the aspheric surface data are shown in Table 20 below.

TABLE 19

10th Embodiment
f = 5.72 mm, Fno = 1.50, HFOV = 39.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.844 | | | | |
| 2 | Lens 1 | 2.445 | (ASP) | 0.386 | Plastic | 1.545 | 56.1 | 28.34 |
| 3 | | 2.744 | (ASP) | 0.084 | | | | |
| 4 | Lens 2 | 2.706 | (ASP) | 0.865 | Plastic | 1.544 | 56.0 | 6.04 |
| 5 | | 13.577 | (ASP) | 0.039 | | | | |
| 6 | Lens 3 | 14.169 | (ASP) | 0.201 | Plastic | 1.660 | 20.4 | −13.61 |
| 7 | | 5.466 | (ASP) | 0.346 | | | | |
| 8 | Stop | Plano | | 0.181 | | | | |
| 9 | Lens 4 | 9.970 | (ASP) | 0.346 | Plastic | 1.679 | 18.4 | −22.13 |
| 10 | | 5.910 | (ASP) | 0.083 | | | | |
| 11 | Lens 5 | 15.883 | (ASP) | 0.616 | Plastic | 1.544 | 56.0 | 17.99 |
| 12 | | −25.166 | (ASP) | 0.424 | | | | |
| 13 | Lens 6 | 60.496 | (ASP) | 0.542 | Plastic | 1.562 | 44.6 | 17.88 |
| 14 | | −12.003 | (ASP) | 0.196 | | | | |
| 15 | Lens 7 | 4.529 | (ASP) | 0.572 | Plastic | 1.562 | 44.6 | 7.48 |
| 16 | | −56.116 | (ASP) | 0.440 | | | | |
| 17 | Lens 8 | −10.012 | (ASP) | 0.501 | Plastic | 1.544 | 56.0 | −3.83 |
| 18 | | 2.678 | (ASP) | 0.500 | | | | |
| 19 | Filter | Plano | | 0.210 | Glass | 1.517 | 64.2 | — |
| 20 | | Plano | | 0.555 | | | | |
| 21 | Image | Plano | | — | | | | | reference wavelength is 587.6 nm (d-line).
active radius of the stop 1001 (Surface 8) is 1.500 mm.

TABLE 20

Aspheric Coefficients

| Surface # | 2 | 3 | 4 | 5 | 6 | 7 |
|---|---|---|---|---|---|---|
| k = | −5.2842E−01 | −1.8831E−01 | 2.4101E−02 | −2.6045E+01 | 4.9631E+01 | 7.0418E+00 |
| A4 = | 1.2124E−02 | 2.7068E−02 | 2.6756E−02 | −2.6191E−02 | −4.5547E−02 | −2.6192E−02 |
| A6 = | −1.8345E−02 | −5.8215E−02 | −5.2980E−02 | 3.7484E−02 | 7.4578E−02 | 5.3498E−02 |
| A8 = | 1.9477E−02 | 5.8120E−02 | 5.4303E−02 | −3.7351E−02 | −7.7054E−02 | −6.2683E−02 |
| A10 = | −1.1387E−02 | −3.5615E−02 | −3.4819E−02 | 2.3436E−02 | 5.3776E−02 | 4.9386E−02 |
| A12 = | 3.7248E−03 | 1.2858E−02 | 1.3195E−02 | −8.5410E−03 | −2.2423E−02 | −2.2964E−02 |
| A14 = | −6.0339E−04 | −2.3953E−03 | −2.6400E−03 | 1.6491E−03 | 5.0395E−03 | 5.5782E−03 |
| A16 = | 3.5261E−05 | 1.7323E−04 | 2.1609E−04 | −1.2761E−04 | −4.6565E−04 | −5.2375E−04 |

| Surface # | 9 | 10 | 11 | 12 | 13 | 14 |
|---|---|---|---|---|---|---|
| k = | −5.7273E+01 | −4.0888E+01 | −9.9000E+01 | 1.5723E+01 | 7.3041E+01 | −8.2931E+01 |
| A4 = | −5.1074E−02 | −6.0479E−02 | −7.6504E−02 | −3.5651E−02 | −2.1057E−02 | −6.0127E−02 |
| A6 = | 5.0927E−02 | 8.2757E−02 | 9.1098E−02 | −2.5262E−03 | 2.4249E−02 | 1.2408E−02 |
| A8 = | −8.4256E−02 | −1.0545E−01 | −8.6447E−02 | 1.0972E−02 | −3.7517E−02 | 8.5960E−03 |
| A10 = | 6.9584E−02 | 7.3822E−02 | 5.1025E−02 | −1.0443E−02 | 3.1611E−02 | −9.2482E−03 |
| A12 = | −3.4194E−02 | −3.0221E−02 | −1.5929E−02 | 5.7042E−03 | −1.7240E−02 | 3.7602E−03 |
| A14 = | 9.0841E−03 | 6.1145E−03 | 1.0332E−03 | −1.5605E−03 | 5.9918E−03 | −8.1769E−04 |
| A16 = | −9.6747E−04 | −1.2414E−05 | 8.8375E−05 | 1.2444E−04 | −1.2592E−03 | 1.0037E−04 |
| A18 = | — | −1.9490E−04 | −2.5501E−04 | 2.1436E−05 | 1.4317E−04 | −6.5787E−06 |
| A20 = | — | 2.1230E−05 | 2.1343E−05 | −3.1508E−06 | −6.6699E−06 | 1.7941E−07 |

| Surface # | 15 | 16 | 17 | 18 |
|---|---|---|---|---|
| k = | 7.5590E−02 | −9.9000E+01 | 1.6318E+00 | −7.3600E−01 |
| A4 = | −3.2409E−02 | 6.5170E−02 | −5.0388E−02 | −9.7127E−02 |
| A6 = | −3.0029E−02 | −7.8366E−02 | −1.0355E−02 | 2.7965E−02 |
| A8 = | 1.8953E−02 | 3.4447E−02 | 9.2490E−03 | −6.0303E−03 |

TABLE 20-continued

| Aspheric Coefficients | | | | |
|---|---|---|---|---|
| A10 = | −5.4856E−03 | −8.8871E−03 | −2.1967E−03 | 9.4704E−04 |
| A12 = | 7.4636E−04 | 1.3955E−03 | 2.8330E−04 | −1.0708E−04 |
| A14 = | −4.0355E−05 | −1.2785E−04 | −2.2323E−05 | 8.3262E−06 |
| A16 = | 1.0710E−06 | 5.8516E−06 | 1.0814E−06 | −4.1660E−07 |
| A18 = | −1.9346E−07 | −5.3679E−08 | −2.9797E−08 | 1.1994E−08 |
| A20 = | 1.3564E−08 | −3.3607E−09 | 3.5886E−10 | −1.5040E−10 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 5.72 | R3/R4 | 0.20 |
| Fno | 1.50 | (R9 + R10)/(R9 − R10) | −0.23 |
| HFOV [deg.] | 39.6 | f/f1 | 0.20 |
| (Vi/Ni)min | 10.98 | f/f2 | 0.95 |
| V2 | 56.0 | \|f/f2\| + \|f/f3\| | 1.37 |
| V2 + V3 + V4 | 94.8 | f/f2 + f/f3 + f/f4 | 0.27 |
| V2 + V4 | 74.4 | f/f3 | −0.42 |
| V2/N2 | 36.26 | f/f4 | −0.26 |
| V6 | 44.6 | f/f5 | 0.32 |
| ΣCT/CT5 | 6.54 | f/f6 | 0.32 |
| (CT2 + CT3 + CT4)/(CT1 + CT5) | 1.41 | f/f7 | 0.76 |
| CT3/CT2 | 0.23 | f/f8 | −1.49 |
| CT5/CT1 | 1.60 | f/f12 | 1.10 |
| CT5/CT3 | 3.06 | f/f23 | 0.59 |
| CT7/CT5 | 0.93 | f/\|R11\| + f/\|R12\| | 0.57 |
| TD/CT5 | 9.45 | f5/CT5 | 29.21 |
| TD/f2 | 0.96 | f5/f1 | 0.63 |
| TL [mm] | 7.09 | f8/f7 | −0.51 |
| TL/f | 1.24 | Y82/Y11 | 2.03 |
| TL/ImgH | 1.48 | Yc72/Yc71 | 0.27; 0.85 |
| R1/R2 | 0.89 | Yc82/Y82 | 0.38 |
| R3/f | 0.47 | — | — |

11th Embodiment

Figure 21:
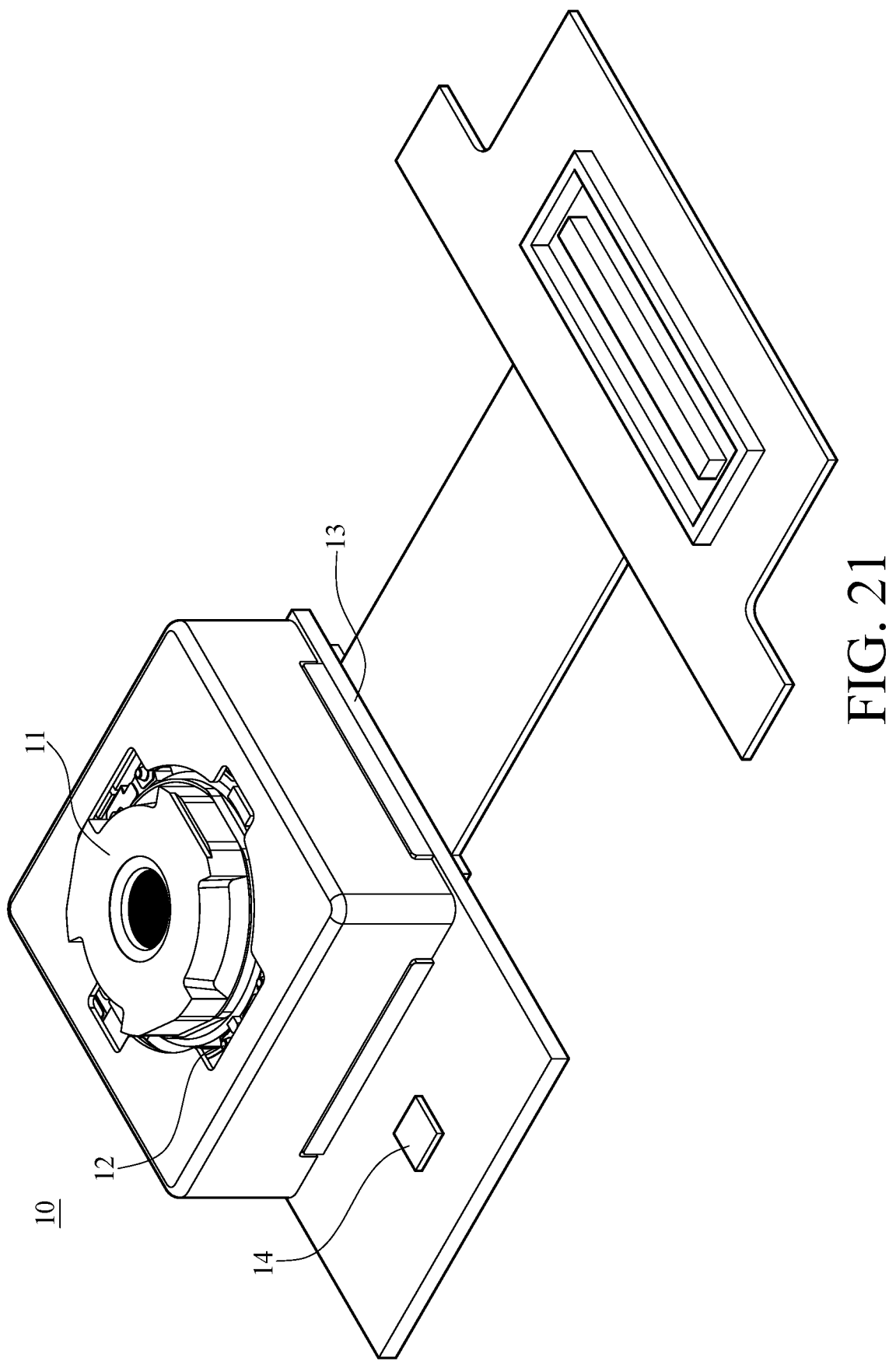
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the photographing optical system disclosed in the 1st embodiment, a barrel and a holder member (their reference numerals are omitted) for holding the photographing optical system; the lens unit 11 may include the photographing optical system disclosed in other embodiments, and the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
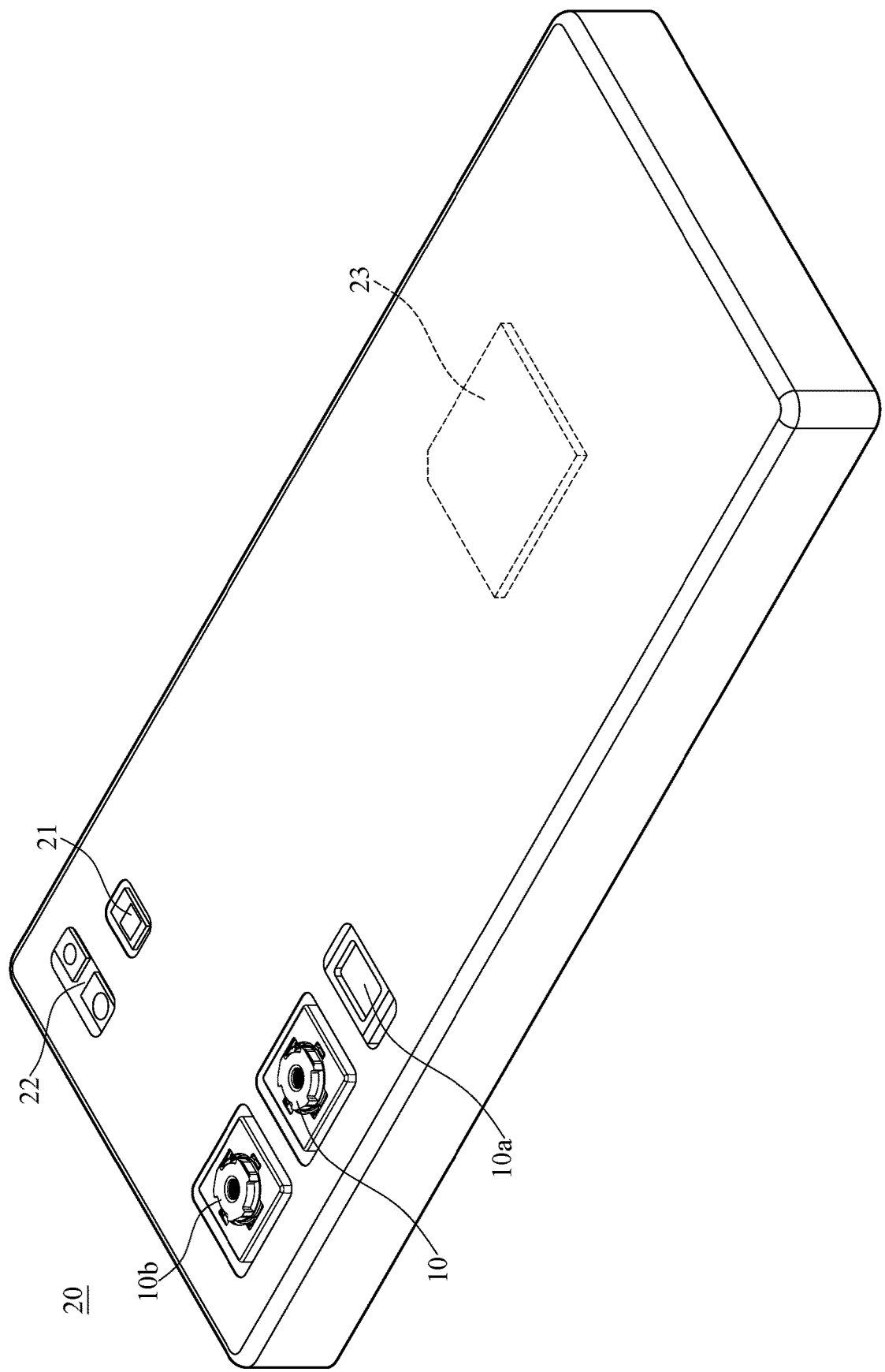
FIG. 22 is one perspective view of an electronic device according to the 12th embodiment of the present disclosure.
Figure 23:
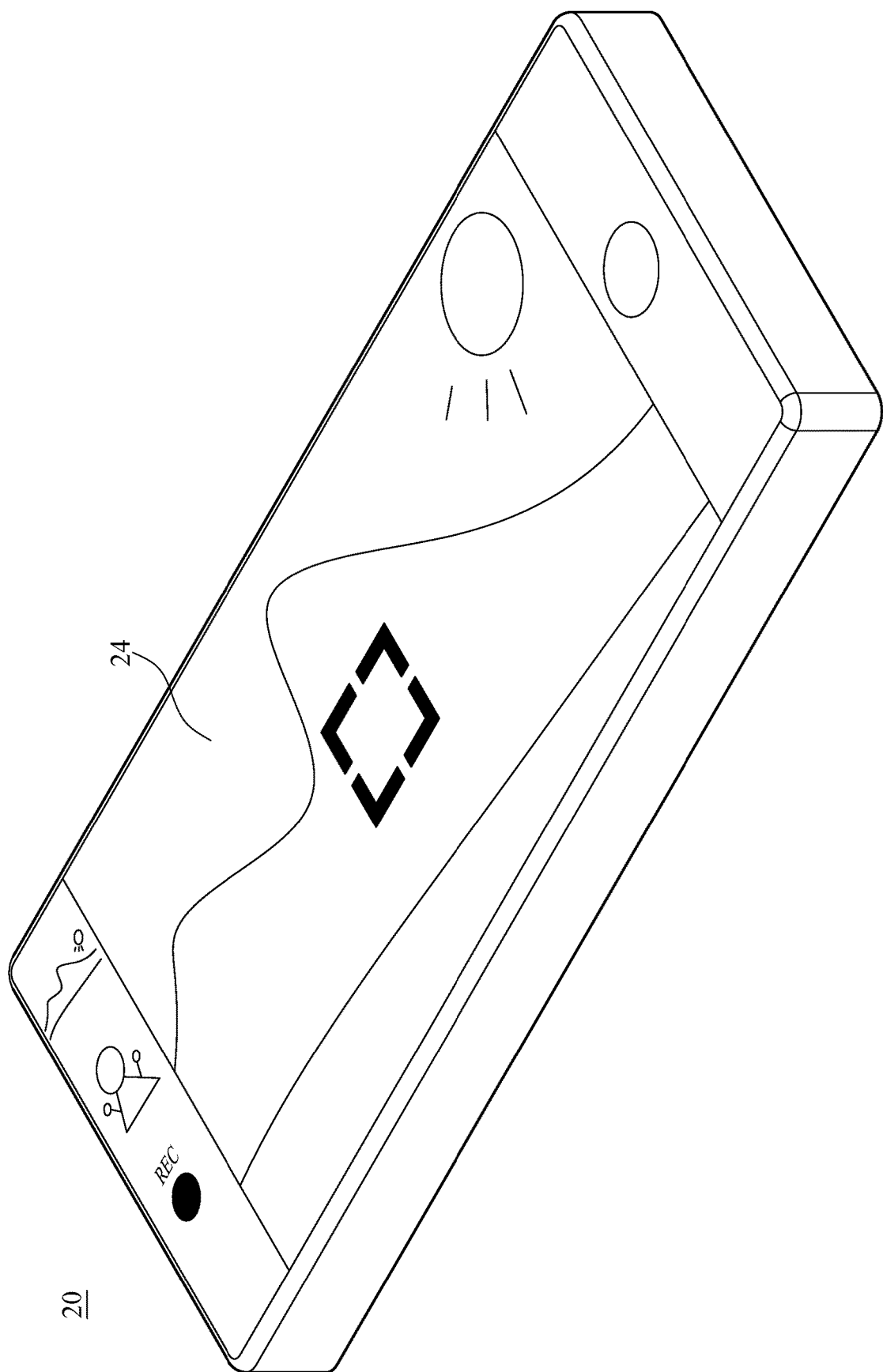
FIG. 23 is another perspective view of the electronic device in FIG. 22.
Figure 24:
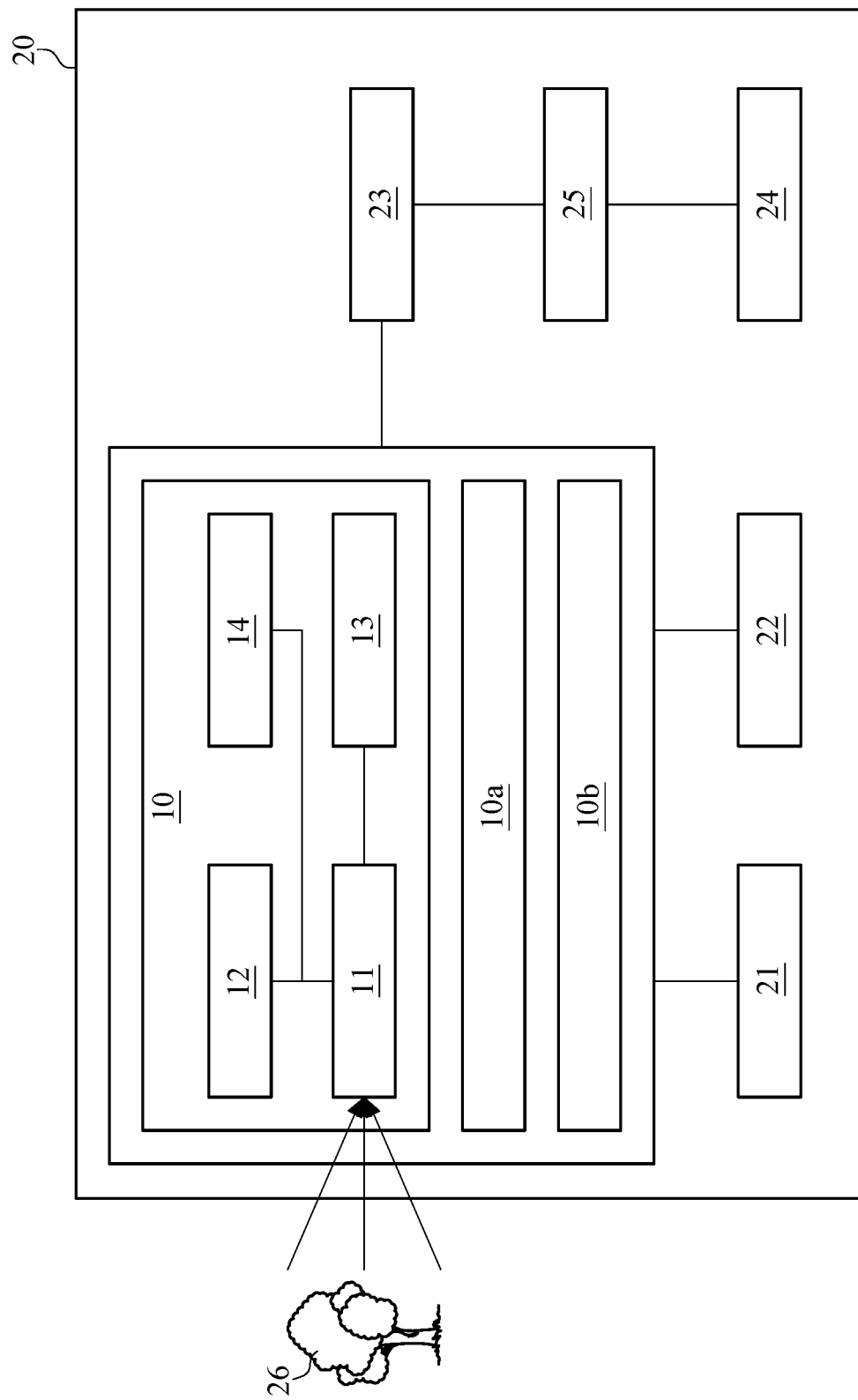
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 20 is a smartphone including the image capturing unit 10 disclosed in the 11th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b are located on the same side of the electronic device 20 and all face the same direction. Furthermore, each of the image capturing unit 10a and the image capturing unit 10b has a configuration similar to that of the image capturing unit 10. In detail, each of the image capturing unit 10a and the image capturing unit 10b includes a lens unit, a driving device, an image sensor and an image stabilizer, and the lens unit includes a lens system assembly, a barrel and a holder member for holding the lens system assembly.

In this embodiment, the image capturing units 10, 10a and 10b have different fields of view (e.g., the image capturing unit 10 is a wide-angle image capturing unit, the image capturing unit 10a is a telephoto image capturing unit, the image capturing unit 10b is an ultra-wide-angle image capturing unit, and the image capturing unit 10 has a maximum field of view ranging between that of the image capturing unit 10a and that of the image capturing unit 10b), such that the electronic device 20 has various magnification ratios so as to meet the requirement of optical zoom functionality. In this embodiment, the electronic device 20 includes multiple image capturing units 10, 10a and 10b, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical system comprising eight lens elements, the eight lens elements being, in order from an object side to an image side, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;

wherein the first lens element has positive refractive power, the fifth lens element has positive refractive power, the object-side surface of the seventh lens element is convex in a paraxial region thereof, the image-side surface of the seventh lens element is concave in a paraxial region thereof, and at least one lens surface of at least one lens element of the photographing optical system has at least one critical point in an off-axis region thereof;

wherein a focal length of the photographing optical system is f, a focal length of the first lens element is f1, a focal length of the fifth lens element is f5, a focal length of the seventh lens element is f7, a focal length of the eighth lens element is f8, a composite focal length of the first lens element and the second lens element is f12, an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, an Abbe number of the seventh lens element is V7, an Abbe number of the eighth lens element is V8, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the eighth lens element is N8, a refractive index of the i-th lens element is Ni, a minimum value of Vi/Ni is (Vi/Ni)min, an f-number of the photographing optical system is Fno, half of a maximum field of view of the photographing optical system is HFOV, a maximum effective radius of the object-side surface of the first lens element is Y11, a maximum effective radius of the image-side surface of the eighth lens element is Y82, and the following conditions are satisfied:

$0 < f5/f1 < 9.5;$ $-7.5 < f8/f7 < -0.55;$ $0.35 < f/f12 < 0.75;$ $6.0 < (Vi/Ni)\text{min} < 12.0,$ wherein $i = 1, 2, 3, 4, 5, 6, 7$ or $8;$ $1.0 < Fno < 2.2;$ $30.0[\text{deg.}] < HFOV < 50.0[\text{deg.}];$ and $1.8 < Y82/Y11 < 3.0.$ 2. The photographing optical system of claim 1, wherein the focal length of the seventh lens element is f7, the focal length of the eighth lens element is f8, the Abbe number of the first lens element is V1, the Abbe number of the second lens element is V2, the Abbe number of the third lens element is V3, the Abbe number of the fourth lens element is V4, the Abbe number of the fifth lens element is V5, the Abbe number of the sixth lens element is V6, the Abbe number of the seventh lens element is V7, the Abbe number of the eighth lens element is V8, the Abbe number of the i-th lens element is Vi, the refractive index of the first lens element is N1, the refractive index of the second lens element is N2, the refractive index of the third lens element is N3, the refractive index of the fourth lens element is N4, the refractive index of the fifth lens element is N5, the refractive index of the sixth lens element is N6, the refractive index of the seventh lens element is N7, the refractive index of the eighth lens element is N8, the refractive index of the i-th lens element is Ni, the minimum value of Vi/Ni is (Vi/Ni)min, and the following conditions are satisfied:

$-4.0 < f8/f7 < -0.60;$ and $6.0 < (Vi/Ni)\text{min} \leq 11.65,$ wherein $i = 1, 2, 3, 4, 5, 6, 7$ or $8.$ 3. The photographing optical system of claim 1, wherein the Abbe number of the second lens element is V2, the Abbe number of the third lens element is V3, the Abbe number of the fourth lens element is V4, and the following condition is satisfied:

$40.0 < V2+V3+V4 \leq 95.8$.

4. The photographing optical system of claim 1, wherein an axial distance between the object-side surface of the first lens element and the image-side surface of the eighth lens element is TD, a focal length of the second lens element is f2, and the following condition is satisfied:

$-0.60 < TD/f2 < 0.60$.

5. The photographing optical system of claim 1, wherein the f-number of the photographing optical system is Fno, half of the maximum field of view of the photographing optical system is HFOV, and the following conditions are satisfied:

$1.2 < Fno < 1.8$; and $35.0[deg.] < HFOV < 45.0[deg.]$.

6. The photographing optical system of claim 1, wherein the object-side surface of the first lens element is convex in a paraxial region thereof, the image-side surface of the first lens element is concave in a paraxial region thereof, and at least one lens surface of the sixth lens element has at least one critical point in an off-axis region thereof.

7. The photographing optical system of claim 1, wherein the object-side surface of the third lens element is convex in a paraxial region thereof, and the image-side surface of the third lens element is concave in a paraxial region thereof.

8. A photographing optical system comprising eight lens elements, the eight lens elements being, in order from an object side to an image side, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;
   wherein the first lens element has positive refractive power, the object-side surface of the second lens element is convex in a paraxial region thereof, the fifth lens element has positive refractive power, the image-side surface of the seventh lens element is concave in a paraxial region thereof, the eighth lens element has negative refractive power, the image-side surface of the eighth lens element is concave in a paraxial region thereof, at least one lens surface of at least one lens element of the photographing optical system has at least one critical point in an off-axis region thereof, and an axial distance between the seventh lens element and the eighth lens element is a maximum value among axial distances between each of all adjacent lens elements of the photographing optical system;
   wherein a focal length of the photographing optical system is f, a focal length of the first lens element is f1, a focal length of the fifth lens element is f5, a focal length of the seventh lens element is f7, a focal length of the eighth lens element is f8, a composite focal length of the first lens element and the second lens element is f12, a curvature radius of the object-side surface of the second lens element is R3, and the following conditions are satisfied:

$0 < f5/f1 < 9.5$;

$-7.5 < f8/f7 < -0.55$;

$0.35 < f/f12 < 0.75$; and $0 < R3/f < 2.0$;

wherein a vertical distance between a non-axial critical point on the object-side surface of the seventh lens element and an optical axis is Yc71, a vertical distance between a non-axial critical point on the image-side surface of the seventh lens element and the optical axis is Yc72, and the object-side surface and the image-side surface of the seventh lens element each have at least one critical point in an off-axis region thereof satisfying the following condition:

$0.80 < Yc72/Yc71 < 1.5$.

9. The photographing optical system of claim 8, wherein the focal length of the seventh lens element is f7, the focal length of the eighth lens element is f8, a central thickness of the second lens element is CT2, a central thickness of the third lens element is CT3, and the following conditions are satisfied:

$-4.0 < f8/f7 < -0.60$; and $0.80 < CT3/CT2 < 1.5$.

10. The photographing optical system of claim 8, wherein the curvature radius of the object-side surface of the second lens element is R3, the focal length of the photographing optical system is f, a composite focal length of the second lens element and the third lens element is f23, and the following conditions are satisfied:

$0.15 < R3/f < 1.4$; and $-0.40 < f/f23 < 0.20$.

11. The photographing optical system of claim 8, wherein an Abbe number of the second lens element is V2, a refractive index of the second lens element is N2, and the following condition is satisfied:

$6.0 < V2/N2 \leq 12.29$.

12. The photographing optical system of claim 8, wherein an axial distance between the object-side surface of the first lens element and an image surface is TL, the focal length of the photographing optical system is f, a maximum image height of the photographing optical system is ImgH, and the following conditions are satisfied:

$3.0[mm] < TL < 15.0[mm]$;

$1.0 < TL/f < 1.6$; and $1.0 < TL/ImgH < 2.0$.

13. The photographing optical system of claim 8, wherein the focal length of the photographing optical system is f, a focal length of the second lens element is f2, a focal length of the third lens element is f3, a focal length of the fourth lens element is f4, and the following condition is satisfied:

$-0.90 < f/f2+f/f3+f/f4 < 0.20$.

14. The photographing optical system of claim 8, wherein the vertical distance between the non-axial critical point on the object-side surface of the seventh lens element and an optical axis is Yc71, the vertical distance between the non-axial critical point on the image-side surface of the seventh lens element and the optical axis is Yc72, and the object-side surface and the image-side surface of the seventh lens element each have at least one critical point in an off-axis region thereof satisfying the following condition:

$0.90 < Yc72/Yc71 < 1.4$.

15. A photographing optical system comprising eight lens elements, the eight lens elements being, in order from an object side to an image side, a first lens element, a second lens element, a third lens element, a fourth lens element, a fifth lens element, a sixth lens element, a seventh lens element and an eighth lens element, and each of the eight lens elements having an object-side surface facing toward the object side and an image-side surface facing toward the image side;
  wherein the first lens element has positive refractive power, the object-side surface of the second lens element is convex in a paraxial region thereof, the fifth lens element has positive refractive power, the seventh lens element has positive refractive power, the object-side surface of the seventh lens element is convex in a paraxial region thereof, the image-side surface of the seventh lens element is concave in a paraxial region thereof, and at least one lens surface of at least one lens element of the photographing optical system has at least one critical point in an off-axis region thereof;
  wherein a focal length of the photographing optical system is f, a focal length of the first lens element is f1, a focal length of the fifth lens element is f5, a curvature radius of the object-side surface of the second lens element is R3, a curvature radius of the object-side surface of the fifth lens element is R9, a curvature radius of the image-side surface of the fifth lens element is R10, an Abbe number of the second lens element is V2, an Abbe number of the sixth lens element is V6, a central thickness of the third lens element is CT3, a central thickness of the fifth lens element is CT5, and the following conditions are satisfied:

$0 < f5/f1 < 9.5$;

$0 < R3/f < 2.0$;

$-1.5 < (R9+R10)/(R9-R10) < 1.5$;

$10.0 < V2 < 50.0$;

$15.0 < V6 < 50.0$; and $1.0 < CT5/CT3$.

16. The photographing optical system of claim 15, wherein the Abbe number of the second lens element is V2, the central thickness of the third lens element is CT3, the central thickness of the fifth lens element is CT5, and the following conditions are satisfied:

$12.0 < V2 < 30.0$; and $1.0 < CT5/CT3 < 5.0$.

17. The photographing optical system of claim 15, wherein the Abbe number of the second lens element is V2, an Abbe number of the fourth lens element is V4, the central thickness of the fifth lens element is CT5, a central thickness of the seventh lens element is CT7, and the following conditions are satisfied:

$25.0 < V2+V4 < 50.0$; and $0.10 < CT7/CT5 < 1.3$.

18. The photographing optical system of claim 15, wherein a central thickness of the first lens element is CT1, a central thickness of the second lens element is CT2, the central thickness of the third lens element is CT3, a central thickness of the fourth lens element is CT4, the central thickness of the fifth lens element is CT5, and the following condition is satisfied:

$0.10 < (CT2+CT3+CT4)/(CT1+CT5) < 1.0$.

19. The photographing optical system of claim 15, wherein the second lens element has negative refractive power, the image-side surface of the second lens element is concave in a paraxial region thereof, the curvature radius of the object-side surface of the second lens element is R3, a curvature radius of the image-side surface of the second lens element is R4, and the following condition is satisfied:

$0.50 < R3/R4 < 2.0$.

20. The photographing optical system of claim 15, wherein at least one lens surface of each of at least three lens elements of the photographing optical system has at least one inflection point;
  wherein a vertical distance between a non-axial critical point on the image-side surface of the eighth lens element and an optical axis is Yc82, a maximum effective radius of the image-side surface of the eighth lens element is Y82, and the image-side surface of the eighth lens element has at least one critical point in an off-axis region thereof satisfying the following condition:

$0.20 < Yc82/Y82 < 0.60$.

* * * * *